United States Patent
Ehsan et al.

(10) Patent No.: US 11,260,373 B2
(45) Date of Patent: Mar. 1, 2022

(54) COLLOIDAL-COPPER BASED WATER OXIDATION ELECTROCATALYST

(71) Applicant: King Fahd University of Petroleum and Minerals, Dhahran (SA)

(72) Inventors: Muhammad Ali Ehsan, Dhahran (SA); Khurram Saleem Joya, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 207 days.

(21) Appl. No.: 16/781,597

(22) Filed: Feb. 4, 2020

(65) Prior Publication Data

US 2021/0237037 A1    Aug. 5, 2021

(51) Int. Cl.
*B01J 23/72* (2006.01)
*B01J 37/02* (2006.01)
(Continued)

(52) U.S. Cl.
CPC .............. *B01J 23/72* (2013.01); *B01J 21/18* (2013.01); *B01J 35/023* (2013.01); *B01J 35/10* (2013.01);
(Continued)

(58) Field of Classification Search
CPC . B01J 23/72; B01J 21/18; B01J 35/023; B01J 35/10; B01J 37/0215; B01J 37/08;
(Continued)

(56) References Cited

U.S. PATENT DOCUMENTS

| 5,591,547 A | * | 1/1997 | Yoneda | H01M 4/583 429/220 |
| 6,323,511 B1 | * | 11/2001 | Marsh | C23C 16/18 257/295 |

(Continued)

FOREIGN PATENT DOCUMENTS

| CN | 10 7051218 | * | 8/2017 | ......... B01D 67/0083 |
| CN | 10 9399691 | * | 3/2019 | ............. C01B 32/15 |

(Continued)

OTHER PUBLICATIONS

Qiushi Wang et al., "Copper oxide/cuprous oxide/hierarchical porous biomass-derived carbon hybrid composites for high-performance supercapacitor electrode." Journal of Alloys and Compounds 782, pp. 1103-1113. (Year: 2019).*

(Continued)

*Primary Examiner* — Patricia L. Hailey
(74) *Attorney, Agent, or Firm* — Oblon, McClelland, Maier & Neustadt, L.L.P.

(57) ABSTRACT

A noble metal-free water oxidation electrocatalyst can be stable and obtained from earth-abundant materials, e.g., using copper-colloidal nanoparticles. The catalyst may contain nanobead and nanorod morphological features with narrow size distribution. The onset for oxygen evolution reaction can occur at a potential of 1.45 $V_{RHE}$ ($\eta$=220 mV). Such catalysts may be stable during long-term water electrolysis and/or exhibit a high electroactive area, e.g., with a Tafel slope of 52 mV/dec, TOF of 0.81 $s^{-1}$, and/or mass activity of 87 mA/mg. The copper may also perform $CO_2$ (Continued)

reduction at the cathode side. The Cu-based electrocatalytic system may provide a flexible catalyst for electrooxidation of water and for chemical energy conversion, without requiring Pt, Ir, or Ru.

20 Claims, 45 Drawing Sheets

(51) Int. Cl.
B01J 37/08 (2006.01)
B01J 35/10 (2006.01)
C01B 13/02 (2006.01)
B01J 35/02 (2006.01)
B01J 21/18 (2006.01)

(52) U.S. Cl.
CPC .......... *B01J 37/0215* (2013.01); *B01J 37/08* (2013.01); *C01B 13/0207* (2013.01); *C01B 13/0237* (2013.01); *B01J 2219/00747* (2013.01)

(58) Field of Classification Search
CPC ........ B01J 2219/00747; C01B 13/0207; C01B 13/0237; C01P 2002/02; C01P 2002/40; C01P 2002/80; C01P 2002/85; C01P 2006/80; C22C 9/00; C22C 29/12; C22C 32/0005
USPC .......................... 502/184, 331; 420/469, 587
See application file for complete search history.

(56) References Cited

U.S. PATENT DOCUMENTS

| 2018/0331369 | A1 | 11/2018 | Kumta et al. |
| 2019/0177863 | A1 | 6/2019 | Khaled et al. |
| 2020/0248324 | A1* | 8/2020 | Legrand .................... C25B 3/25 |

FOREIGN PATENT DOCUMENTS

| CN | 109811364 A | | 5/2019 | |
| CN | 11 0449122 | * | 11/2019 | ......... B01D 53/8668 |
| CN | 11 2018398 | * | 12/2020 | ............. B82Y 30/00 |
| JP | 2006 118032 | * | 5/2006 | ................ B22F 1/00 |
| JP | 2012 122126 | * | 6/2012 | ............. B01J 23/72 |
| JP | 2020-029392 | * | 2/2020 | ............ B82Y 30/30 |
| WO | 2015/170987 A1 | | 11/2015 | |

OTHER PUBLICATIONS

Lei Wang et al., "Electrochemical study of hydrazine oxidation by leaf-shaped copper oxide loaded on highly ordered mesoporous carbon composite." Journal of Colloid and Interface Science 549, pp. 98-104. (Year: 2019).*
Chunxiao Xu et al., "One-step combustion synthesis of CuO/ $Cu_2O$/C anode for long cycle life Li-ion batteries." Carbon 142, pp. 51-59. (Year: 2019).*
Hongxia Zhang et al., "$Cu_2O$@C core/shell nanoparticle as an electrocatalyst for oxygen evolution reaction." Journal of Catalysis 352, pp. 239-245. (Year: 2017).*
Dae-Won Kim et al., "Synthesis of activated carbon nanotube/ copper oxide composites and their electrochemical performance." Journal of Alloys and Compounds 530, pp. 6-10. (Year: 2012).*
Zichao Yang et al., "An in situ method of creating metal oxide-carbon composites and their application as anode materials for lithium-ion batteries." Journal of Materials Chemistry 21, pp. 11092-11097. (Year: 2011).*
Babar, et al. ; Noble-Metal-Free Colloidal-Copper Based Low Overpotential Water Oxidation Electrocatalyst; ChemCatChem ; Jun. 6, 2019 ; Abstract Only ; 2 Pages.
Liu, et al. ; Self-Supported Copper Oxide Electrocatalyst for Water Oxidation at Low Overpotential and Con_rmation of Its Robustness by Cu K-Edge X-ray Absorption Spectroscopy ; J. Phys. Chem. C ; pp. 831-840 ; Dec. 17, 2015 ; 9 Pages.
Liu, et al. ; Earth-Abundant Copper-Based Bifunctional Electrocatalyst for Both Catalytic Hydrogen Production and Water Oxidation ; ACS Catalysis ; pp. 1530-1538 ; Jan. 26, 2015 ; 11 Pages.
Pawar, et al. ; Self-assembled two-dimensional copper oxide nanosheet bundles as an efficient oxygen evolution reaction (OER) electrocatalyst for water splitting applications† ; Journal of Materials Chemistry A, Issue 25 ; 2017 ; Abstract Only ; 2 Pages.
Hou, et al. ; Enhanced electrocatalytic reduction of aqueous nitrate by modified copper catalyst through electrochemical deposition and annealing treatment; Chemical Engineering Communications, vol. 205, Issue 5 ; Feb. 26, 2018 ; Abstract Only ; 2 pages.

* cited by examiner

COLLOIDAL-COPPER BASED WATER OXIDATION ELECTROCATALYST

STATEMENT OF ACKNOWLEDGEMENT

The inventors gratefully acknowledge the research units at the Department of Chemistry and the Center of Research Excellence in Nanotechnology (CENT) at the King Fahd University of Petroleum and Minerals (KFUPM), Dhahran, Saudi Arabia, and the financial support of KFUPM through project grant #IN161012.

STATEMENT REGARDING PRIOR DISCLOSURES BY INVENTOR(S)

Aspects of the present disclosure are described in "Noble-Metal-Free Colloidal-Copper Based Low Overpotential Water Oxidation Electrocatalyst," which was authored by the inventors and published online in Chem. Cat. Chem. 2019, 11(24), 6022-6030, on Jun. 6, 2019, which is incorporated by reference herein in its entirety.

BACKGROUND OF THE INVENTION

Field of the Invention

The present disclosure relates to electrocatalysts, particularly for the oxygen evolution reaction (OER), such as catalysts comprising copper and colloidal copper, as well as facile methods of the use of such catalysts and their making.

Description of the Related Art

The electrochemical splitting of water into molecular hydrogen and oxygen ($2H_2O \rightarrow O_2 + 2H_2$) is a promising scheme for the sustainable production of clean and renewable fuel, such as hydrogen. It would be desirable to use renewable energy sources to split water into its elemental constituents, which can also be combined or coordinated with $CO_2$ capture and conversion—$CO_2$ being a major environmental pollutant—into storable carbon-neutral fuels.

Water splitting is two-step reaction including oxidation and reduction. The water oxidation reaction ($2H_2O \rightarrow O_2 + 4e^- + 4H^+$) is a half reaction of the water splitting reaction, also called the oxygen evolution reaction (OER), which provides reductive equivalents for the conversion of $H_2O$ to free protons ($H^+$) that can be combined with a $CO_2$ reduction scheme to produce methanol, formic acid, and other liquid fuels. However, the oxygen evolution reaction (OER) with respect to water oxidation is kinetically sluggish during the overall water splitting, thus limiting and often rendering the entire process infeasible for practical applications.

To overcome the kinetic limitations of the oxygen evolution reaction (OER), an efficient water-oxidation electrocatalyst is required which can function at low electrochemical potential along with high activity in operational condition. Furthermore, for industrial applications, the implemented catalytic system should be inexpensive, earth-abundant, easily approachable, and highly stable under vigorous oxidative conditions.

Traditional low overpotential water-splitting electrocatalysts include Pt/C for the hydrogen evolution reaction (HER), and $RuO_2$ and $IrO_2$ for the oxygen evolution reaction (OER). However, the scarcity, high acquisition costs, and poor performance for long-term water oxidation tests in alkaline solution hamper the suitability of Pt/C, $RuO_2$, and $IrO_2$ for widespread practical applications of these materials.

Recent advances in water oxidation catalysis have mainly focused on lowering the energy cost or lowering the overpotential for the kinetically sluggish oxygen evolution reaction (OER) by investigating effective and modestly priced catalytic systems that are widely accessible. On the other hand, researchers in the art continue to seek improved electrocatalysts comprising a noble metal-free system for efficient water electrolysis. Both single metal-oxide and mixed-oxide systems have been tested for water oxidation under alkaline conditions. Recently, metal-carbide, metal-phosphide, metal-selenide, metal-vanadate, and other noble metal-free electrocatalysts have been tested for use in the oxygen evolution reaction (OER). However, most of these recently developed electrocatalysts initiate oxygen evolution at higher overpotentials than prior catalysts, while the preferred electrode/electrocatalytic system is required to operate at a lower overpotential relative to the standard 1.23 V versus a reversible hydrogen electrode (RHE). Moreover, a high current density and low or modest Tafel slope value in aqueous solution at neutral or near-neutral pH conditions are desirable.

Various synthetic methods, including fine structural modification and heteroatomic doping, have been employed in efforts to accelerate water oxidation catalysis, but finding a robust material having low onset overpotential and high current density for oxygen evolution reaction (OER) remains a substantial challenge in this field. Noble metal-free, single metal-oxide electrocatalysts would be simple and interesting materials, but certain oxides of Ni, Co, Mn, and Fe, prepared by tedious synthesis methods, have undergone degradation during OER and unstable in long-term application.

Copper is an interesting and emerging material for water oxidation catalysis due to its low cost and abundance. Copper could be an alternative to Pt-based, Ir-based, and Ru-based electrocatalysts. Copper-based materials may also serve as $CO_2$ reduction catalysts at the cathode side that can be combined with a water oxidation module. However, copper-based electrocatalytic systems have not been explored widely for water oxidation catalysis. Copper-based electrocatalytic systems show relatively large overpotential for water oxidation, but are typically unstable in oxidative condition. Recently, a type of in-situ produced, Cu-oxide nanoleaf water oxidation electrocatalyst, $CuO_x$-NLs, obtained by simple controlled-current anodization were indicated to initiate oxygen evolution at relatively low potential of 1.55 $V_{RHE}$ in a metal ion free electrolyte solution relative to other Cu-based materials. Nevertheless, new and manageable preparation methods are sought in the art for scaling and implementation on a commercial scale. Furthermore, suitable nanoscale morphological features could be useful in achieving exploitable methods and accessible materials to facilitate mass transport and charge transfer during the catalytic reaction.

US 2018/0331369 A1 by Kumta et al. (Kumta) discloses noble metal-free electro-catalyst compositions for use in acidic media, e.g., acidic electrolyte. Kumta's non-noble metal is a nanosized oxide of Mn, Cu, Zn, Sc, Co, Fe, Ta, Sn, Nb, W, Ti, Va, Cr, Ni, Mo, Y, La, Nd, Er, Gd, Yb, and/or Ce, optionally of a formula $(a_x b_y)O_z$:wc, with "a" being any of the aforementioned elements, "b" is Mn, "c" is c is F, Cl, Br, I, S, Se, Te, N, P, As, Sb, Bi, Al, and/or B, $0 \leq x \leq 2$, $0 \leq y \leq 2$, at least one of x and y being non-zero, $0 \leq z \leq 4$, and w is 0 to 20 wt. %. Kumta's compositions may include a dopant such as a halogen. Kumta describes acidic media to include oxygen reduction reaction (ORR) in proton exchange membrane (PEM) fuel cells, direct methanol fuel cells and oxygen evolution reaction (OER) in PEM-based water electrolysis and metal air batteries, and hydrogen generation from solar energy and electricity-driven water splitting. Kumta's average particle size may be 8 to 10 nm or less than 20 nm, and Kumta's catalyst is designed for use in acidic media. Kumta exemplifies only copper catalysts also comprising substantial amounts of manganese.

WO 2015/170987 A1 by Joya et al. (Joya) discloses a process for forming a copper oxide laminar leaf-shaped nanoparticulate material on an amorphous copper surface by electrolytic anodization and/or self-deposition. Joya's method involves: immersing a cathode and a copper substrate as anode in a reaction medium with a pH range of from 10 to 13; and applying a current over the anode and cathode suitable to electrolytically deposit copper oxide onto the surface of the anode. Joya's laminar, leaf-shaped nanoparticles have an ellipsoidal shape, an average aspect ratio in the range of from 13 to 3:1, and an average thickness of 5 to 50 nm. While Joya may use a carbonate buffer, Joya does not describe or suggest a colloidal copper and carbonate/bicarbonate deposition material, and Joya's catalyst has a carbon content of 11% and a ratio of copper to oxygen of 0.95:1 to 1.15:1. Joya's electrocatalyst has an onset potential of 1.63 V vs a reversible hydrogen electrode (RHE) in carbonate buffer.

CN 109811364 A by Cao et al. (Cao) discloses a ruthenium-cuprous oxide (Ru—$Cu_2O$) electrocatalysis material and its preparation. Cao uses foamed copper as a substrate; prepares a copper hydroxide nanowire by in-situ corrosion oxidation; prepares a Ru—$Cu_2O$ hollow nanotube electrocatalysis material by hydrothermal reaction. Cao's catalyst can separate oxygen and hydrogen by electrocatalysis under alkaline conditions when the Ru—$Cu_2O$ is installed into a water electrolysis device. Cao does not describe that its electrocatalyst contains carbon. Cao's catalyst has an onset potential above 1.50 V vs a reversible hydrogen electrode (RHE). Moreover, Cao's catalyst requires Ru.

US 2019/0177863A1 by Khaled et al. (Khaled) discloses an electrode with a conductive substrate and an electrocatalyst comprising zinc oxide and copper oxide supported on a carbon nanomaterial, a method of fabricating the electrode, an electrochemical cell that utilizes the electrode as a working electrode, and a process for producing propanol from $CO_2$ with the electrochemical cell. Khaled's carbon nanomaterial support may be graphene or reduced graphene oxide, while Khaled's catalyst takes the form of 20 to 40 nm nanoparticles of copper oxide deposited on 200 to 500 nm zinc oxide dendrites deposited on the carbon nanomaterial. Khaled's catalyst thus requires zinc oxide and is not described to form $O_2$ and $H_2$ from water.

*J. Phys. Chem. C* 2016, 120(2), 831-840 by Liu et al. (Liu I) discloses an annealing approach to synthesize binder-free, self-supported heterogeneous copper oxide (CuO) on conductive electrodes for the oxygen evolution reaction (OER), for producing electrodes. Liu I's catalysts were grown in situ on fluorine-doped tin oxide (FTO) by electrodeposition from a simple Cu(II) salt solution, followed by annealing at around 500° C. Liu I's CuO-based OER catalyst can achieve an onset potential of less than 0.58 V (vs Ag/AgCl) in 1.0 M KOH at pH 13.6. From the Tafel plot, Liu I's catalyst requires overpotentials for a current density of 0.1 mA/cm$^2$ of 360 mV and 1.0 mA/cm$^2$ of 430 mV. Liu I's copper oxide is irregularly-shaped particles of ca. 1 μm in diameter, and Liu I's catalyst does not incorporate carbon.

*ACS Catal.* 2015, 5(3), 1530-1538 by Liu et al. (Liu II) discloses water-soluble copper complexes can be used as catalyst precursors to generate the copper-based bifunctional catalyst composite for both hydrogen production and water oxidation reactions. Liu II grows a thin catalyst film on a fluorine-doped tin oxide (FTO) electrode under an applied cathodic potential, accompanied by the production of a large amount of hydrogen gas bubbles. Liu II's materials contains an amorphous $Cu_2O$ mixed copper hydroxide ($H_2$-CuCat), which can catalyze water reduction in a copper-free aqueous solution at a pH of 9.2 under a low overpotential. Under an applied anodic potential, Liu II's material can catalyze water oxidation to evolve oxygen. Liu II's catalyst is amorphous, contains a copper hydroxide phase, appears to only have cuprous phases, and lacks incorporated carbon.

*J. Mater. Chem. A* 2017, 5(25), 12747-12751 by Pawar et al. (Pawar) discloses a two-dimensional copper oxide (CuO) electrocatalyst for the oxygen evolution reaction (OER). Pawar self-assembles the CuO electrode on a stainless steel substrate via chemical bath deposition at 80° C. in a mixed solution of $CuSO_4$ and $NH_4OH$, followed by air annealing, to obtain a 2D nanosheet bundle-type morphology. Pawar performs OER in a 1 M KOH solution, which starts to occur at about 1.48 V versus the RHE at an overpotential, $\eta$, of 250 mV, with a Tafel slope of 59 mV/dec. Pawar reports the catalyst performance with an overpotential ($\eta$) of 350 mV at 10 mA/cm$^2$ to be among the lowest compared with other copper-based materials, capable of delivering a stable current density of greater than 10 mA/cm$^2$ for more than 10 hours. Pawar's catalyst has neither carbon incorporated, nor agglomerated nanoparticles of copper oxide.

*Chem. Eng. Comm.* 2018, 5(25), 706-715 by Hou et al. (Hou) discloses a preparation of Cu electrocatalyst by electrochemical deposition of Cu on Ni foils, annealing to produce nanograins of Cu oxides, and electroreduction to form metallic Cu nanograins to enhance the catalytic activities of nitrate reduction. Hou reports that electrochemical deposition of Cu on Ni substrates produced different sizes and sharp-edged microcrystal of Cu, and annealing treatment at 300° C. transformed these microcrystals into uniform 150 to 350 nm spheroids of Cu oxides. Hou's electrocatalyst is for the reduction of nitrate, and includes nanograins of metallic copper, while lacking carbon incorporation.

In light of the above, a need remains for oxygen evolution reaction (OER) catalyst which can avoid noble and/or higher priced metals, particularly for catalysts using copper and particularly lending to simple preparation, such as copper-oxide nanoparticles with incorporated carbon, and methods of making and using such catalysts to catalyze the OER.

SUMMARY OF THE INVENTION

Aspects of the invention provide oxygen evolution reaction catalysts, comprising: a substrate; and a porous nanoparticle film disposed on the substrate, wherein the porous nanoparticle film comprises, based upon energy dispersive x-ray spectroscopy, 10 to 20 atom. % of carbon, 35 to 60 atom. % of copper, and 25 to 50 atom. % of oxygen. Such catalysts may be modified by any permutation of the features described herein, particularly the following.

The porous nanoparticle film may comprises an optionally crystalline $Cu_8O$ phase, an optionally crystalline CuO phase, and/or an optionally amorphous $Cu_2O$ phase.

The atomic ratio of the copper to the oxygen in the porous nanoparticle film may be in a range of from 1.175 to 1.6:1, measured by energy dispersive x-ray spectroscopy. The atomic ratio of the copper to carbon in the porous nanoparticle film may be in a range of from 2.25:1 to 5:1, measured by energy dispersive x-ray spectroscopy.

The substrate may comprise at least 50 wt. % of a transparent conductive oxide, relative to a total substrate weight. The substrate may comprise at least 75 wt. % indium tin oxide, relative to a total substrate weight Inventive catalysts may have an oxygen evolution reaction onset potential in 0.1 M KOH solution of 1.40 to 1.70 V relative to the reversible hydrogen electrode.

Inventive catalysts may have a current density of 9.5 to 15 mA/cm$^2$ at a potential in 0.1 M KOH solution of 1.59 V relative to the reversible hydrogen electrode.

Inventive catalysts may have a Tafel plot of over potential versus logarithm of current density that is linear with a slope of in a range of from 0.45 to 0.6.

Aspects of the invention provide electrochemical cells comprising any permutation of the inventive catalyst described herein and a basic electrolyte.

Aspects of the invention provide methods for making any permutation of the inventive catalyst described herein, which methods may comprise: spray and/or drop coating a nanoparticle dispersion comprising copper ions and carbonaceous anions onto the substrate to obtain a coated substrate; and annealing the coated substrate at a temperature in a range of from 450 to 550° C. to form the catalyst.

Aspects of the invention provide methods of conducting an oxygen evolution reaction, which method may comprise: contacting any permutation of the inventive catalyst described herein with an aqueous electrolyte solution having a pH of 8 to 14; and applying a potential of 1.40 to 1.70 V to the electrocatalyst and a counter electrode immersed in the aqueous electrolyte solution.

Aspects of the invention provide methods of making an oxygen evolution reaction catalyst, which methods may comprise: spray or drop coating a nanoparticle dispersion comprising at least 50 wt. %, as a percentage of non-solvent weight, of copper and carbonaceous anions onto a substrate, outside of solution, to obtain a coated substrate; and annealing the coated substrate at a temperature in a range of from 450 to 550° C. to form the catalyst.

The nanoparticle dispersion may be made by processes comprising: combining copper ions and bicarbonate or carbonate ions in an aqueous solution to form a precursor solution; optionally aging the precursor solution at a temperature in a range of from 5 to 45° C. to form a copper particle suspension; and optionally microfiltering the copper particle suspension to obtain the nanoparticle dispersion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
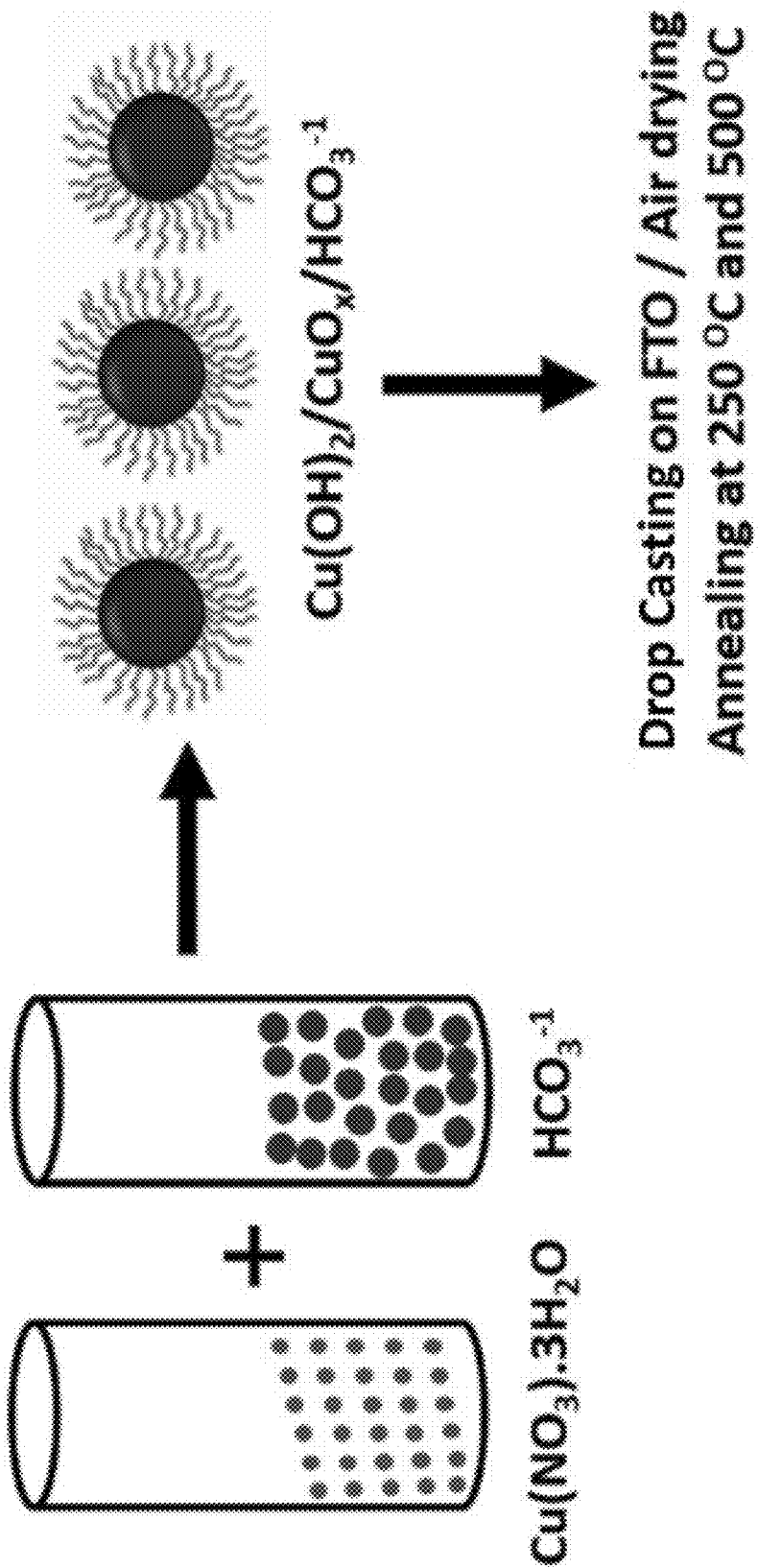
FIG. 1 shows an illustration of the synthesis process of colloidal copper nanoparticles and a fabrication process for the electrode/electrocatalyst material useful as a water oxidation electrocatalyst within the scope of the invention.

Aspects of the invention provide oxygen evolution reaction catalysts, comprising: a substrate, preferably a non-elemental metal, e.g., no more than 75, 62.5, 50, 40, 33, 25, 20, 15, 10, 7.5, 5, 4, 3, 2, 1, 0.5, or 0.1 wt. % elemental metal and/or at least 50, 60, 70, 75, 80, 85, 90, 91, 92, 92.5, 93, 94, 95, 96, 97, 97.5, 98, 99, 99.1, 99.5, or 99.9 wt. % metal oxide, relative to the total substrate weight, such as one or more transparent conducting oxides; and a porous nanoparticle film, comprising copper oxide and carbon, e.g., at least 50, 60, 70, 75, 80, 85, 90, 91, 92, 92.5, 93, 94, 95, 96, 97, 97.5, 98, 99, 99.1, 99.5, or 99.9 wt. % of the total film weight, disposed on the substrate, generally without any intervening films, coatings, and/or surface treatments, wherein the porous nanoparticle film comprises, based upon energy dispersive x-ray spectroscopy, 10 to 20 atom. % (e.g., at least 10, 10.5, 11, 11.5, 12, 12.5, 13, 13.5, 14, 14.5, or 15 atom. % and/or up to 20, 19.5, 19, 18.5, 18, 17.5, 17, 16.5, 16, 15.5, 15, 14.5, or 14 atom. %) of carbon, 35 to 60 atom. % (e.g., at least 35, 36, 37, 38, 39, 40, 41, 42, 43, 44, 45, 46, 47, 48, 49, or 50 atom. % and/or up to 60, 59, 58, 57, 56, 55, 54, 53, 52, 51, 50, 49, 48, 47, 46, or 45 atom. %) of copper, and 25 to 50 atom. % (e.g., at least 25, 26, 27, 28, 29, 30, 30.5, 31, 31.5, 32, 32.5, 33, 33.5, 34, 34.5, or 35 atom. % and/or up to 50, 49, 48, 47, 46, 45, 44, 43, 42, 41, 40, 39.5, 39, 38.5, 38, 37.5, 37, 36.5, 36, 35.5, 35, 34.5, 34, 33.5, 33, 32.5, 32, 31.5, 31, 30.5, or 30 atom. %) of oxygen. The catalyst layer may consist essentially of copper, copper oxide(s), carbonate, bicarbonate, and/or carbon, or may comprise at least 75, 80, 85, 90, 92.5, 95, 97.5, 98, 99, 99.1, 99.5, or 99.9 wt. % of the catalytic layer. The substrate need not contribute any more than 10, 8, 7.5, 7, 6, 5, 4, 3, 2.5, 2, 1, 0.5, 0.1, 0.01, or 0.001% of the oxygen evolution reaction (OER) catalytic effect. Moreover, any components additional to the aforementioned components will generally not materially affect the basic and novel onset potential by more than 5, 4, 3, 2.5, 2, 1, or 0.5% under conditions excluding such additional components.

The substrate/support may be a non-elemental metal for relevant applications, such as a transparent metal oxide, a metal oxide, a glass (or metalloid oxide), a ceramic, a plastic (particularly fluorinated plastics and/or outer coatings on plastics, ceramics, or metal oxides, e.g., PTFE, PVDF, PHFP, PFCA, PPVE, and/or PMVE, as well as polystyrenes, polyolefins (PE, PP, XPE, etc.), polyimides, polyethersulfones, polyamides, and the like.

The porous nanoparticle film may comprise an optionally crystalline Cu$_8$O phase, an optionally crystalline CuO phase, and/or an optionally amorphous Cu$_2$O phase. In the catalytic layer, the CuO phase may make out the largest component phase, either by volume, weight, or mol. %, e.g., at least 15, 20, 25, 30, 33, 35, 37.5, 40, 42.5, 45, 47.5, 50, 52.5, 55, 57.5, 60, 62.5, 65, 67.5, or 70%. The CuO phase and/or the Cu$_2$O phase may constitute 40, 33, 25, 20, 15, 10, 7.5, 5, 4, 3, 2, 1, or 0.5% of the copper oxide phases or remainder of the catalytic layer, disregarding the carbon content.

The atomic ratio of the copper to the oxygen in the porous nanoparticle film may be in a range of from 1.175 to 1.6:1, measured by energy dispersive x-ray spectroscopy. The atomic ratio of the copper to carbon in the porous nanoparticle film may be in a range of from 2.25:1 to 5:1, measured by energy dispersive x-ray spectroscopy. The atomic ratio of copper to oxygen in inventive catalysts may be, e.g., at least 1.175, 1.2, 1.2125, 1.225, 1.2375, 1.25, 1.2625, 1.275, 1.2875, 1.3, 1.3125, 1.325, 1.3375, 1.35, 1.3625, or 1.375 to 1 and/or up to 1.6, 1.575, 1.55, 1.525, 1.5125, 1.5, 1.4875, 1.475, 1.4625, 1.45, 1.4375, 1.425, 1.4125, 1.4, 1.3875, or 1.375 to 1. The atomic ratio of copper to carbon in inventive catalysts may be, e.g., at least 2.25, 2.375, 2.5, 2.625, 2.75, 2.875, 3, 3.125, or 3.25 to 1 and/or up to 5, 4.75, 4.5, 4.25, 4.125, 4, 3.875, 3.75, 3.625, 3.5, 3.375, or 3.3 to 1. The atomic ratio of oxygen to carbon in inventive catalysts may be, e.g., at least 1.75, 1.875, 2, 2.05, 2.1, 2.125, 2.15, 2.175, 2.2, 2.25, 2.3, 2.35, 2.375, or 2.4 to 1 and/or up to 3.25, 3.125, 3, 2.95, 2.9, 2.85, 2.8, 2.75, 2.7, 2.67, 2.65, 2.6, 2.55, 2.5, 2.45, 2.4, or 2.375 to 1. The carbon content of inventive catalysts may be, e.g., at least 11.25, 11.5, 11.75, 12, 12.25, 12.5, 12.75, 13, 13.25, 13.5, 13.75, or 14 atom. % and/or no more than 20, 19.5, 19, 18.5, 18, 17.75, 17.5, 17.25, 17, 16.75, 16.5, 16.25, 16, 15.75, 15.5, 15.25, 15, 14.75, 14.5, 14.25, or 14 atom. %, relative to all atoms, or all atoms of mass greater than 4 or 10 a.u. (e.g., measured by energy dispersive x-ray spectroscopy), in the catalyst.

The substrate may comprise at least 50, 60, 70, 75, 80, 85, 90, 91, 92, 92.5, 93, 94, 95, 96, 97, 97.5, 98, 99, 99.1, 99.5, or 99.9 wt. % of a transparent conductive oxide, relative to a total substrate weight. Inventive catalysts need not be upon a metal substrate, such as Cu or Ni, and may exhibit sufficient or better performance upon glass, ceramic, or non-conducting substrate, and/or may include no more than 50, 33, 25, 20, 15, 10, 7.5, 5, 2.5, 2, 1, or 0.1 wt. %, relative to the total substrate weight, of one or more elemental metals (i.e., in uncharged, non-oxidized form), such as Ni and/or Cu, individually or in combination. The support/substrate may include, e.g., indium tin oxide (ITO), aluminum-doped zinc oxide (AZO), indium zinc oxide (IZO), indium-doped cadmium oxide, barium stannate, strontium vanadate, calcium vanadate, or combinations of two or more of any of these. The substrate may have a resistivity, $\rho$, at 20° C. of at least $2.66 \times 10^{-8}$, $2.75 \times 10^{-8}$, $3 \times 10^{-8}$, $3.5 \times 10^{-8}$, $5 \times 10^{-8}$, $7.5 \times 10^{-8}$, $1 \times 10^{-7}$, $5 \times 10^{-7}$, $1 \times 10^{-6}$, $1 \times 10^{-5}$, $1 \times 10^{-4}$, or $1 \times 10^{-3}$ $\Omega \cdot m$ and or up to 100, 10, 1, 0.1, 0.01, $1 \times 10^{-3}$, or $1 \times 10^{-4}$ $\Omega \cdot m$. The substrate may have a conductivity, a, at 20° C. of no more than $1 \times 10^{7}$, $0.75 \times 10^{7}$, $0.5 \times 10^{7}$, $0.25 \times 10^{7}$, $1 \times 10^{6}$, $1 \times 10^{5}$, or $1 \times 10^{6}$ S/m. The substrate may comprise at least 75, 80, 85, 90, 92.5, 95, 97.5, 98, 99, 99.1, 99.5, or 99.9 wt. % (or any aforementioned percentage) indium tin oxide, relative to a total substrate weight Inventive catalysts may have an oxygen evolution reaction onset potential in 0.1 M KOH (and/or LiOH, NaOH, CsOH, and/or NH$_4$OH) solution of 1.40 to 1.70 V, e.g., at least 1.4, 1.41, 1.42, 1.43, 1.44, 1.45, 1.46, 1.47, 1.48, 1.49, or 1.5 V and/or up to 1.7, 1.68, 1.66, 1.65, 1.64, 1.63, 1.62, 1.61, 1.6, 1.59, 1.58, 1.57, 1.56, or 1.55 V, relative to the reversible hydrogen electrode. Inventive catalysts may have a current density of 9.5 to 15 mA/cm$^2$, e.g., at least 9.5, 9.75, 10, 10.25, 10.5, 10.75, 11, 11.25, 11.5, 11.75, 12, 12.25, or 12.5 mA/cm$^2$ and/or up to 15, 14.75, 14.5, 14.25, 14, 13.75, 13.5, 13.25, 13, 12.75, 12.5, 12.25, or 12 mA/cm$^2$, at a potential in 0.1 M KOH (and/or LiOH, NaOH, CsOH, and/or NH$_4$OH) solution of 1.59 V relative to the reversible hydrogen electrode.

Inventive catalysts may have a Tafel plot of over potential versus logarithm of current density that is linear with a slope of in a range of from 0.45 to 0.6, e.g., at least 0.45, 0.46, 0.47, 0.48, 0.49, 0.5, 0.505, 0.51, 0.515, or 0.52 and/or up to 0.6, 0.59, 0.58, 0.57, 0.56, 0.55, 0.54, 0.535, 0.53, 0.525, 0.52, 0.515, 0.51, 0.505, or 0.5.

Aspects of the invention provide electrochemical cells comprising any permutation of the inventive catalyst described herein and a basic electrolyte, e.g., 0.05, 0.1, 0.15, 0.2, 0.25, 0.3, 0.35, 0.4, 0.45, 0.5 and/or 2, 1.75, 1.5, 1.25, 1, 0.9, 0.8, 0.75, 0.7, 0.6, or 0.5 M hydroxide, such as KOH, LiOH, NaOH, CsOH, and/or NH$_4$OH, or a carbonate, propionate, formate, acetate, bicarbonate, aq. pyridine, aq. triethylamine, etc.

Aspects of the invention provide methods for making any permutation of the inventive catalyst described herein, which methods may comprise: spray and/or drop coating a nanoparticle dispersion (i.e., rather than electroplating, sputtering, or electrolytically depositing/electrodeposition, coating instead with a stream of fluidized) comprising copper ions and/or copper oxide(s), and carbonaceous anions, such as carbonate, bicarbonate, formate, acetate, propionate, oxalate, and/or citrate, onto the substrate, such a FTO or any of the substrates described herein, to obtain a coated substrate; and annealing the coated substrate at a temperature in a range of from 450 to 550° C., e.g., at least 450, 455, 460, 465, 470, 475, 480, 485, 490, 495, or 500° C. and/or up to 550, 545, 540, 535, 530, 525, 520, 515, 510, 505, or 500° C., to form the catalyst in the form of a carbon-containing copper oxide layer upon a preferably non-reactive substrate. The annealing may be performed directly after the coating or directly after air-drying the dispersion, which dispersion directly contacts the substrate, without intervening electrochemical or reactive process.

Aspects of the invention provide methods of conducting an oxygen evolution reaction, which method may comprise: contacting any permutation of the inventive catalyst described herein with an aqueous electrolyte solution, such as any electrolyte solution described herein or otherwise commercially available or known, having a pH of 8 to 14, e.g., at least 8, 8.25, 8.3, 8.33, 8.35, 8.4, 8.45, 8.5, 8.6, 8.67, 8.7, 8.75, 8.8, 8.9, 9, 9.25, 9.5, 9.75, or 10 and/or up to 14, 13.75, 13.5, 13.25, 13, 12.9, 12.8, 12.7, 12.6, 12.5, 12.4, 12.3, 12.2, 12.1, 12, 11.9, 11.8, 11.7, 11.6, 11.5, 11.4, 11.3, 11.2, 11.1, or 11; and applying a potential of 1.40 to 1.70 V, e.g., at least 1.4, 1.425, 1.433, 1.4375, 1.45, 1.4625, 1.475, 1.4875, 1.5, 1.5125, 1.525 V and/or up to 1.7, 1.69, 1.675, 1.667, 1.65, 1.6375, 1.633, 1.625, 1.6125, 1.6, 1.5875, 1.575, 1.5625, 1.55, 1.5375, 1.525, 1.5125, or 1.5 V (or any potential described above), to the electrocatalyst and a counter electrode immersed in the aqueous electrolyte solution.

Aspects of the invention provide methods of making an oxygen evolution reaction catalyst, particularly performing the electrolysis of water and/or the half-reaction for reducing protons to H$_2$ gas, which methods may comprise: spray or drop coating a nanoparticle dispersion comprising at least 50, 60, 70, 75, 80, 85, 90, 91, 92, 92.5, 93, 94, 95, 96, 97, 97.5, 98, 99, 99.1, 99.5, or 99.9 wt. %, as a percentage of non-solvent weight, of copper (for example, including copper oxide, copper ions, and counterions) and carbonaceous anions (for example, including carbonate, bicarbonate, and counterions) onto a substrate, outside of solution, to obtain a coated substrate; and annealing the coated substrate at a temperature in a range of from 350 to 650° C., e.g., at least 350, 375, 385, 390, 395, 400, 415, 425, 430, 440, 450, 452.5, 457.5, 462.5, 467.5, 472.5, 477.5, 482.5, 487.5, 492.5, 497.5, or 500° C. and/or up to 650, 633, 625, 615, 605, 600, 585, 575, 567, 560, 555, 552.5, 547.5, 542.5, 537.5, 532.5, 527.5, 522.5, 517.5, 512.5, 507.5, 502.5, or 500° C. (or any range or endpoint above), to form the catalyst.

The nanoparticle dispersion may be made by processes comprising: combining copper ions and bicarbonate or carbonate ions in an aqueous solution to form a precursor solution; optionally aging—e.g., for at least 1, 2, 5, 10, 15, or 20 minutes and/or up to 4, 3, 2, 1, 0.75, 0.5, 0.25, 0.125, 0.0625 days—the precursor solution at a temperature in a range of from 5 to 45° C., typically ambient or, e.g., at least 5, 7.5, 10, 12.5, 15, 17.5, 20, 22.5, or 25° C. and/or up to 45, 42.5, 40, 37.5, 35, 32.5, 30, 27.5, 25, 22.5, 20° C., to form a copper particle suspension; and optionally filtering or microfiltering the copper particle suspension to obtain the nanoparticle dispersion. The copper ions may be in the form of a nitrate, fluoride, chloride, perchlorate, bromide, bromate, iodide, iodate, chromate, fluorosilicate, selenate, selenite, sulfate, sulfite, pyrophosphate, tetrafluoroborate, formate, tartrate, citrate, and/or gluconate. Alternatively or additionally, the copper may be present as an oxide and/or partial oxide and/or organocopper complex. The bicarbonate and/or carbonate ions may be, for example, in the form of a $Li^+$, $Na^+$, $K^+$, $Cs^+$, $Rb^+$, $Mg^{2+}$, $Ba^{2+}$, $Sr^{2+}$, $Ca^{2+}$, $NH_4^+$, $NMeBu_4^+$, $N(CH_3)_4^+$, $NEt_4^+$, $Ag^+$, $Cu^{2+}$, pyridinium, and/or guanidinium, salt. The filtering/microfiltering may allow particles in an average particle size range of from 0.01 to 500 µm, e.g., at least at least 0.01, 0.05, 0.1, 0.15, 0.25, 0.5, 0.75, 1, 2.5, 5, 7.5, 10, 15, or 25 µm and/or up to 500, 450, 400, 350, 300, 250, 200, 150, 100, 90, 80, 75, 70, 65, 60, 55, 50, 45, 40, 35, 30, 25, 20, 15, 10, 8, 6, or 5 µm.

Inventive catalyst layer may have a volume porosity, i.e., non-filled space versus space occupied by copper oxide and/or carbonaceous matter, of at least 10, 15, 20, 25, 30, 33, 35, 37.5, 40, 42.5, 45, 47.5, 50, 52.5, 55, 57.5, or 60% and/or up to 75, 70, 67, 65, 60, 55, 50, 47.5, 45, 42.5, 40, 37.5, 35, 32.5, 30, 27.5, or 25%. The aggregation of the nanoparticles (i.e., spheroid copper oxide particles) in the catalytic layer may take the form of a diffusion limited cluster aggregation (DLCA) or a reaction limited cluster aggregation (RLCA), but generally manifests a structure akin to a compact RLCA aggregation. The copper oxide particles in the catalytic layer upon the substrate/support may have an average sphericity of at least 0.91, 0.915, 0.92, 0.925, 0.93, 0.935, 0.94, 0.945, 0.95, 0.955, 0.96, 0.965, 0.97, 0.975, 0.98, 0.985, or 0.99.

Inventive catalysts may exclude Mn, Ir, Rh, Ru, Re, Os, Pt, Pd, Au, Ag, and/or Ni, or may contain no more than 5, 4, 3, 2.5, 2, 1, 0.5, 0.1, 0.01, 0.001, 0.0001, or 0.00001 wt., relative to total catalyst weight, and/or no more than 75, 50, 45, 40, 35, 30, 25, 20, 15, 10, 5, 2.5, or 1 atom. %, relative to copper, of such metal(s), individually or in combination. In addition or separately, inventive catalysts may exclude Mn, Zn, Sc, Co, Fe, Ta, Sn, Nb, W, Ti, Va, Cr, Ni, Mo, Y, La, Nd, Er, Gd, Yb, and/or Ce, or may contain no more than 5, 4, 3, 2.5, 2, 1, 0.5, 0.1, 0.01, 0.001, 0.0001, or 0.00001 wt. %, relative to total catalyst weight, and/or no more than 75, 50, 45, 40, 35, 30, 25, 20, 15, 10, 5, 2.5, or 1 atom. %, relative to copper, of such metal(s), individually or in combination. In addition or separately, inventive catalysts may exclude F, Cl, Br, I, S, Se, Te, N, P, As, Sb, Bi, and/or Al, or may contain no more than 20, 17.5, 15, 12.5, 10, 7.5, 5, 4, 3, 2.5, 2, 1, 0.5, 0.1, 0.01, 0.001, 0.0001, or 0.00001 wt. %, relative to total catalyst weight, of such element(s), individually or in combination.

The onset potential of inventive electrocatalysts may be under or no more than 1.48, 1.475, 1.47, 1.465, 1.46, 1.455, or 1.45 V vs RHE in 1 M KOH, and/or the Tafel slope of inventive electrocatalysts may be under or no more than 59, 58, 57, 56.5, 56, 55.5, 55, 54.5, 54, 53.5, 53, 52.5, or 52 mV/dec.

Aspects of the invention provide colloidal, copper-based electrocatalytic systems suitable for water oxidation, optionally nanotextured and/or obtainable from facile Cu-colloidal nanoparticles (Cu-CNPs) preparative methods. Aspects of the invention include adding solutions comprising copper ions into a buffer comprising carbonate and/or bicarbonate, typically leading directly to a colloid formation as seen in FIG. 1. Aspects of the invention comprise surface deposited thin films of the inventive copper-colloidal nanoparticles (Cu-CNPs) generally having activity and stability during long-term water electrolysis experiments. Aspects of the invention provide, relative to other and/or non-noble metal water oxidation catalysts, copper-colloidal nanoparticle (Cu-CNP)-based electrocatalysts displaying initiation of the oxygen evolution reaction at an overpotential, η, of no more than 220 mV, for example, no more than 300, 275, 267, 260, 255, 250, 245, 240, 235, 232.5, 230, 227.5, 225, 222.5, 220, 217.5, or 215 mV.

Aspects of the invention comprise capture and/or transformation of solar energy into useful gaseous and/or liquid fuels, e.g., to meet expanding global energy demands while preferably allaying environmental apprehensions caused by combustion carbon-based fossil fuels. Aspects of the invention include the production of chemical fuels and/or useful organic, organometallic, and/or inorganic compounds with renewable energy, including sunlight, wind, nuclear fusion, hydroelectric, and/or hydrogen, and inexpensive feedstocks, particularly drawing on abundant supplies of protons and electrons to form the reduced products. Aspects of the invention provides employing water as a source of required protons and electrons, particularly making hydrogen from water splitting, to make clean and renewable fuel. Aspects of the invention comprise robust and sustained electrocatalytic water oxidation systems based on non-noble metal(s), particularly copper-centered catalytic assemblages. Aspects of the invention provide nanostructured electrocatalytic materials exhibiting high stability at low overpotential for water oxidation catalysis under generally benign conditions, preferably obtained by exploiting easily accessible, time effective and cost-effective Cu-colloids synthesis that can be easily scaled up. Aspects of the invention comprise photoelectrochemical and/or electrochemical water splitting, as well as energy conversion devices using such methods and catalysts.

EXAMPLES

Materials and Methods: Copper nitrate, $Cu(NO_3)_2 \cdot 3H_2O$, 99.99%; sodium bicarbonate, $NaHCO_3$, 95.5%; and potassium hydroxide, KOH, 99.99%, were obtained from Aldrich. Fluorine-doped tin oxide (FTO) glass slides with a resistivity less that 7 to 10 ohms/sq were obtained from Aldrich. All the solutions were made using ultrapure water with a Milli-Q resistivity of 18.2 MΩ/cm, with 2 to 4 ppb total organic contents.

Analytical Instrumentation: To confirm the formation of colloidal nanoparticles of the $M(OH)_x$ type, X-ray diffraction pattern (XRD) analysis using Rigaku-Dmax 3C diffractometer from the Rigaku Corp. (Tokyo, Japan) with Cu-Kα at $\lambda_{max}$ of 1.54056 Å radiation was conducted. The homogeneity and stability of the copper-colloidal nanoparticles (Cu-CNPs) were evaluated via zeta potential analysis and particle size distribution analysis conducted on Anton Paar's PSA analyzer. The nano-pattern electrocatalytic films obtained as described herein from the inventive copper-colloidal nanoparticles (Cu-CNPs) were characterized via scanning electron microscopy (SEM) using a NOVA FEI SEM-450 instrument equipped with an energy-dispersive x-ray spectroscopy (EDS, EDX, EDXS, or XEDS) detector. The surface composition of inventive films was investigated via energy dispersive X-ray compositional analysis using a NOVA FEI SEM-450 scanning electron microscopy (SEM) microscope equipped with EDX detector and x-ray photoelectron spectroscopy (XPS) on a PHI 5000Versa.probe 111 (ULVAC-PHI) x-ray photoelectron spectrophotometer. The crystallinity and phase of inventive thin film electrocatalysts were investigated via x-ray diffraction (XRD) pattern using a Rigaku-Dmax 3C diffractometer from the Rigaku Corp. (Tokyo, Japan) with Cu-Kα ($\lambda_{max}$ at 1.54056 Å) radiation. The catalytic phase of the exemplary catalysts was further scrutinized by RAMAN spectroscopy on an iRaman SN.17003 532 nm Raman spectrometer.

Preparation of $Cu(OH)_2$ and $Cu(OH)_2/HCO_3^-$ type colloids: Colloidal nanoparticles comprising $Cu(OH)_x$ and $HCO_3^-$ are preferably generated via a bicarbonate and/or carbonate buffer solution. To a 1.0 mL clear solution of 0.1 M $Cu(NO_3)_2.3H_2O$ (0.1 mmol) in water were added 0.02 mL (2 µmol) of 0.1 M $HCO_3^-$ buffer solution. The mixture was stirred at low speed for a while (e.g., about 100 rpm for 10-15 minutes) and allowed to stand for few minutes to obtain a cloudy/opaque dispersion of copper-colloidal nanoparticles (Cu-CNPs). The generalized reaction is shown below in Equation 1. Thereafter, the cloudy/opaque dispersion obtained is filtered using micro filter syringes to attain homogeneous copper-colloidal nanoparticles (Cu-CNPs). The homogeneity and average size of Cu-CNPs were investigated via particle size analyzer, as described below and shown, inter alia, in FIG. 2.

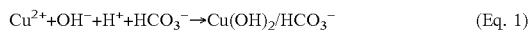

$$Cu^{2+} + OH^- + H^+ + HCO_3^- \rightarrow Cu(OH)_2/HCO_3^- \quad \text{(Eq. 1)}$$

Fabrication and characterization of nanoscale copper colloids-based water oxidation electrocatalyst: A thin film electrode or anode material suitable for water catalysis was generated via simple drop casting approach by placing $Cu(OH)_xHCO_3^-$ colloids (nanotextured) onto a fluorine-doped tin oxide (FTO) surface, air dried, then inserted into an electrochemical cell as the working electrode for water oxidation catalysis testing. To explore the structural and morphological modifications in the electrocatalytic films, the FTO slides coated with copper-colloidal nanoparticles (Cu-CNPs) were annealed at about 250 and 500° C. inside a furnace for about 1 hour.

Electrochemical measurements: The electrochemical investigations, including cyclic voltammetry, impedance, controlled potential water electrolysis (chronoamperometry), and controlled-current water electrolysis (chronopotentiometry) were carried out employing a standard three electrode system on a Autolab PG-Stat 10 computer-controlled potentiostat. Fluorine-doped tin oxide (FTO) coated glass slides with an exposed surface area, A, of 1 cm², coated with a thin film water oxidation electrocatalyst served directly as the working electrode. Prior to use, the FTO slides were carefully cleaned by sonicating the slides in methanol, ethanol, ultrapure water, and acetone as described in *Chemistry Select* 2018, 3, 11357-11366, which is incorporated by reference herein in its entirety.

A spiral-shaped platinum wire with a thickness of 1 mm was used as a counter electrode after cleaning by immersion in a 20 wt. % solution of nitric acid for few minutes before placing into the electrochemical system. A saturated silver/silver chloride, also designated "(sat.) Ag/AgCl." and a saturated calomel electrode, also designated "Hg/HgO," were used as reference electrodes in mildly alkaline electrolyte solutions. All the electrochemical measurements were performed in deoxygenated aqueous electrolyte solutions at room temperature. Glassware and electrochemical cell were cleaned as described in *J. Raman Spectros.* 2013, 44, 1195-1199, which is incorporated by reference herein in its entirety.

The thin film electrocatalysts coated on the FTO slides were directly placed in the electrochemical cell as an anode. The cyclic voltammograms were conducted in 0.1 M KOH electrolyte solution having pH≈13 by cycling the potential between −0.8 to +1.0 V (vs. Ag/AgCl) or +0.166 to +1.966 V (vs. RHE). The cyclic voltammograms were recorded at scan rates of 20, 10, and 2 mV/s.

Electrochemical impedance spectroscopy was undertaken to measure solution resistance ($R_s$) and charge transfer resistance ($R_{ct}$) of the electrode-electrolyte interphase. The solution resistance ($R_s$) and charge transfer resistance ($R_{ct}$) were obtained by fitting a simplest Randles circuit using NOVA 1.10 software on a Metrohm Autolab computer controlled potentiostat.

Calculations of electrochemical constraints: All the voltage potentials given here were converted into reversible hydrogen electrode (RHE) using the Nernst equation, given below in Equation 2.

$$E_{RHE} = E_{REF} + E^0_{REF} + 0.059 \text{ (pH)} \quad \text{(Eq. 2)}$$

wherein $E^0_{REF}$ for the Ag/AgCl reference is 0.197 V and for the saturated calomel electrode (SCE) is 0.2416 V.

The true polarization potential, $E_P$, was calculated from applied potential, $E_A$, measured current, I, in Ampere, and uncompensated resistance, $R_u$, as set forth in Equation 3.

$$E_P = E_A - IR_u \quad \text{(Eq. 3)}$$

wherein the uncompensated resistance, $R_u$, is referred to as solution resistance calculated from electrochemical impedance spectroscopy (EIS).

The overpotential, η, was calculated according to Equation 4, below.

$$\text{Overpotential}[\eta] = E_{RHE} - 1.23 \text{ V} \quad \text{(Eq. 4)}$$

Tafel slope calculation from cyclic voltammetry (CV) curve: The Tafel slope was calculated from cyclic voltammetry (CV) data, taking into account current density and overpotential, η, using the following Tafel equation set forth below in Equation 5, wherein b is the Tafel slope.

$$\eta = b \log J + a \quad \text{(Eq. 5)}$$

Tafel slope calculation from static chronoamperometry: The Tafel slopes obtained from polarization curves, such as cyclic voltammograms and linear sweep voltammetry, usually recorded at lower scan rate, such as 5, 1, and 0.1 mV/s, are actually not in steady state as current and overpotential are changing continuously with increasing time. Moreover, the capacitance of the interphase can significantly contribute to the total gas evolution current. Because of these deficiencies, it is believe to be more advantageous to derive Tafel plots from static electroanalytical techniques, such as chronoamperometry and chronopotentiometry, wherein the catalytic interphase is given sufficient time to attain a steady state and Tafel curves are plotted considering overpotential and current densities. The Tafel plots obtained by static chronoamperometry can more accurately reflect the intrinsic activity of the catalysts than those derived from voltammogram.

Current-potential data was collected by performing controlled-potential electrolysis (CPE) experiments at a variety of applied potentials. Typically, the current values are read after 8 to 10 minutes. Prior to data collection, the solution resistance was measured using a blank FTO electrode. The solution resistance of approx. 30Ω was used to correct the Tafel plot for IR (ohmic) drop.

Determination of electrochemically active surface area (ECSA) from charge passed under reduction peak: The electrochemically active surface area (ECSA) for exemplary Cu-CNPs/$FTO_{500}$ was determined by measuring the charge, $Q_{Cu,\ O}$, from the oxide reduction peak of its cyclic voltammetry (CV) curve, assuming that each surface Cu atom corresponds to one chemisorbed oxygen atom. The charge, $Q_{Cu,\ S}$, associated with a smooth Cu surface as reported in *J. Raman Spectros.* 2013, 44, 1195-1199, was taken to be 350

μC/cm². Based on these factors, the electrochemical surface area, ECSA, was calculated using Equation 6.

$$ECSA = \frac{Q_{Cu,0}}{Q_{Cu,s}} \quad \text{(Eq. 6)}$$

A volume of 20 to 30 μL of the inventive copper-colloidal nanoparticles (Cu-CNPs) was used for electrochemically active surface area (ECSA) measurements. The area under the reduction peak considering the redox couple of $Cu^{+3}$ to $Cu^{+2}$ measured directly from cyclic voltammetry (CV) curves was found to be $5.30 \times 10^{-5}$ VA.

Hence, the charge can be calculated as follows:

$5.30 \times 10^{-5}$ VA/0.02 $Vs^{-1}$=0.00265 As or 0.00265 Coulomb, and the electrochemically active surface area is calculated to be 7.5 cm².

Determination of surface Cu concentration from cyclic voltammetry (CV) curves: The charge passed, calculated by integrating the area under reduction peak from potential vs. current curve, is 0.00265 Coulomb. Therefore, the number of electrons, $n_e$, can be calculated based on Equation 7.

$n_e$=(0.00265 C)/(1.602×10$^{-19}$ C)=0.0016583×10$^{19}$ electrons (Eq. 7)

The surface concentration of the Cu atom on the electrode can be estimated by dividing by the number of electrons, $n_e$, involved in the copper redox reaction, which is 1 for $Cu^{+2}$ to/from $Cu^{+3}$. Therefore, the surface concentration of Cu atoms, $conc_{se}$, can be considered to be $conc_{se}$=0.0016583×10$^{19}$/1=0.0016583×10$^{19}$.

Determination of turn-over frequency (TOF) from integrated oxygen evolution reaction (OER) cyclic voltammetry (CV) curve: The turn-over frequency (TOF) can be calculated at 1.58 $V_{RHE}$ with an onset overpotential, η, of 0.35 V, as specific potential value. The turn-over frequency (TOF) can be calculated at varied potential values based on Equation 8.

$$TOF = \frac{I \times NA}{A \times n \times F \times r} \quad \text{(Eq. 8)}$$

wherein I is the current value at a specified potential in ampere, $N_A$ is Avogadro's constant (6.022×10$^{23}$); A is the geometrical area of the working electrode (1 cm²); N is the number of electrons; F is Faraday's constant (96485 C/mol); and r is the surface concentration of atoms on the electrode surface.

TOF@1.58 V=[0.0087×(6.022×10$^{23}$)]/[1×4×96485× (0.0016583×10$^{19}$)]=0.81 s$^{-1}$

Further details for the TOF calculation at different potentials is given in the paragraphs before Table 2.

Mass activity determination: The loading normalized current density or mass activity (MA) can be calculated according to Equation 9.

$$MA = \frac{J @ \text{specific } \eta}{\text{Active mass of catalyst}} \quad \text{(Eq. 9)}$$

Here, J is current density in mA at specific potential value. We choose 1.58 $V_{RHE}$ as the specific potential value. A corresponding mass activity of 87 mA/mg was obtained at 0.35 V. The mass activity was calculated at various applied potential and the resulting mass activity values are presented in FIG. 19 and Table 2.

Referring now to the drawings, wherein like reference numerals designate identical or corresponding parts throughout the several views.

FIG. 1 shows a pictorial representation of a method of preparing a suitable colloid within the scope of the invention, including adding solutions comprising copper ions into a buffer comprising carbonate and/or bicarbonate, typically leading directly to a colloid. FIG. 1 depicts copper-colloidal nanoparticles (Cu-CNPs) and fabrication process for the electrode and electrocatalyst material employed as an inventive water oxidation electrocatalyst.

The synthesis of colloidal-copper nanoparticles and fabrication of thin-film electrode/electrocatalyst system for water oxidation is outlines in FIG. 1. Copper colloid-based nanoparticles, $Cu(OH)_x/CuO_x$, were prepared by mixing $Cu^{2+}$ ions solution and carbonate/bicarbonate anionic electrolytes at a pH of 8.5. Once formed, the Cu-colloidal nanoparticles were coated on fluorine-doped tin oxide (FTO) substrates by simple drop casting to obtain a thin-film electrode coated with copper-colloidal nanoparticles (Cu-CNPs). The exemplary inventive films were then annealed at either 250 or 500° C. for one hour, annealing is preferably at a temperature of 250-500 in ambient air for about 1 hour to be tested for water oxidation catalysis.

Figure 2A:
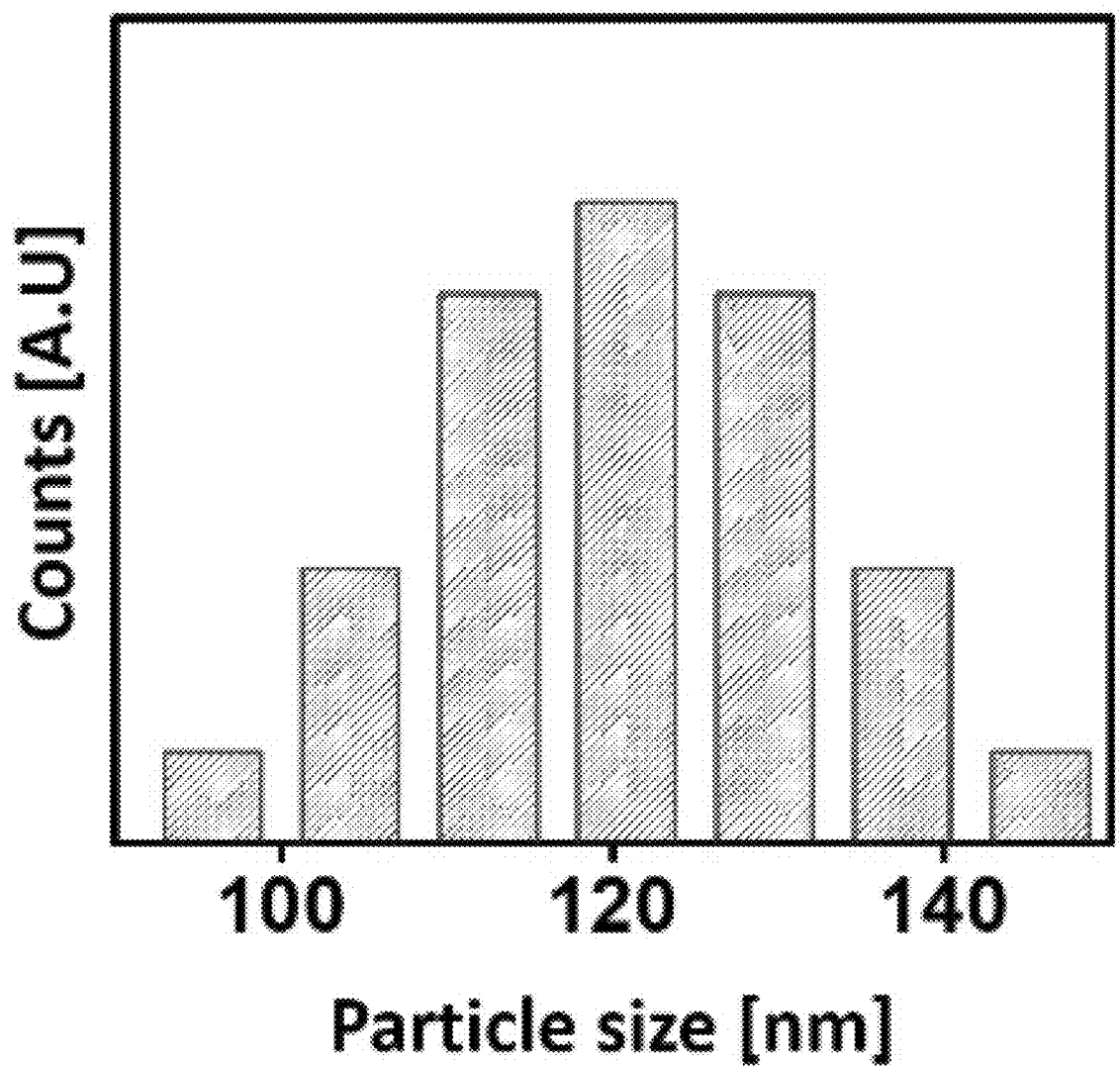
FIG. 2A shows a chart of the particle size distribution for the colloidal copper particles useful within the scope of the invention.
Figure 2B:
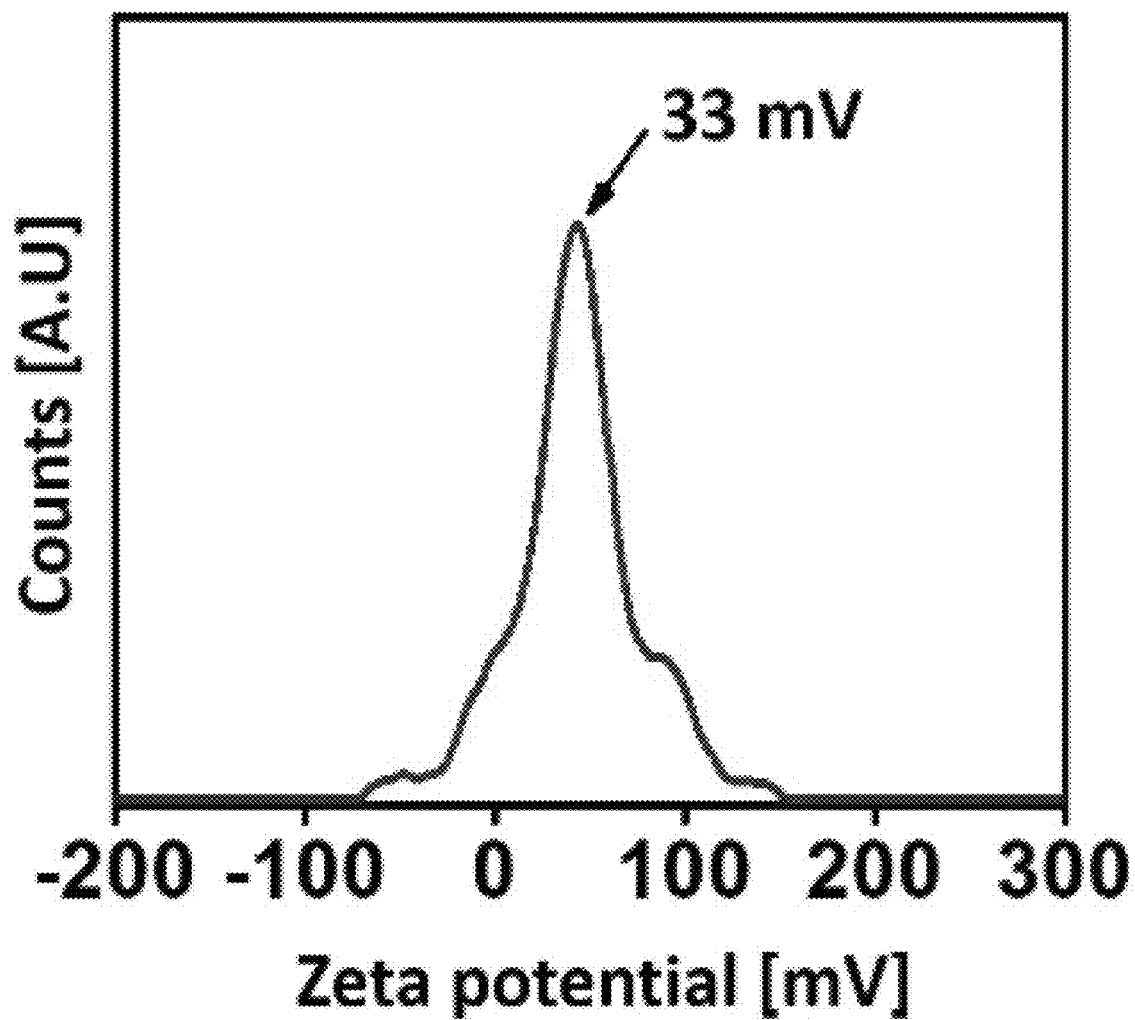
FIG. 2B shows a plot indicating the zeta potential of colloidal copper particles useful within the scope of the invention.
Figure 2C:
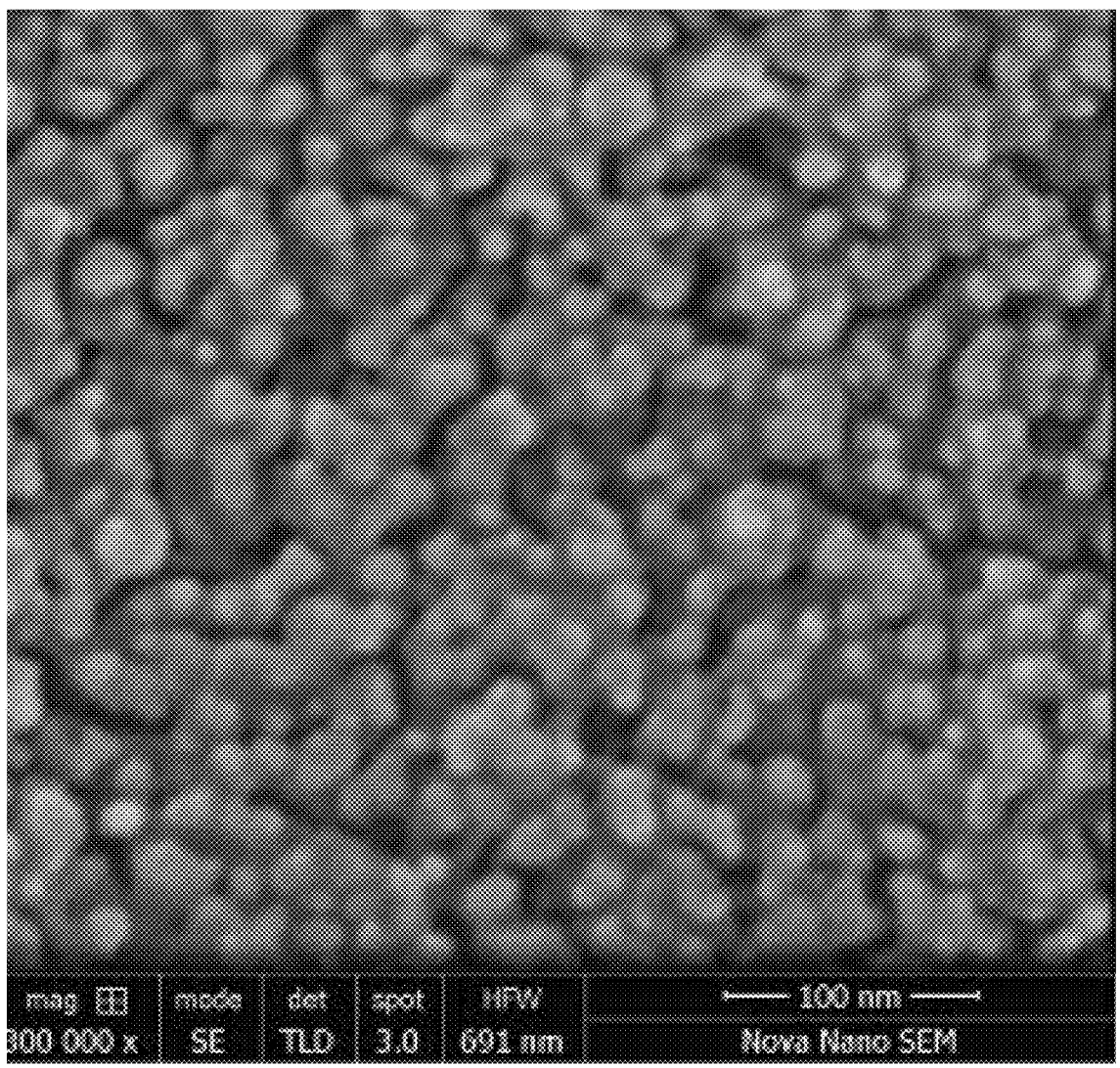
FIG. 2C shows a scanning electron microscope (SEM) image of colloidal copper particles useful within the scope of the invention.

FIG. 2A shows a chart of the particle size distribution of the copper-colloidal nanoparticles (Cu-CNPs), indicating a substantially symmetric distribution about roughly 120 nm average particle size, e.g., 120±1, 2.5, 5, 10, 15, 20, or 25 nm. FIG. 2B shows a zeta potential determination for an exemplary inventive catalytic material, i.e., approximately 33 mV, which may be a range of, e.g., at least 5, 10, 15, 20, 22.5, 25, 27.5, 30, 32.5, 33, 34, or 35 mV and/or up to 100, 85, 75, 70, 65, 60, 55, 50, 45, 42.5, 40, 37.5, 35, 34, 33, or 32.5 mV. FIG. 2C shows a scanning electron micrograph (SEM) image on 100 nm scale showing the agglomeration of nanoparticles in the surface morphology of inventive electrocatalyst layers. FIG. 2C shows a x-ray diffraction (XRD) spectrum for Cu-based colloidal nanoparticles developed in carbonate/bicarbonate based anionic electrolytes at a pH of 8.5.

The average particle size of the exemplary copper-colloidal nanoparticles (Cu-CNPs) was in the range of 100 nm to 140 nm showing good homogeneity, as seen in the chart in FIG. 2A. Copper-colloidal nanoparticles (Cu-CNPs) indicated a zeta potential of 33 mV showing good stability of the colloidal system in the carbonate buffer system, as seen in FIG. 2B. The stability of the exemplary colloids was observed to depend on the electrostatic interaction between the negatively capped nanoparticles. Therefore, the stability of the exemplary colloids can be controlled by carefully directing the concentration, pH, and volume of the electrolyte solution.

Scanning electron microscopic (SEM) imaging of the exemplary copper-colloidal nanoparticles (Cu-CNPs) demonstrates the size of nanoparticles to be in the range of 50 to 150 nm, but may be, for example, at least 25, 30, 35, 40, 45, 50, 55, 60, 65, 70, 75, 80, 85, 90, 95, or 100 nm and/or up to 500, 375, 250, 225, 200, 185, 175, 165, 155, 150, 145, 140, 135, 130, 125, 120, 115, 110, 105, or 100 nm. The exemplary nanoparticles were spherical or pseudo-spherical in shape and agglomerated with each other in form of clumps. The individual particles and agglomerations can be seen in the SEM image in FIG. 2C.

Figure 2D:
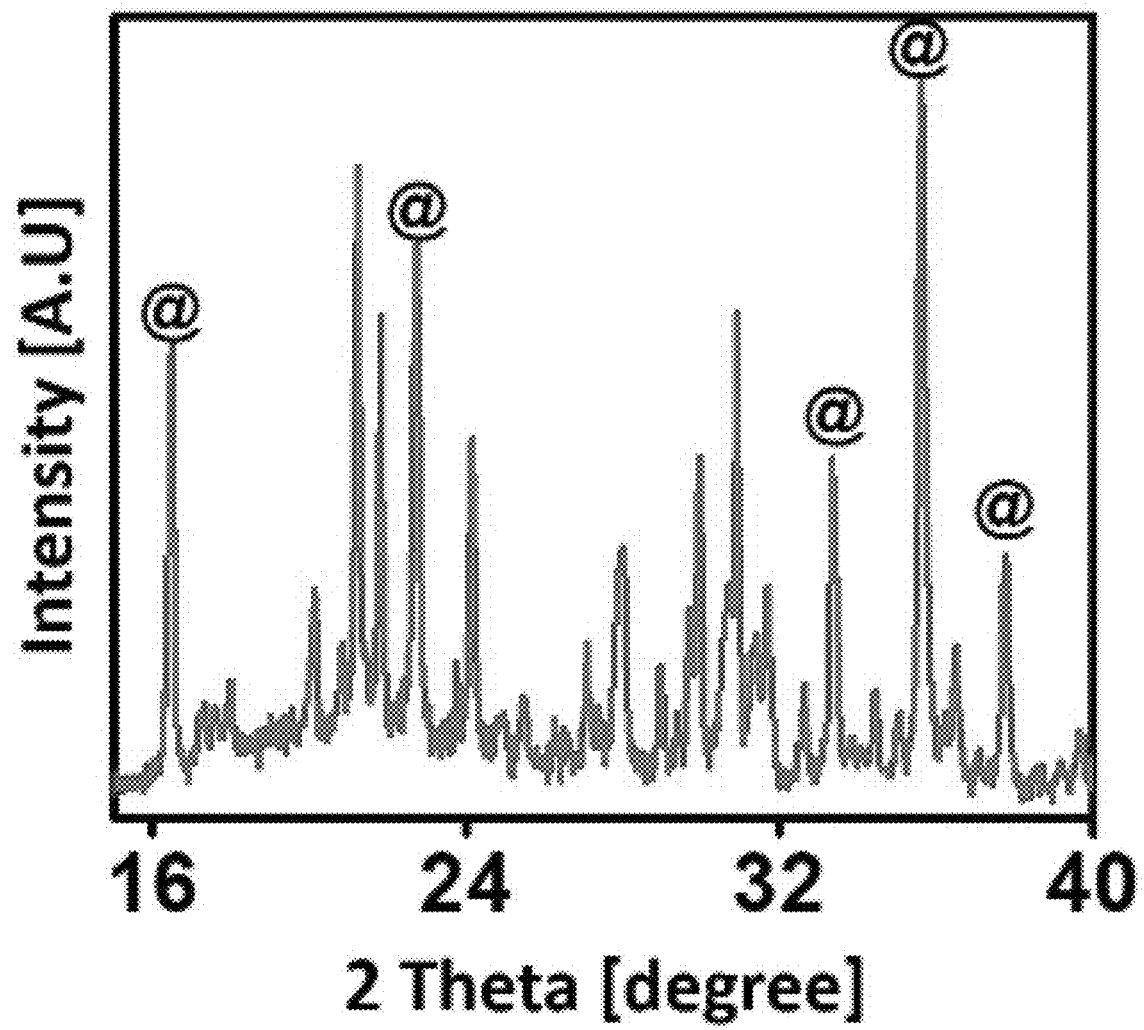
FIG. 2D shows an x-ray diffraction (XRD) pattern for Cu-based colloidal nanoparticles developed in carbonate/bicarbonate based anionic electrolytes at a pH of 8.5.

FIG. 2D shows an x-ray diffraction (XRD) pattern for Cu-based colloidal nanoparticles developed in carbonate/bicarbonate based anionic electrolytes at a pH of 8.5. The phase of the Cu-based colloidal nanoparticles was analyzed by x-ray diffraction pattern (XRD). The XRD spectrum for Cu based CNPs in the FIG. 2D signifies that the position and relative intensity of the 2θ peaks represented at 16.43°, 23°, 33.20°, 35.80°, and 37.80° match well with standard XRD data of $Cu(OH)_x$ as reported in *Adv. Mater. Lett.* 2015, 6, 51-54, which is incorporated by reference in its entirety herein. The data, including that shown in FIG. 2D, indicate that copper-based colloidal nanoparticles CNPs are stable and mainly comprises of Cu-hydroxide type materials.

Figure 3A:
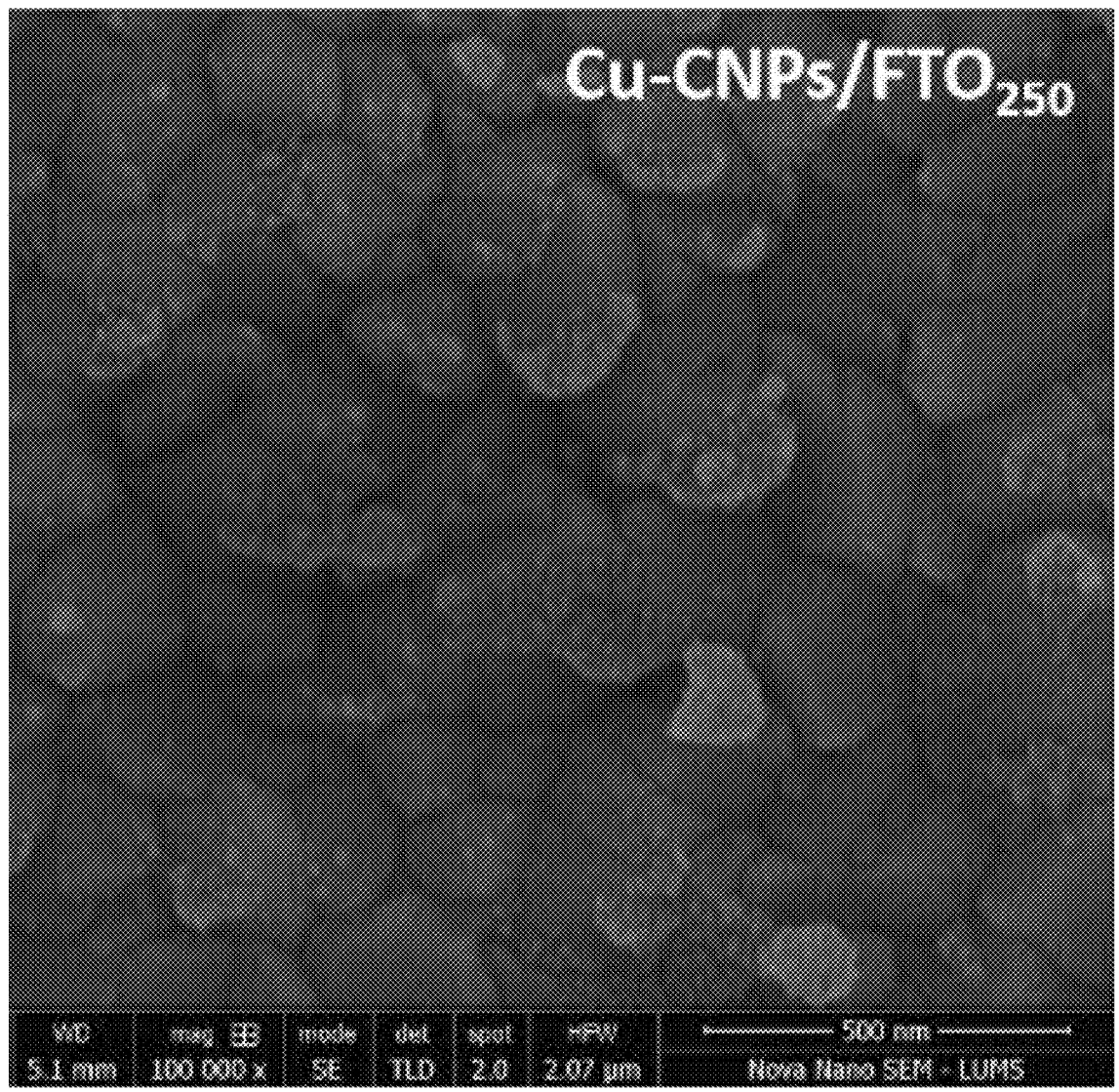
FIG. 3A shows an SEM image for a Cu-CNP/FTO$_{250}$ sample at 500 nm.

FIG. 3A shows a scanning electron microscope (SEM) image for a Cu-CNP/$FTO_{250}$ sample, i.e., annealed for roughly 1 hour at 250° C., on 500 nm scale. The Cu-CNP/$FTO_{250}$ sample shows a jagged, discontinuous "mountain-ridge and valley" structure, with pseudo-geometric, directly abutting/agglomerated (without voids) prism form, somewhat in less symmetric form of a 30-60° rhombille pattern, but not completely amorphous. The longest average dimension of the pattern in FIG. 3A may be, e.g., at least 100, 150, 200, 250, 300, 325, 350, 375, 400, 425, or 450 nm and/or up to 600, 575, 550, 525, 500, 475, 450, 425, or 400 nm, and an average shortest (coplanar) dimension of, e.g., at least 25, 50, 60, 70, 75, 80, 85, 90, 95, 100, 115, or 125 nm and/or up to 400, 375, 350, 325, 300, 275, 250, 225, 200, 175, 150, 125, or 100 nm.

Figure 3B:
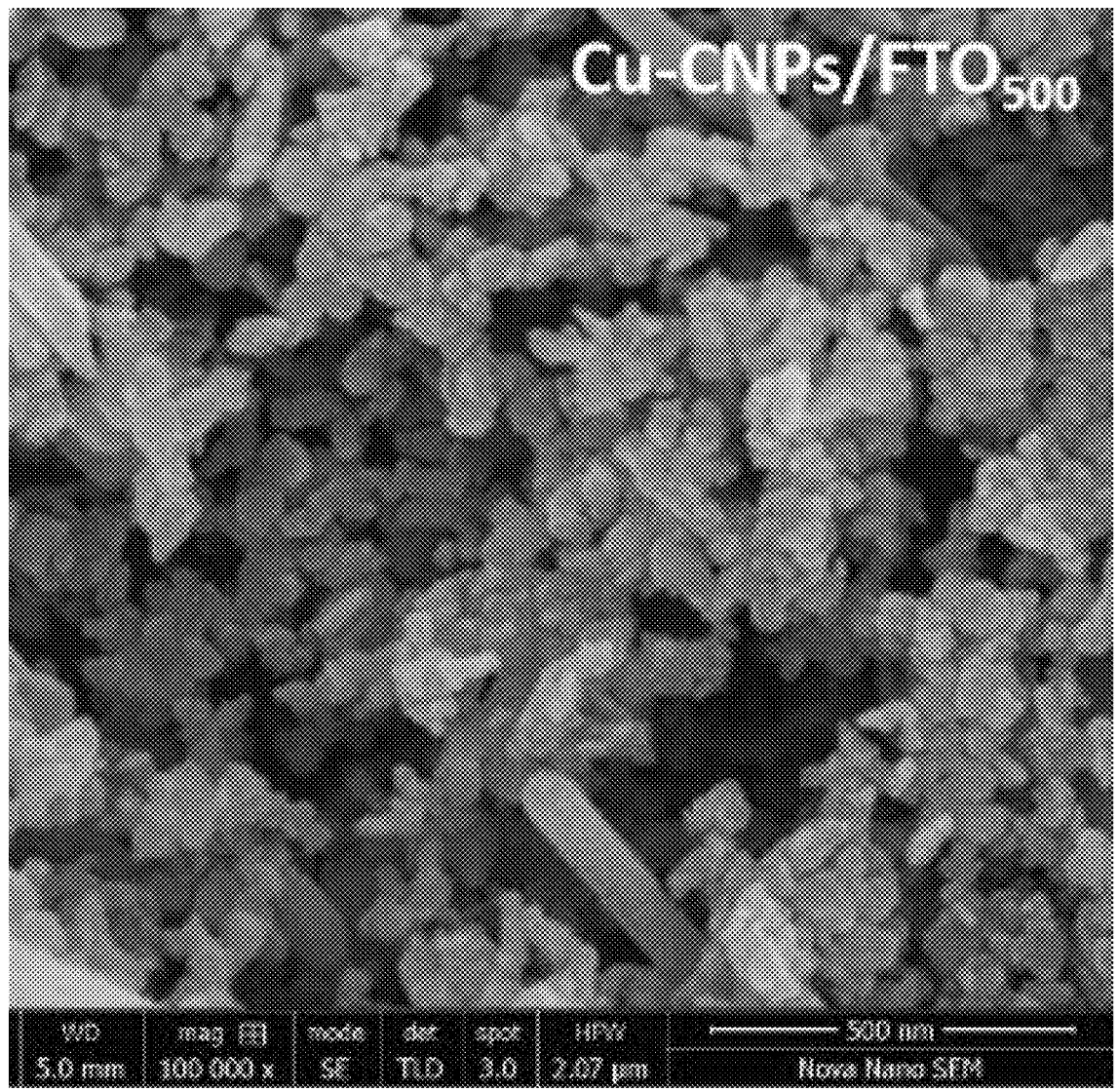
FIG. 3B shows an SEM image for a Cu-CNP/FTO$_{500}$ sample at 500 nm.
Figure 7A:
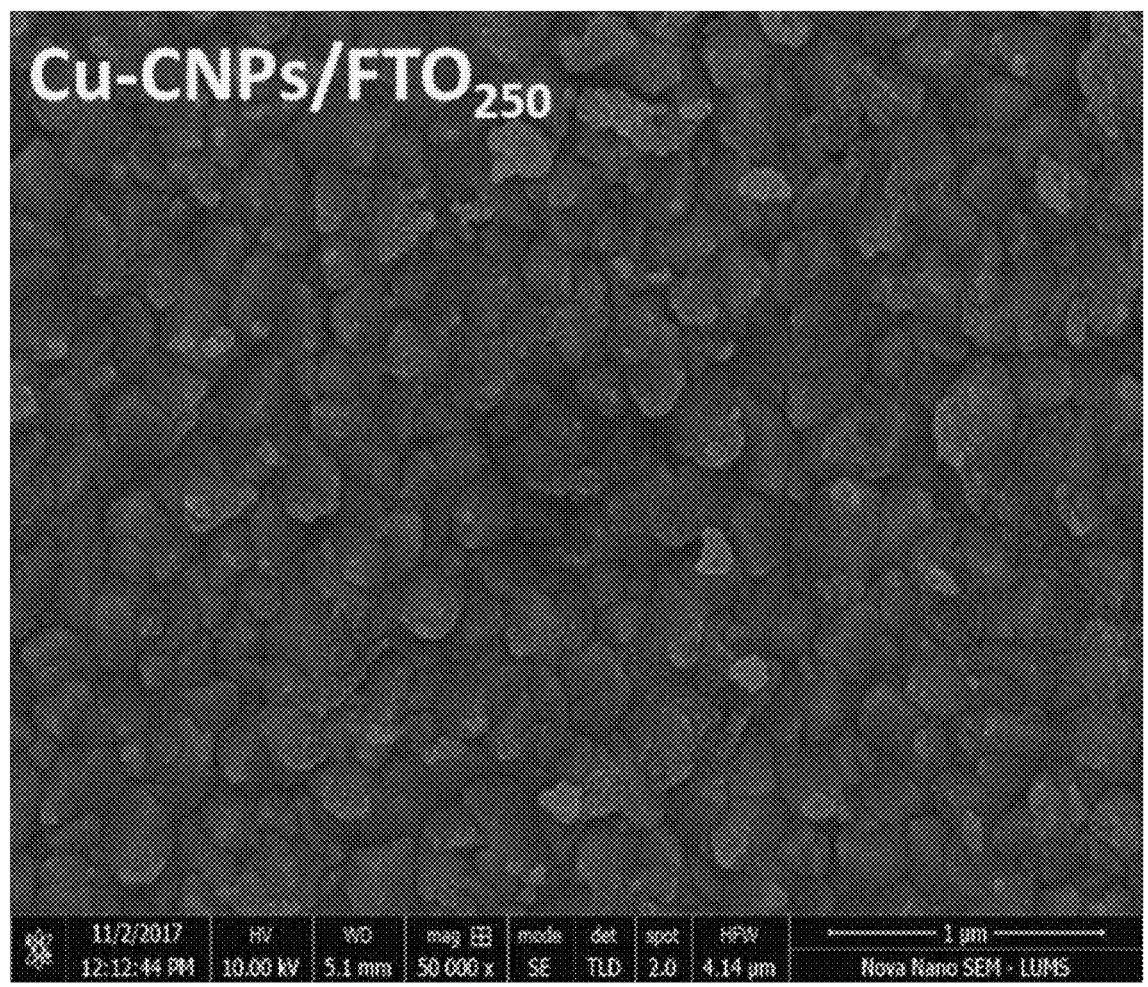
FIG. 7A shows an SEM image of an inventive Cu-CNPs/FTO$_{250}$ sample on 1 μm scale.
Figure 7B:
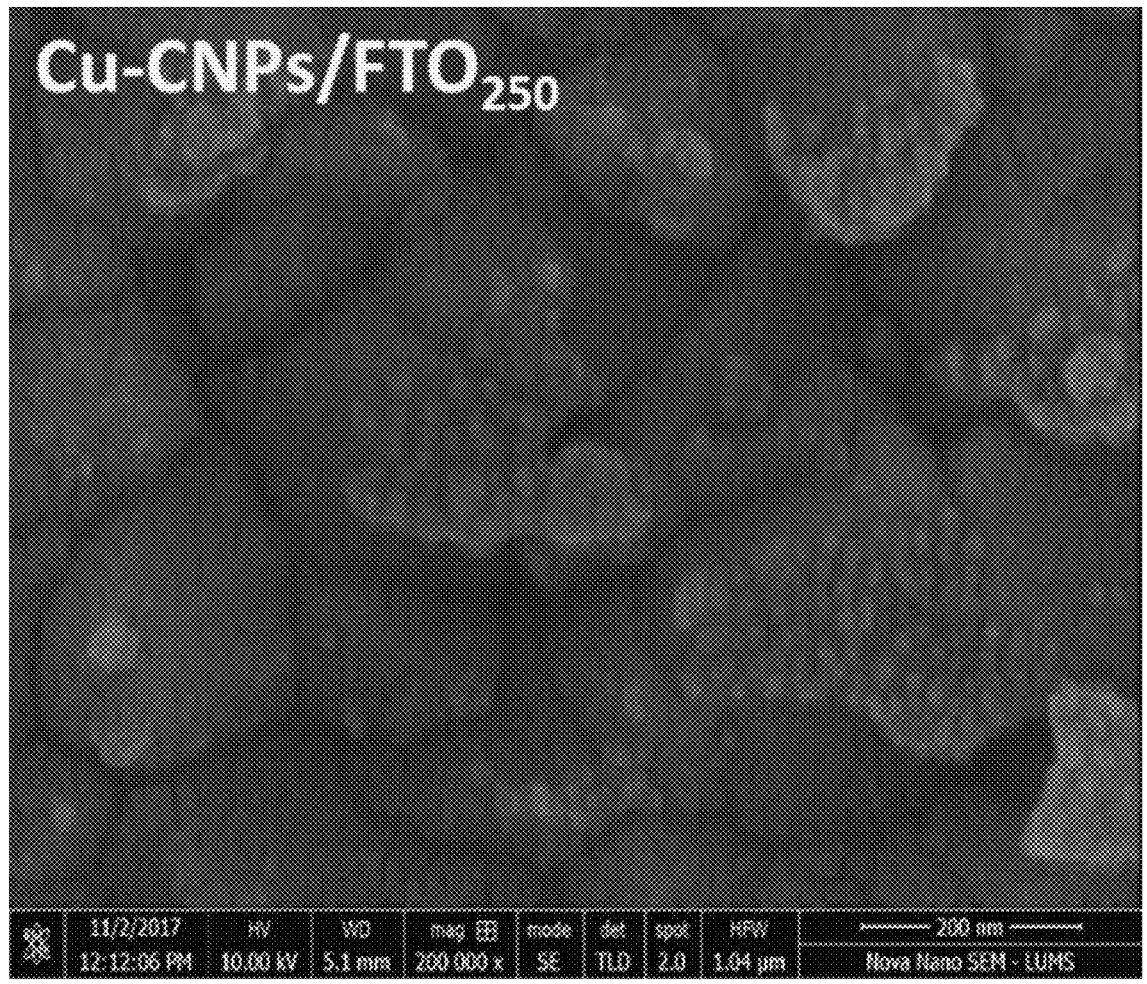
FIG. 7B shows an SEM image of an inventive Cu-CNPs/FTO$_{250}$ sample on 200 nm scale.
Figure 8A:
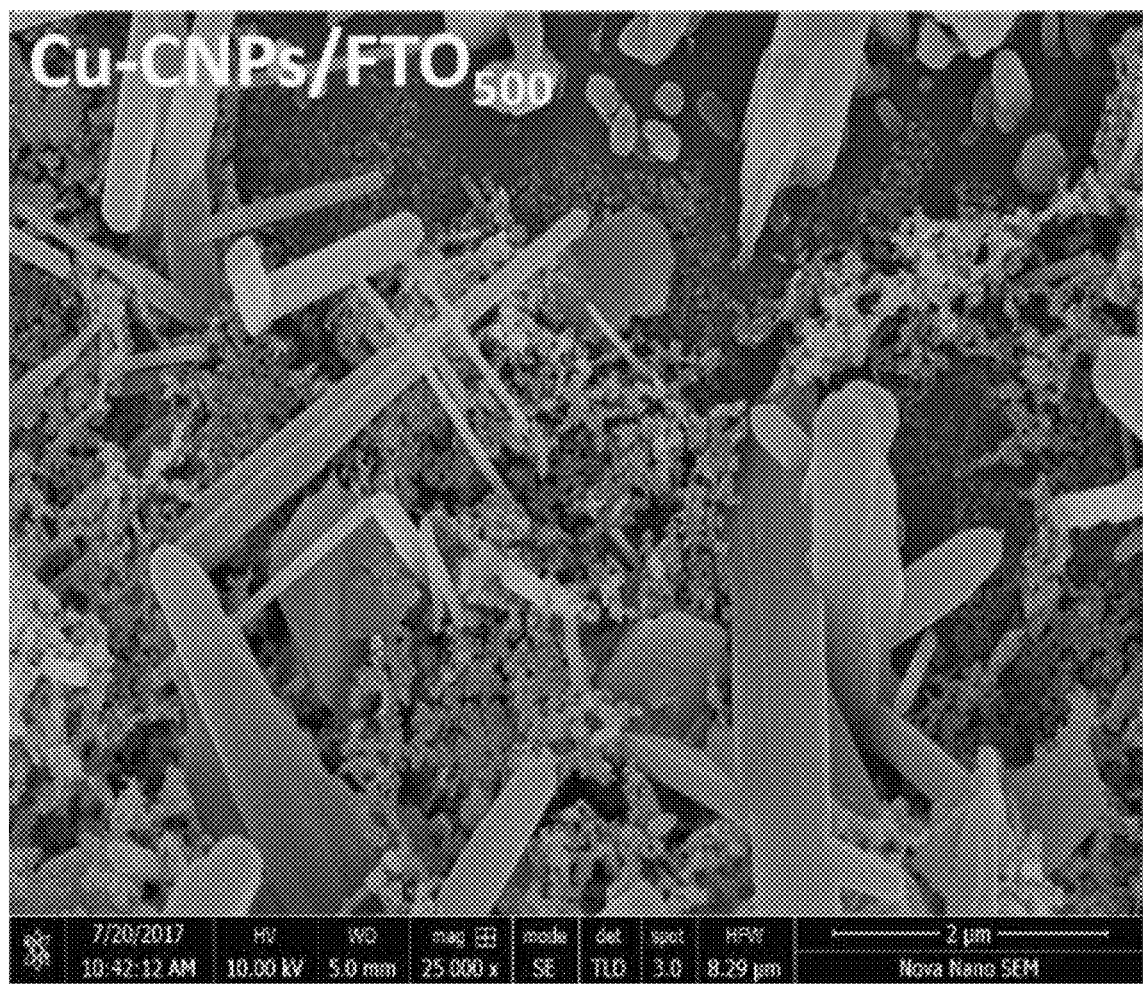
FIG. 8A shows an SEM image of an inventive Cu-CNPs/FTO$_{500}$ sample on 2 μm scale.
Figure 8B:
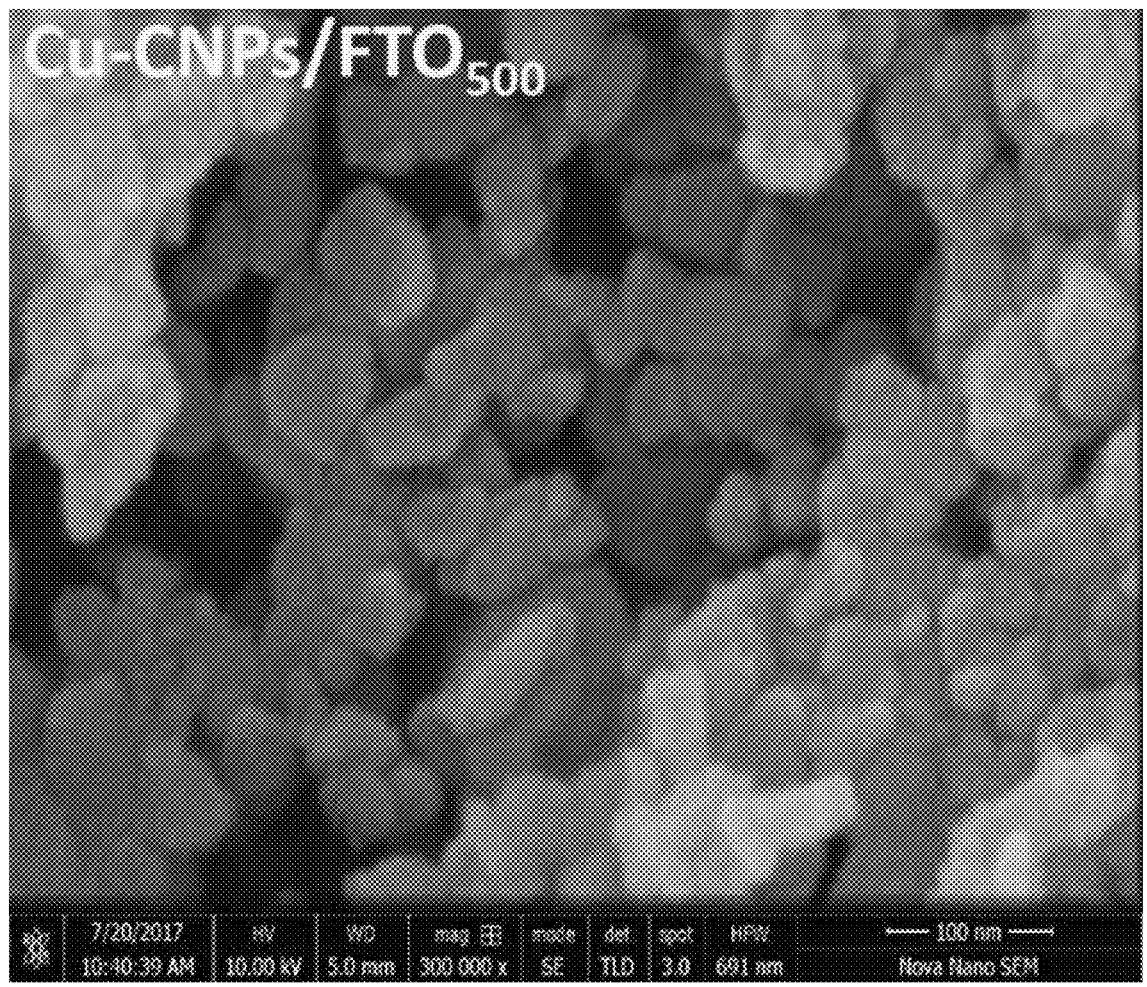
FIG. 8B shows an SEM image of an inventive Cu-CNPs/FTO$_{500}$ sample on 100 nm scale.

The annealing of copper-colloidal nanoparticle (Cu-CNP) thin films at 250° C., herein referred to as Cu-CNPs/$FTO_{250}$, and 500° C., herein referred to as Cu-CNPs/$FTO_{500}$, also generate an agglomerated nanoparticulate type morphology as seen in FIGS. 3A and 3B. However, Cu-CNPs/$FTO_{500}$ film exhibits more of a spongy nanoparticulate type texture, representing enhanced surface area of the thin film, which is seen in FIGS. 7A, 7B, 8A, and 8B. FIG. 7A shows an SEM image of an inventive Cu-CNPs/$FTO_{250}$ sample on 1 μm scale. FIG. 7B shows an SEM image of an inventive Cu-CNPs/$FTO_{250}$ sample on 200 nm scale. FIG. 8A shows an SEM image of an inventive Cu-CNPs/$FTO_{500}$ sample on 2 μm scale. FIG. 8B shows an SEM image of an inventive Cu-CNPs/$FTO_{500}$ sample on 100 nm scale.

Figure 3C:
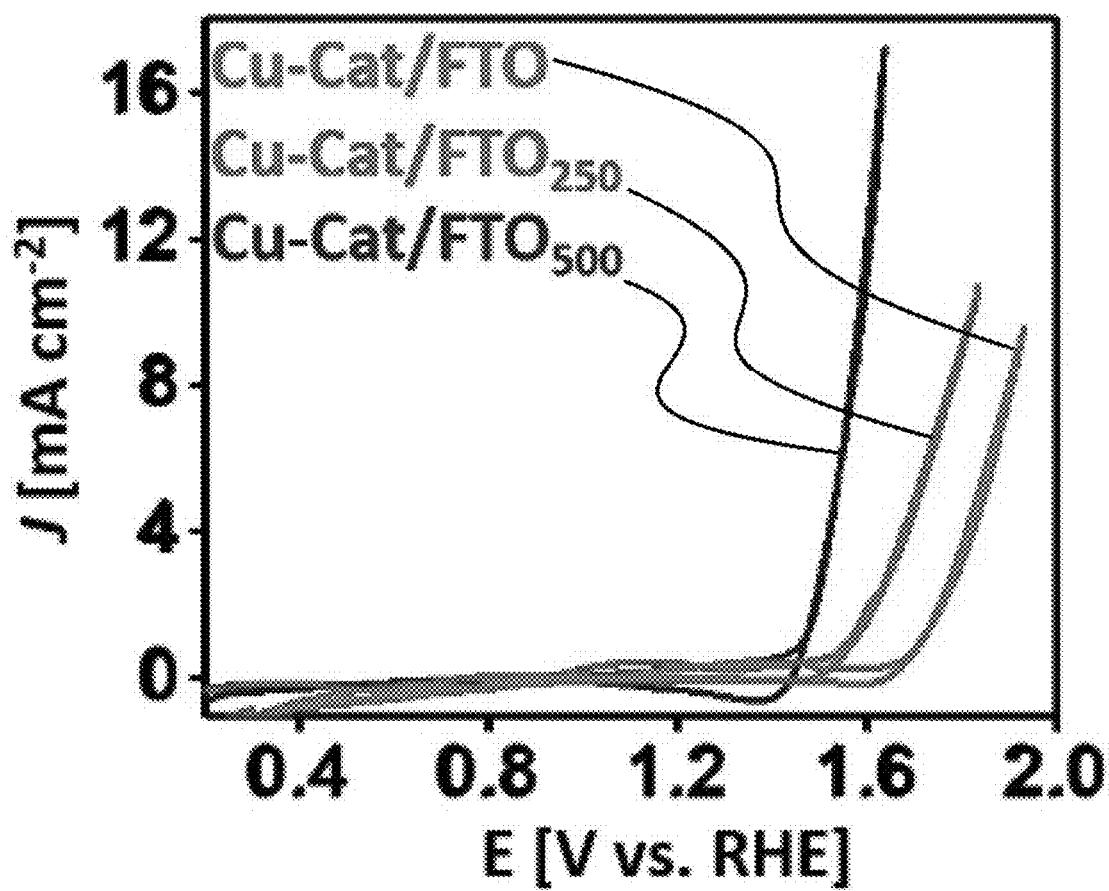
FIG. 3C shows forward potential sweeps for Cu-CNP/FTO, Cu-CNP/FTO$_{250}$, and Cu-CNP/FTO$_{500}$ at 2 mV/s.
Figure 3D:
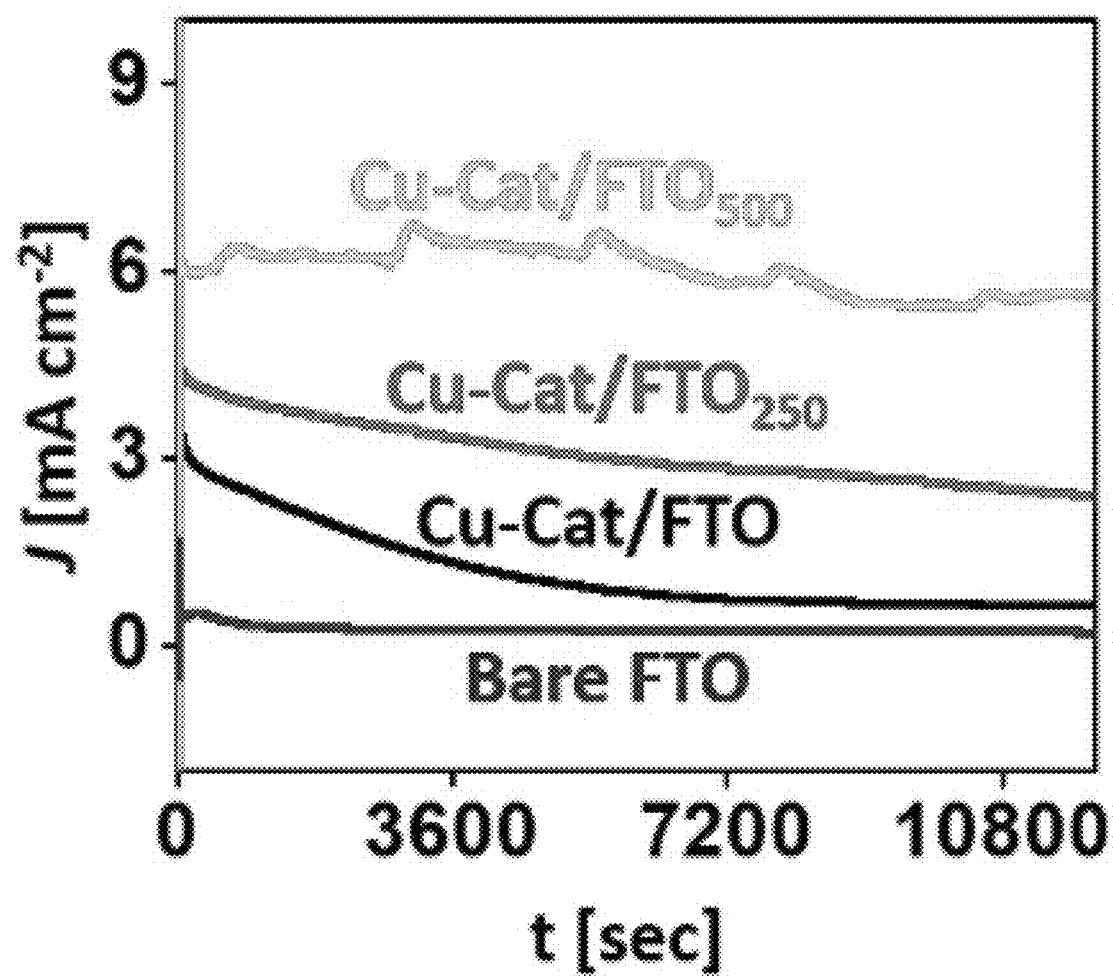
FIG. 3D shows short-term, time versus current density curves for bare FTO, Cu-CNP/FTO at 1.77 V$_{RHE}$, Cu-CNP/FTO$_{250}$ at 1.67 V$_{RHE}$, and for Cu-CNP/FTO$_{500}$ at 1.56 V$_{RHE}$ in 0.1 M KOH electrolyte solution.

For water oxidation studies, the cyclic voltammetry experiments were conducted in 0.1 M KOH solutions. The cyclic voltammetry (CV) profile of simple Cu-CNPs/FTO shows the appearance of oxidative current at about 1.1 $V_{RHE}$. The onset of oxygen evolution reaction (OER) originates at about 1.62 $V_{RHE}$ and the oxygen evolution reaction (OER) onset overpotential, η, of 390 mV, as seen in FIG. 3C. The cyclic voltammetry (CV) curve for Cu-CNPs/$FTO_{250}$ indicates pre-oxidative pre-features of copper at about 1.0 $V_{RHE}$ that are followed by a large catalytic peak at 1.57 $V_{RHE}$, along with the onset of oxygen evolution, as seen in FIG. 3D. A current density of greater than 10 mA/cm² is achieved just under the potential of 1.83 $V_{RHE}$. The oxygen evolution reaction (OER) onset overpotential, η, was determined to be 340 mV. For the Cu-CNPs/$FTO_{500}$ sample, the water oxidation reaction was observed to initiate at a potential of 1.45 $V_{RHE}$, with an overpotential of 220 mV, in a 0.1 M aq. KOH system.

FIG. 3B shows a scanning electron microscope (SEM) image of a Cu-CNP/$FTO_{500}$ sample, i.e., annealed for roughly 1 hour at 500° C., on 500 nm scale. The Cu-CNP/$FTO_{500}$ sample shows particulate (10 to 200 nm diameter) features agglomerated into structures of, e.g., at least 300, 350, 400, 450, 500, 550, or 600 nm and/or up to 1000, 900, 850, 800, 750, 700, 650, or 600 nm largest span, with roughly equivalent, e.g., at least 25, 30, 35, 40, or 50% and/or up to 60, 55, 50, or 45% (v/v), void volumes seen orthogonally to the two dimensional coating plane. The morphology also shows rod-shaped features in up to 20, 17.5, 15, 12.5, 10, 7.5, 5, or 2.5% (v/v) of the total surface volume, which rod-shaped features have a longest dimension of, e.g., at least 300, 350, 400, 450, 500, 550, 600, or 650 nm and/or up to 10000, 7500, 5000, 3500, 2500, 2000, 1500, 1000, 900, 800, 750, 700, 650, or 600 nm, and/or an aspect ratio (length:width) of, e.g., at least 1.5, 2, 2.5, 3, 3.5, 4, or 5:1 and/or up to 25, 20, 15, 12.5, 10, 9, 8, 7, or 6:1. By volume, the particulate morphological features versus the rod-like morphological features in the catalyst layer may be, for example, at least 2.5, 5, 7.5, 10, 12.5, 15, 17.5, 20, 25, 30, 33, 35, 37.5, 40, 45, or 50% and/or up to 85, 75, 70, 65, 60, 55, 50, 45, 40, 35, 30, or 25%.

FIG. 3C shows forward potential sweeps for Cu-CNP/FTO, i.e., not annealed, Cu-CNP/$FTO_{250}$, i.e., annealed for roughly 1 hour at 250° C., and Cu-CNP/$FTO_{500}$, i.e., annealed for roughly 1 hour at 500° C., at 2 mV/s. FIG. 3D shows short-term, time versus current density curves for bare FTO, Cu-CNP/FTO at 1.77 $V_{RHE}$, Cu-CNP/$FTO_{250}$ at 1.67 $V_{RHE}$, and for Cu-CNP/$FTO_{500}$ at 1.56 $V_{RHE}$ in 0.1 M KOH electrolyte solution.

From a comparative cyclic voltammetry (CV) analysis, it appears that the onset potential for water oxidation reaction shifts towards the more negative potential by applying the annealing and by increasing the annealing temperature up to 500° C. This can be observed in FIG. 3C. Without wishing to be bound to any particular theory, the more negative potential upon annealing may be due to the formation of more intense nanoscale catalytic structures by applying and increasing annealing temperature, which is evidenced by the SEM images in FIGS. 7 and 8. Annealing at 500° C. also produced a more porous catalytic film, thus presenting a comparatively larger number of active sites for efficient oxygen evolution reaction (OER), relative to the samples annealed at 250° C. or prepared without annealing.

Nanoscale porous materials are generally considered more efficient catalysts based upon their high surface areas which typically facilitate catalytic performance. Furthermore, adjacent nanoparticles on catalyst surface can favor O—O bond formation and evolution of molecular oxygen at a lower energy cost.

Figure 9:
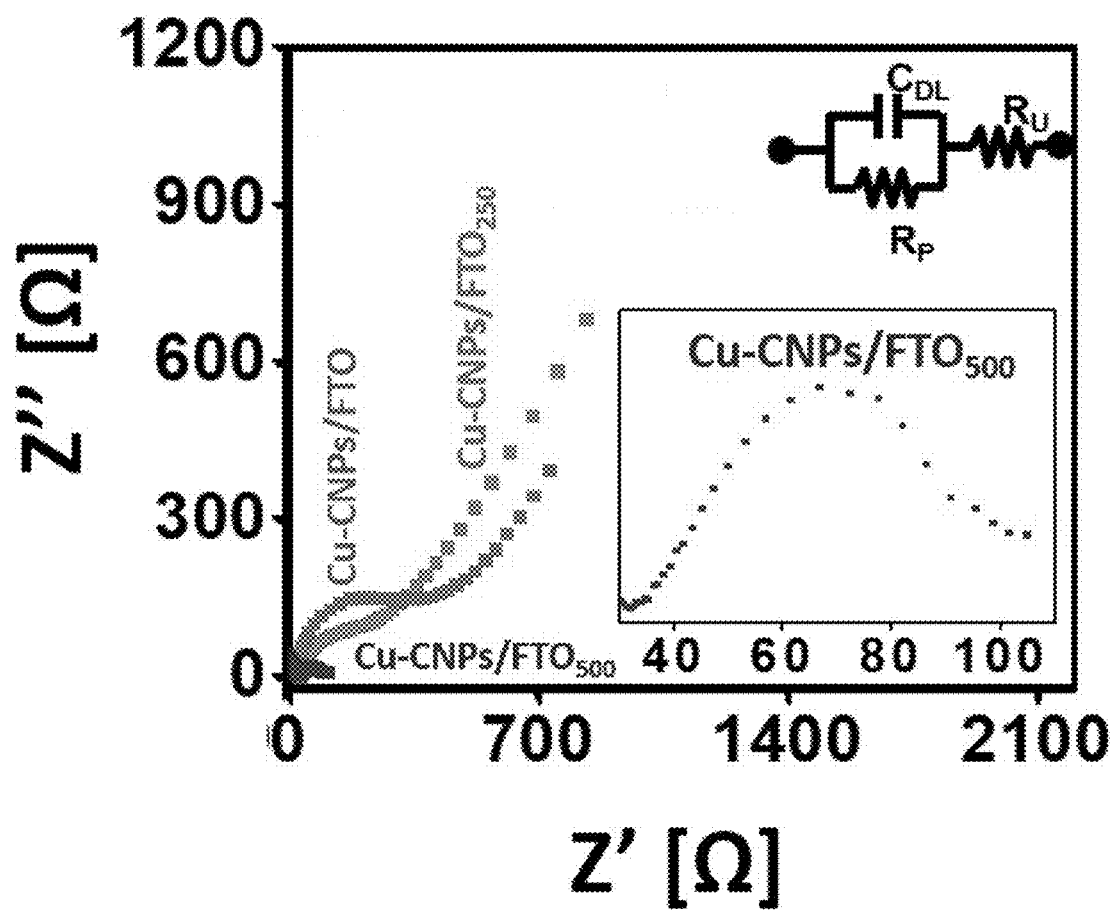
FIG. 9 shows Nyquist plots at 1.63 V$_{RHE}$ for exemplary Cu-CNPs/FTO, Cu-CNPs/FTO$_{250}$, and Cu-CNPs/FTO$_{500}$ electrocatalysts derived from Cu-colloids immobilized on FTO substrates, with an inset zoom of the Cu-CNPs/FTO$_{500}$ sample plot, the electrochemical impedance spectroscopy (EIS) being conducted in 0.1 M KOH solution at a pH of approx. 13 in the frequency range of 100K to 0.1 Hz.

FIG. 9 shows Nyquist plots at 1.63 $V_{RHE}$ for exemplary Cu-CNPs/FTO, Cu-CNPs/$FTO_{250}$, and Cu-CNPs/$FTO_{500}$ electrocatalysts derived from Cu-colloids immobilized on FTO substrates, with an inset zoom of the Cu-CNPs/$FTO_{500}$ sample plot, the electrochemical impedance spectroscopy (EIS) being conducted in 0.1 M KOH solution at a pH of approx. 13 in the frequency range of 100K to 0.1 Hz. Additional evidence potentially explaining the high efficiency of the Cu-CNPs/$FTO_{500}$ sample can be taken from a study of the charge transfer resistance at the electrode-electrolyte interface double layer via electrochemical impedance spectroscopy. The impedance data shows a lower charge transfer resistance for the Cu-CNPs/$FTO_{500}$ sample facilitating electron transfer at the interface, which facilitated electron transfer may also be attributed to the fine nanoscale surface structure of the copper-derived electrocatalyst, as seen in FIG. 9. Further annealing the samples did not appear to produce a profound reduction in the oxygen evolution reaction (OER) onset potential, and a 500° C. treatment is considered a preferred heating temperature for thin-film copper-colloidal nanoparticles (Cu-CNPs) sufficient to make efficient water oxidation electrocatalysts.

FIG. 3D shows short-term, time versus current density curves for bare FTO, Cu-CNP/FTO at 1.77 $V_{RHE}$, Cu-CNP/FTO$_{250}$ at 1.67 $V_{RHE}$, and for Cu-CNP/FTO$_{500}$ at 1.56 $V_{RHE}$ in 0.1 M KOH electrolyte solution. From short-term chronoamperometry analysis, the exemplary inventive Cu-CNPs/FTO electrocatalysts, i.e., derived from copper-colloidal nanoparticles (Cu-CNPs) deposited on FTO without applying post-annealing operations, were indicated to be insufficiently stable for robust usage desired, as seen in FIG. 3D. The non-annealed catalyst samples were observed to undergo 40% degradation under the harsh oxidative environment for water electrooxidation. Although the Cu-CNPs/FTO$_{250}$ sample catalyst, i.e., catalytic film coated on conductor surface followed by annealing at 250° C., showed comparatively higher stability of the electrocatalyst (relative to non-annealed analogs) for the oxygen evolution reaction with 20% degradation over time, as seen in FIG. 3D. The degradation of the exemplary inventive catalyst may be attributed to the crumbling of catalytic materials from the FTO surface, possibly due to the vigorous oxygen evolution. The disintegration of the catalyst and/or detachment the catalyst from the FTO surface during a short-term controlled potential electrolysis (CPE) experiment was also observed by the naked eye during the course of analysis. However, the time versus current density plot for the Cu-CNPs/FTO$_{500}$ sample electrocatalyst presented remarkable stability with no observable degradation, as seen in FIG. 3D. The high stability of the Cu-CNPs/FTO$_{500}$ sample catalyst may be attributed to the formation of finer, nanosized particulate-type CuO$_x$ structures on the FTO surface by annealing at 500° C., as indicated by SEM microscopy and x-ray photoelectron spectroscopy (XPS) studies discussed below.

Figure 10A:
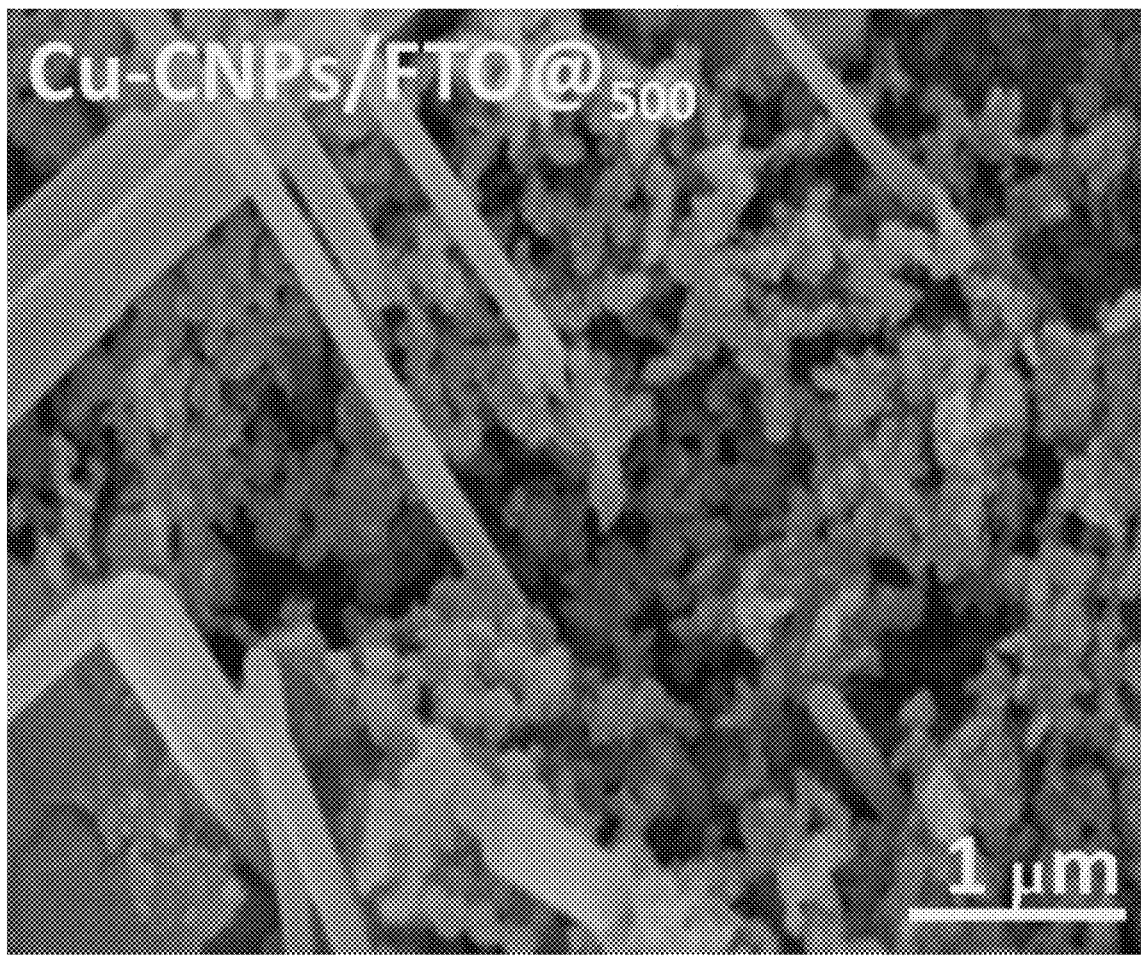
FIG. 10A shows an SEM image of an inventive Cu-CNPs/FTO$_{500}$ sample on 1 μm scale.
Figure 10B:
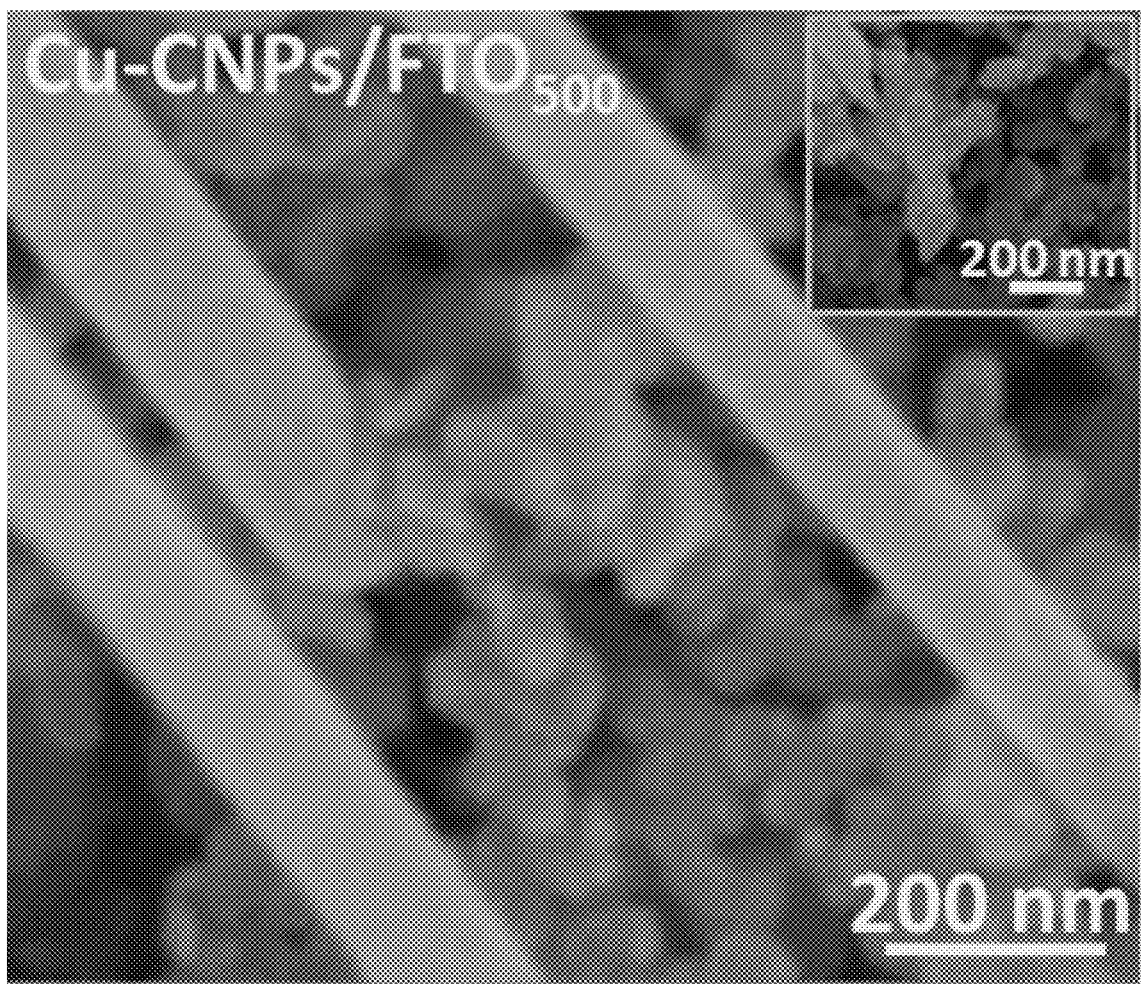
FIG. 10B shows an SEM image of an inventive Cu-CNPs/FTO$_{500}$ sample on 200 nm scale, with an inset showing a view of the nanosized bead-type structure.
Figure 10C:
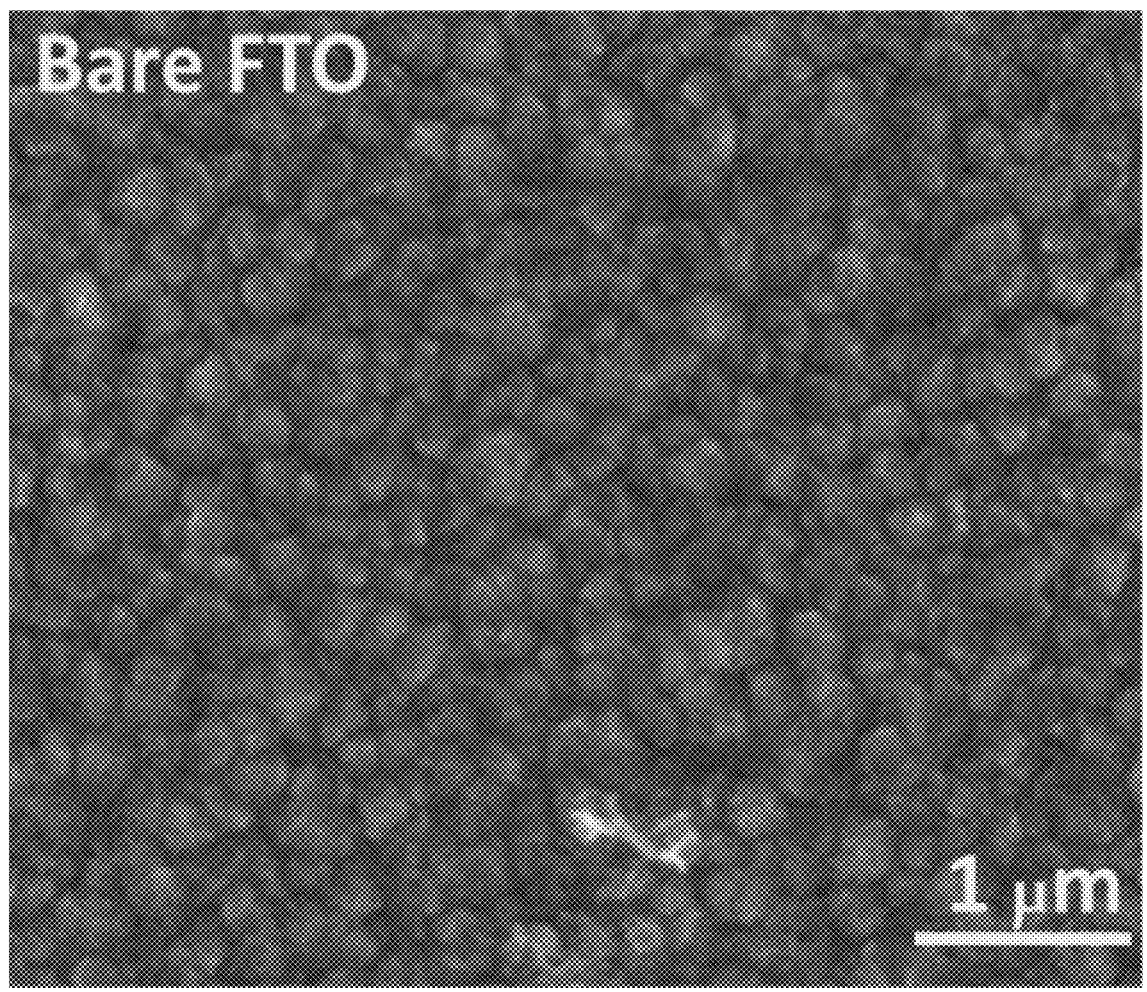
FIG. 10C shows an SEM image of a blank fluorine-doped tin oxide (FTO) slide.

FIG. 10A shows an SEM image of an inventive Cu-CNPs/FTO$_{500}$ sample on 1 μm scale, and FIG. 10B shows an SEM image of an inventive Cu-CNPs/FTO$_{500}$ sample on 200 nm scale with an inset showing a view of the nanosized bead-type structure. FIG. 10C shows an SEM image of a blank fluorine-doped tin oxide (FTO) slide. High-resolution scanning electron microscopy (HR-SEM) images for Cu-CNPs/FTO$_{500}$ samples revealed well pronounced nano-rods type morphological features, as seen in FIGS. 10A and 10B. The enlarged view of nanobead-type structures grown on FTO surface (FIG. 10B) indicates a narrow size distribution of nanoparticulate features, whereas such structural morphology was not observed for the plain FTO substrate (uncoated) seen in FIG. 10C.

Figure 10D:
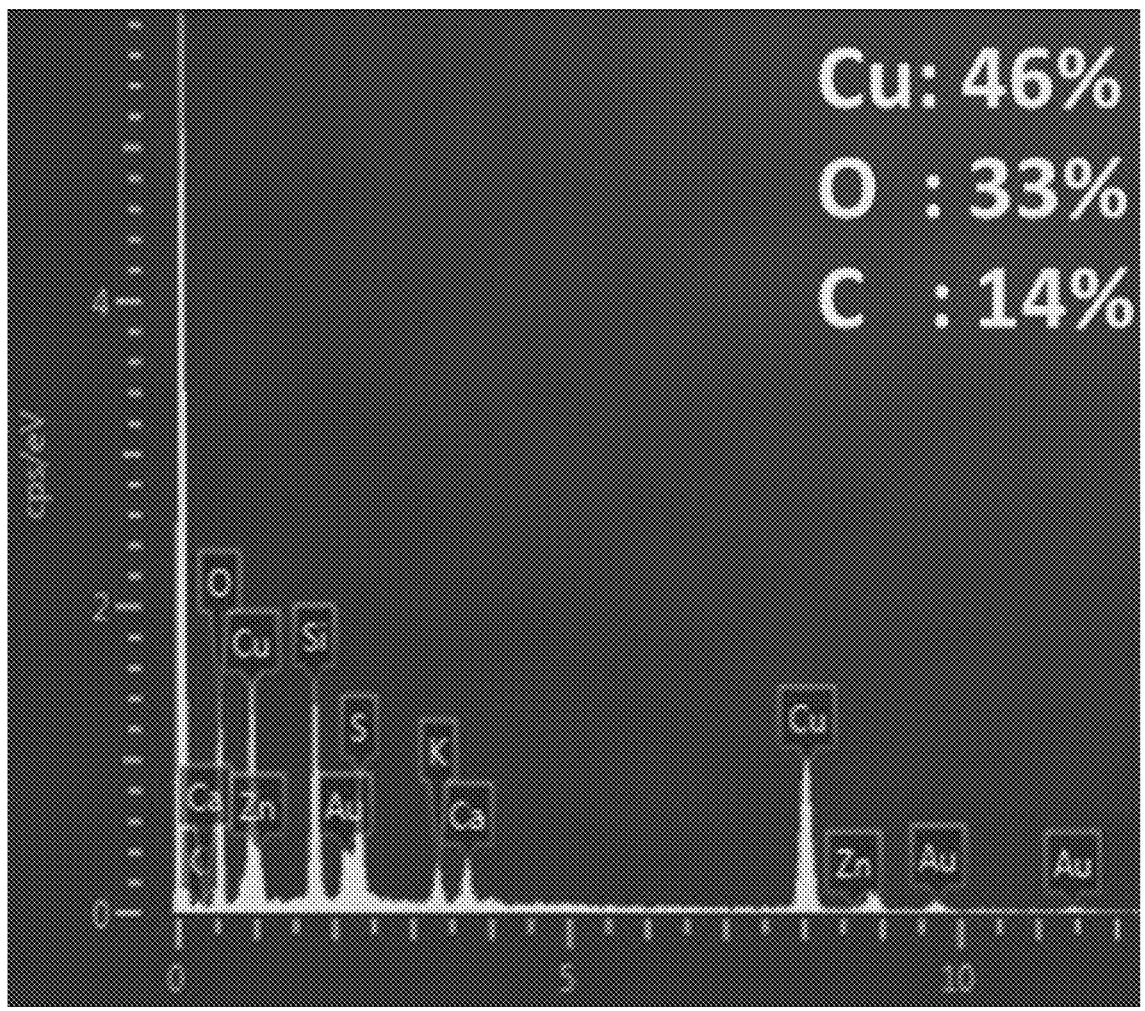
FIG. 10D shows an energy dispersive x-ray spectroscopy (EDS, EDX, EDXS, or XEDS) spectrum for an inventive Cu-CNPs/FTO$_{500}$ sample.

FIG. 10D shows an energy dispersive x-ray spectroscopy (EDS, EDX, EDXS, or XEDS) spectrum for an inventive Cu-CNPs/FTO$_{500}$ sample. The bulk compositional analysis as carried out via energy dispersive x-ray spectroscopy (EDS, EDX, EDXS, or XEDS), FIG. 10D, indicated the presence of 14 atom. % C, 33.66 atom. % O, and 46 atom. % Cu in the Cu-CNPs/FTO$_{500}$ electrocatalytic film. Without wishing to be bound to any particular theory, the carbon assimilation in the metal oxide is believed to increase the electroactive sites of electrocatalyst while facilitating the good electron transfer and enhance stability.

Figure 4A:
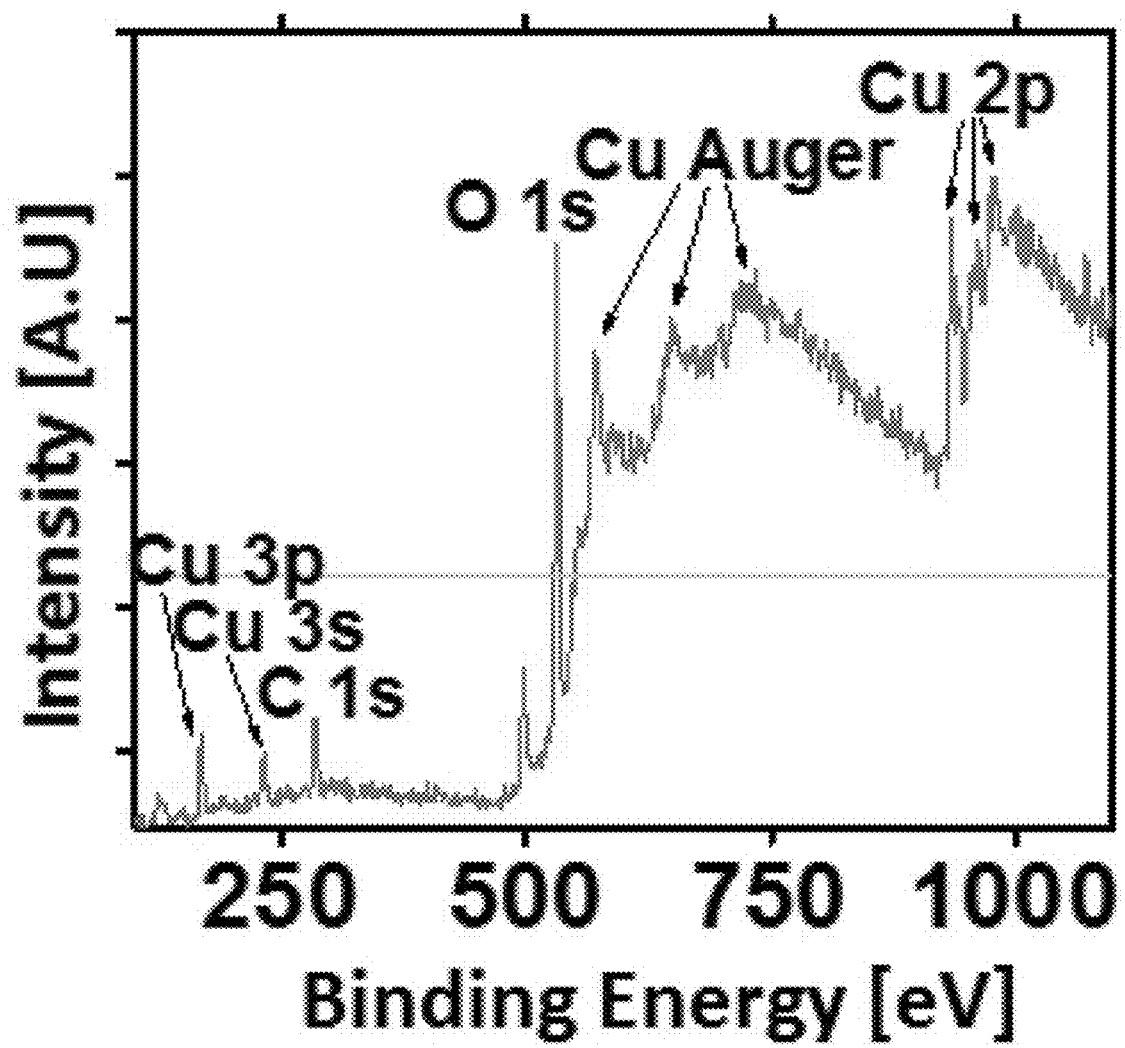
FIG. 4A shows an x-ray photoelectron spectroscopy (XPS) survey spectrum for an exemplary inventive Cu-CNPs/FTO$_{500}$ catalyst.
Figure 4B:
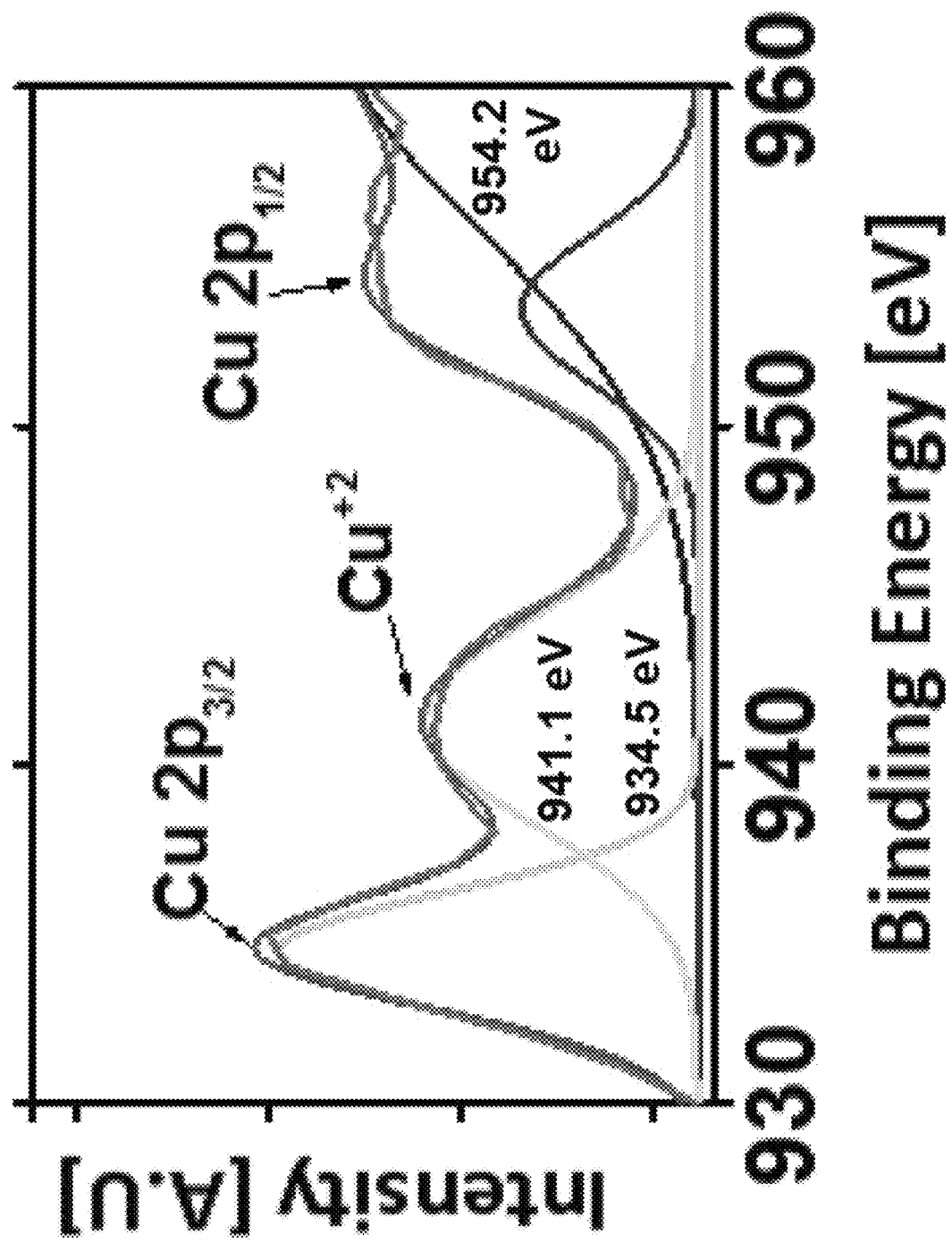
FIG. 4B shows an XPS spectrum for an exemplary inventive Cu-CNPs/FTO$_{500}$ catalyst with an enlarged view for the Cu 2p region.
Figure 4C:
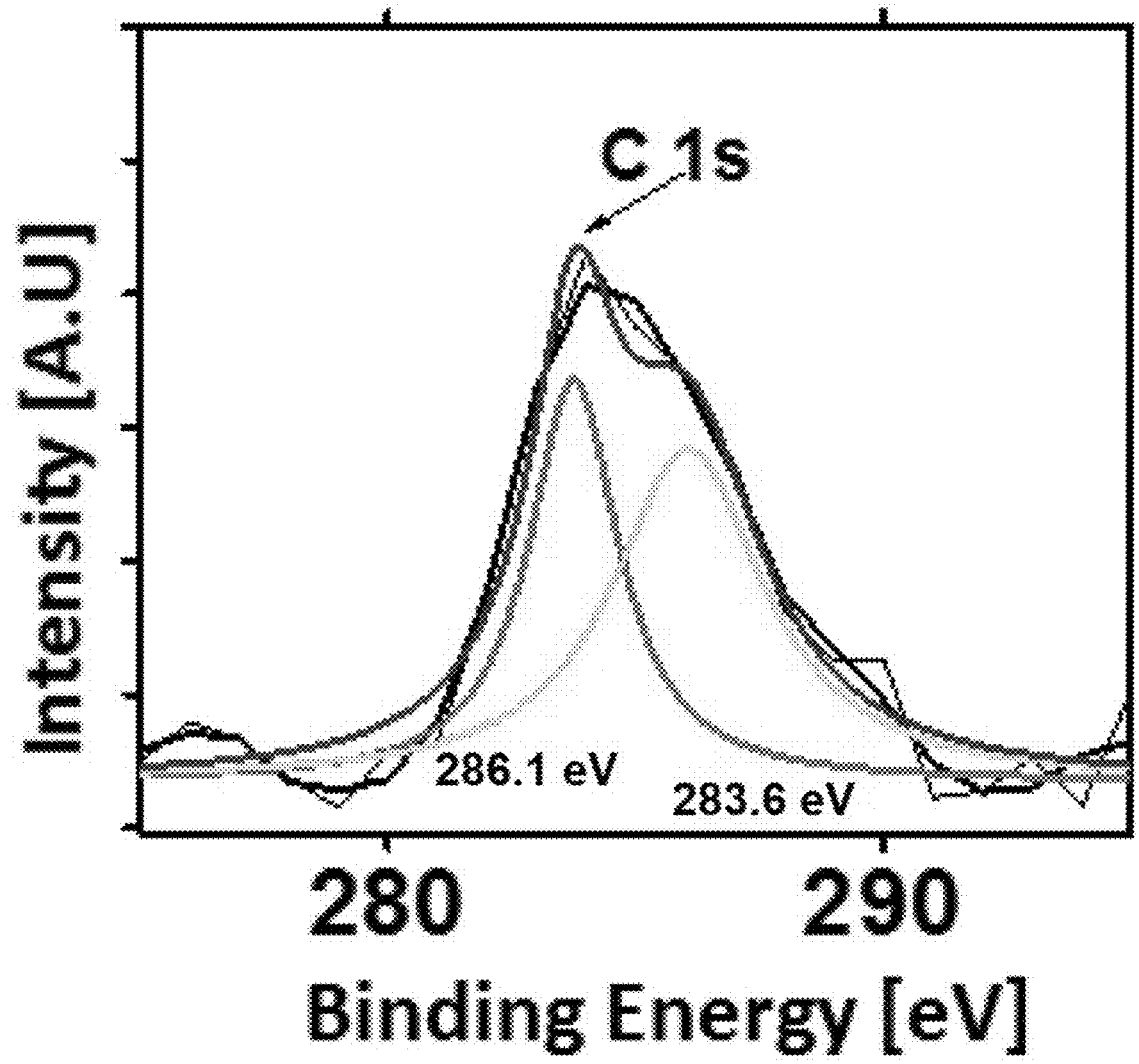
FIG. 4C shows an XPS spectrum for an exemplary inventive Cu-CNPs/FTO$_{500}$ catalyst with an enlarged view for the C 1s region.
Figure 4D:
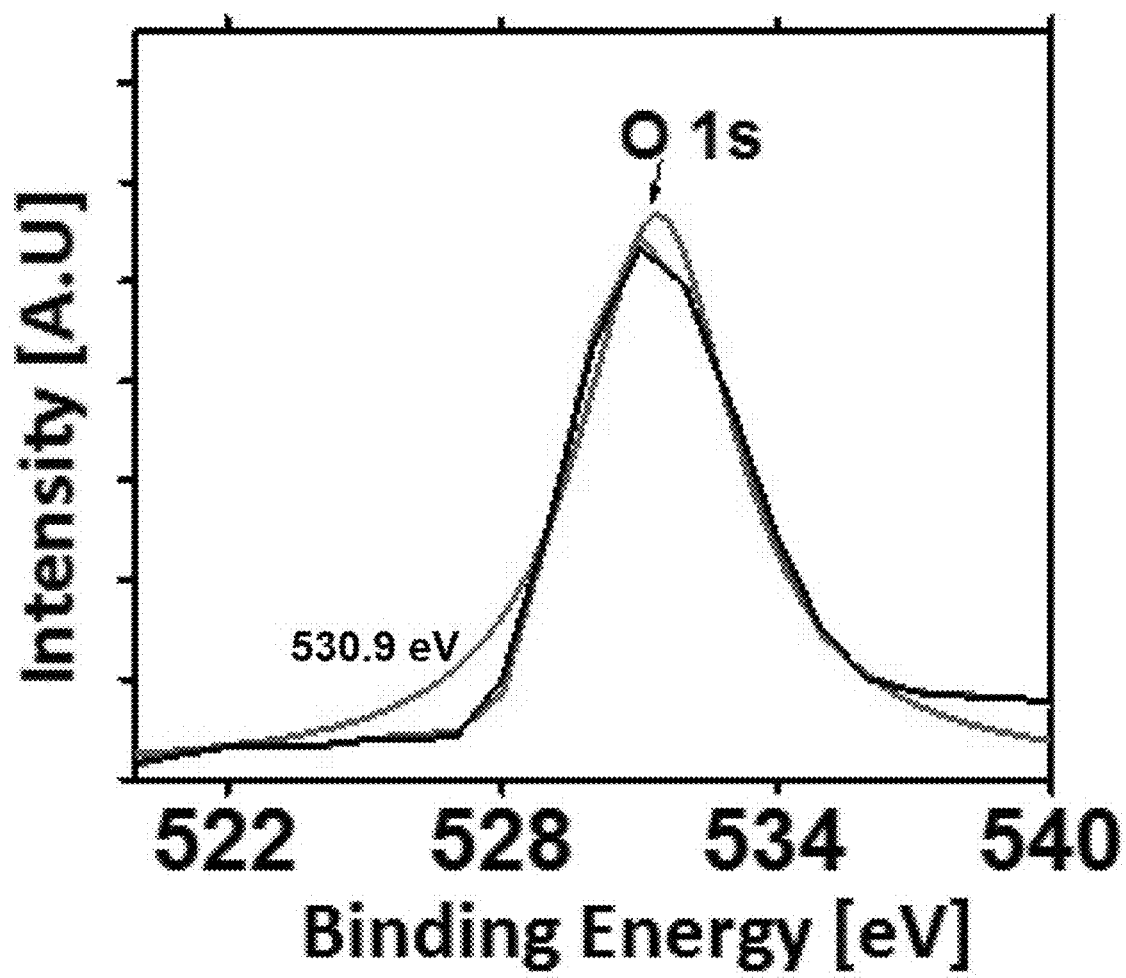
FIG. 4D shows an XPS spectrum for an exemplary inventive Cu-CNPs/FTO$_{500}$ catalyst with an enlarged view for the O 1s region.

FIG. 4A shows an x-ray photoelectron spectroscopy (XPS) survey spectrum for an exemplary inventive Cu-CNPs/FTO$_{500}$ catalyst, FIG. 4B shows an enlarged view of the XPS spectrum for the Cu 2p region, FIG. 4C shows an enlarged view of the XPS spectrum for the C 1s region, and FIG. 4D shows an enlarged view of the XPS spectrum for the O 1s region. X-ray photoelectron spectroscopy (XPS) analysis in the form of the survey data in FIG. 4A reveals that the exemplary inventive catalytic materials contain Cu, O, and C as the main constituent elements in the deposit. In the survey spectrum of the CNPs/FTO$_{500}$ sample in FIGS. 4A and 4B, the binding energies between 930 eV and 960 eV indicate the response from Cu $2p_{3/2}$, centered at 934.5 eV, and Cu $2p_{1/2}$, centered at 954.2 eV, while the peak at 530 eV is associated with O 1s and the peak at 283 eV is associated with C 1s as seen in FIGS. 4C and 4D.

The magnified view of C 1s in FIG. 4C indicates a well-pronounced peak at about 283.6 eV which is attributed to the sp$^2$ carbon (C—C bond), while a small peak at 286.1 eV may be assigned to O—C—O and C—OH groups. The high-resolution XPS spectrum for Cu 2p in FIG. 4B shows a pronounced spin-orbit splitting into Cu $2p_{3/2}$ and Cu $2p_{1/2}$, with an energy difference of about 20 eV, which is characteristics of CuO type materials as previously reported. In between the Cu $2_{3/2}$ and Cu $2p_{1/2}$ peaks, next to the Cu $2_{3/2}$ XPS signals, there is a satellite peak, positioned at about 941.1 eV which is the characteristics of Cu$^{2+}$ materials with d9 configuration in the ground state as discussed in *ACS Catal.* 2016, 6, 1768-1771, which is incorporated by reference herein in its entirety. The shake-up satellite peak is characteristic of CuO based materials. The Cu-CNPs/FTO$_{500}$ sample shows a peak for oxygen at about 530.9 eV, seen in FIG. 4D, which is ascribed to the surface-bound oxide in the catalytic layer. Consequently, the surface and bulk elemental analysis indicate an active CuO-based electrocatalyst useful for water oxidation catalysis.

Figure 11:
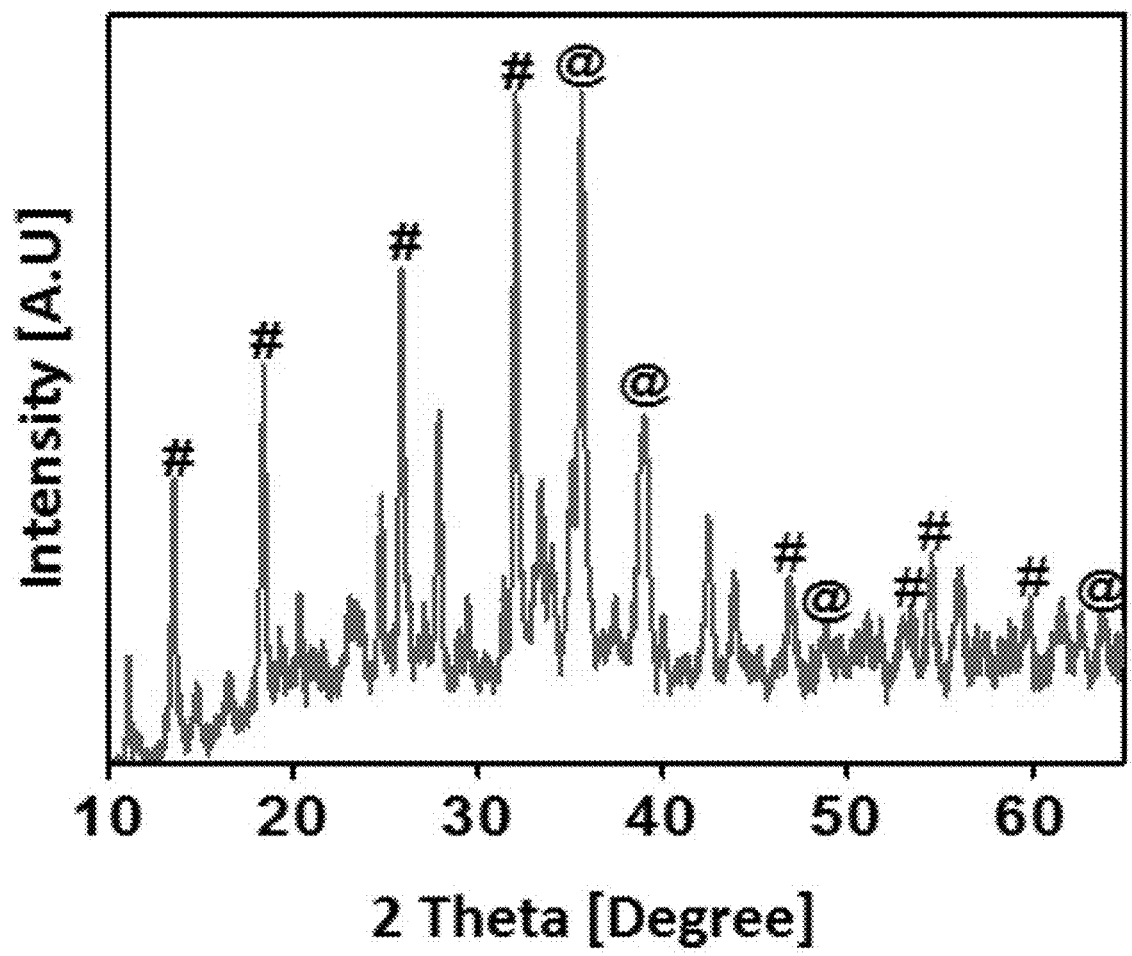
FIG. 11 shows an x-ray diffraction (XRD) pattern for an inventive Cu-CNPs/FTO$_{500}$ sample indicating a Cu$_8$O phase with an "@" and a CuO phase with a "#"

FIG. 11 shows an x-ray diffraction (XRD) pattern for an inventive Cu-CNPs/FTO$_{500}$ sample. The x-ray diffraction (XRD) spectrum for phase analysis of the Cu-CNPs/FTO$_{500}$ electrocatalyst reveals the presence of CuO and Cu$_8$O type phases in the catalytic layer, as seen in FIG. 11. The CuO remains the dominating phase in the inventive catalytic films. However, the pattern in FIG. 11 includes some signals representing the contribution of metallic copper in the catalytic layer that might have formed from the reduction of copper oxide. Thus, the x-ray diffraction (XRD) pattern in FIG. 11 reveals intense diffraction peaks for the Cu$_8$O phase, indicated by "#" signs, and for the CuO phase, indicated by "@" signs.

Figure 12A:
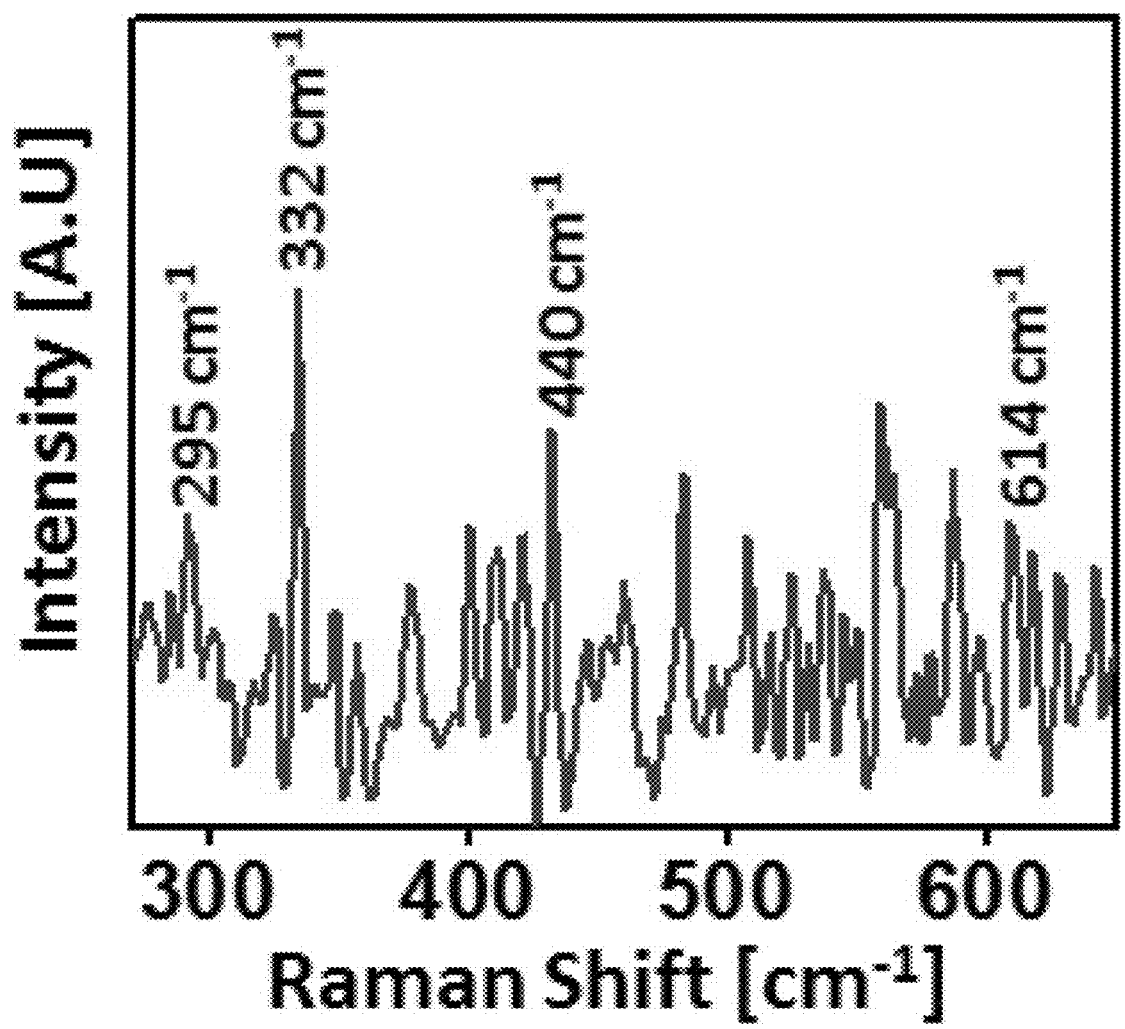
FIG. 12A shows a Raman spectrum overview for an inventive Cu-CNPs/FTO$_{500}$ sample.
Figure 12B:
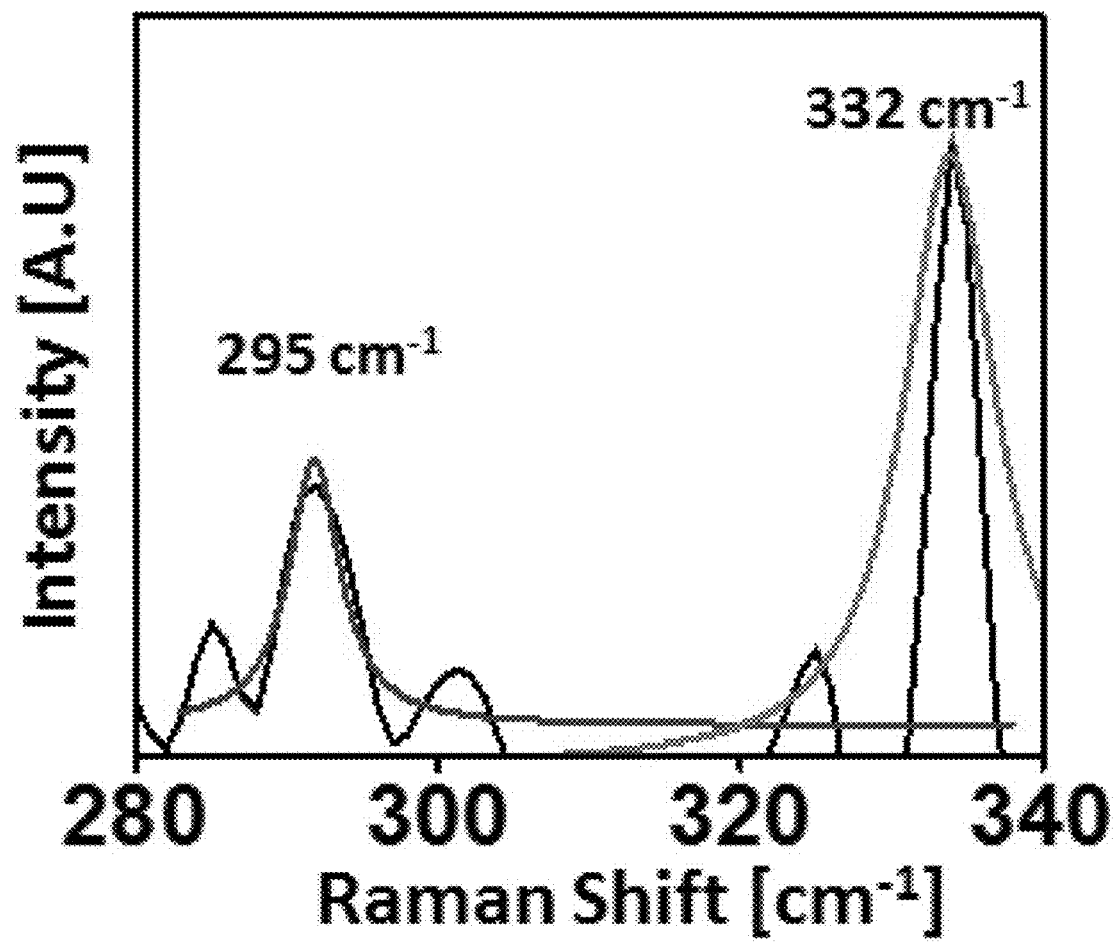
FIG. 12B shows a Raman spectrum selection from 280 to 340 cm$^{-1}$ for an inventive Cu-CNPs/FTO$_{500}$ sample.
Figure 12C:
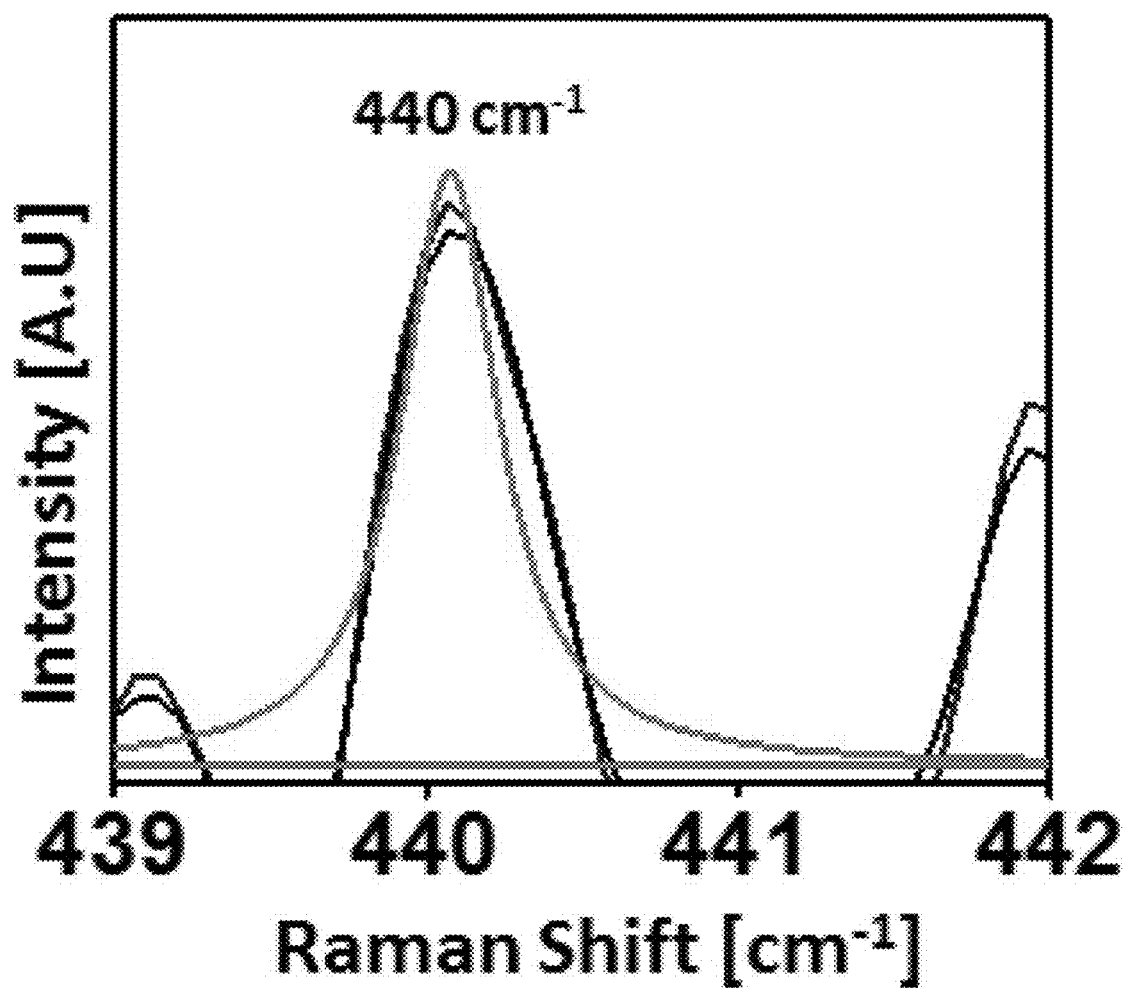
FIG. 12C shows a Raman spectrum selection from 439 to 442 cm$^{-1}$ for an inventive Cu-CNPs/FTO$_{500}$ sample.
Figure 12D:
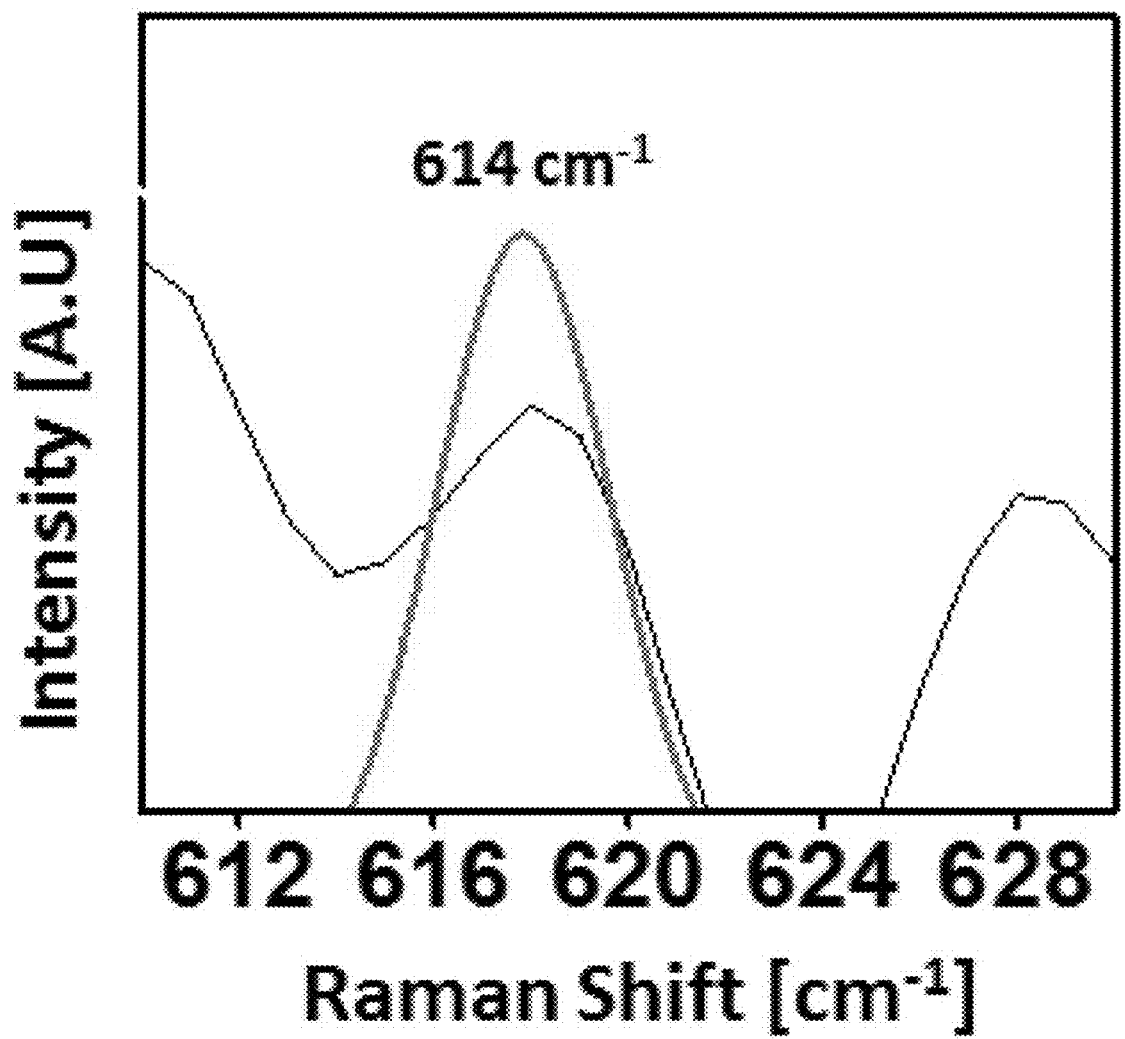
FIG. 12D shows a Raman spectrum selection from 610 to 630 cm$^{-1}$ for an inventive Cu-CNPs/FTO$_{500}$ sample.

FIG. 12A shows a Raman spectrum overview for an inventive Cu-CNPs/FTO$_{500}$ sample, while FIG. 12B shows a selection from 280 to 340 cm$^{-1}$, FIG. 12C shows a selection from 439 to 442 cm$^{-1}$, and FIG. 12D shows a selection from 610 to 630 cm$^{-1}$. Raman spectroscopy was also undertaken on the Cu-CNPs/FTO$_{500}$ catalyst sample to investigate the structure of the nanoscale copper oxide-based material, as presented in FIG. 12A to 12D. The Raman peaks at 295, 332, and 614 cm$^{-1}$ indicate the presence of a CuO phase in the catalytic layer, particularly visible in the enlarged view shown in FIGS. 12B and 12D. However, a peak at 440 cm$^{-1}$, seen in FIG. 12C, indicates the presence of a Cu$_2$O phase in the catalytic film. Thus, the analytical results indicate that the exemplary Cu-CNPs/FTO$_{500}$ electrocatalysts, derived from the Cu(OH)$_x$/CuO$_x$/HCO$_3^-$ formulation-based colloidal nanoparticles (CNPs), relatively easily made as described above, is a mixture of various phases of copper oxides with CuO as the dominating phase. The Raman data correspond with XPS and XRD data for the chemistry of Cu-CNPs/FTO$_{500}$ electrocatalyst.

Figure 5A:
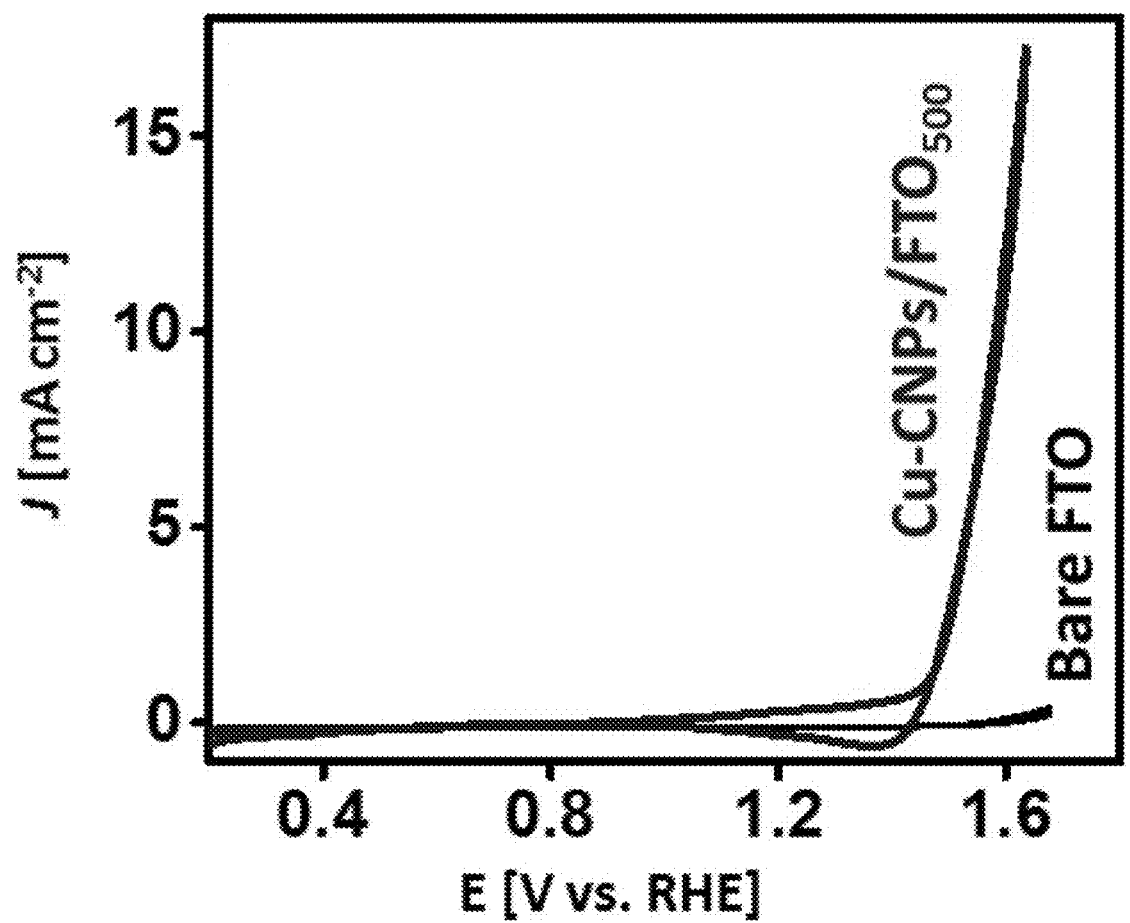
FIG. 5A shows a cyclic voltammetry (CV) profile for an inventive Cu-CNPs/FTO$_{500}$ sample in 0.1 M KOH electrolyte solution at a pH of approx. 13 at a scan rate of 2 mV/s.
Figure 5B:
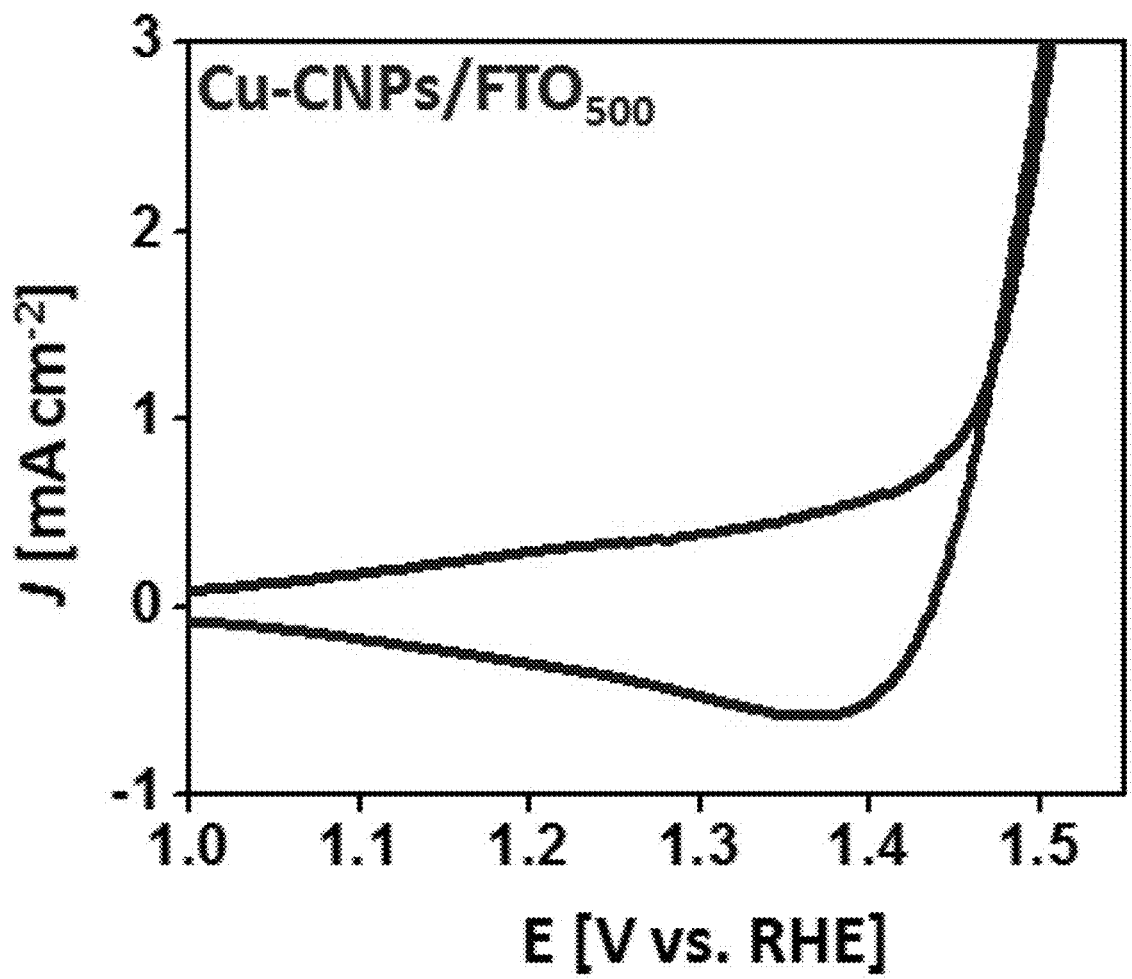
FIG. 5B shows an enlarged view from 1.0 to 1.54 V$_{RHE}$ of CV profile for an inventive Cu-CNPs/FTO$_{500}$ sample in 0.1 M KOH electrolyte solution at a pH of approx. 13 at the scan rate of 2 mV/s.
Figure 5C:
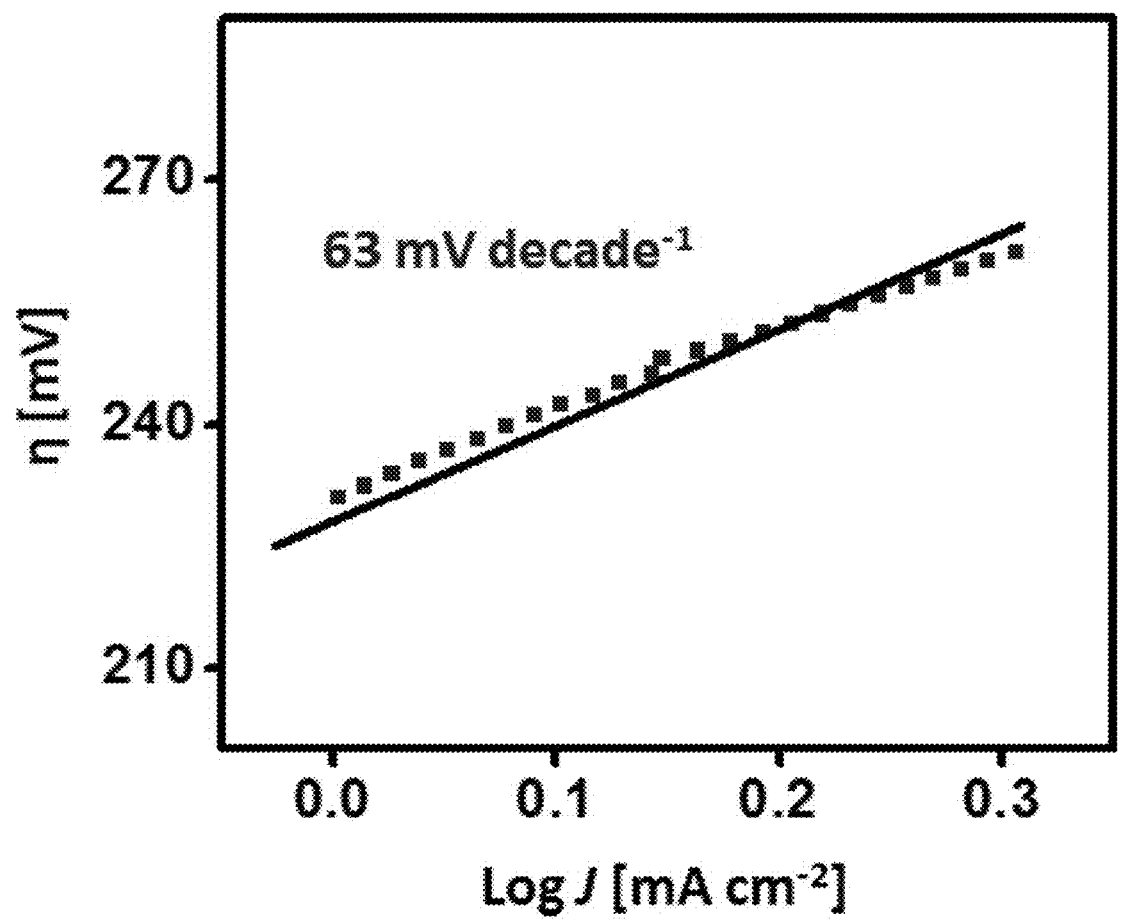
FIG. 5C shows a Tafel plot of overpotential versus the logarithm of the current density curve for an exemplary inventive Cu-CNPs/FTO$_{500}$ electrocatalyst calculated from a polarization curve.
Figure 5D:
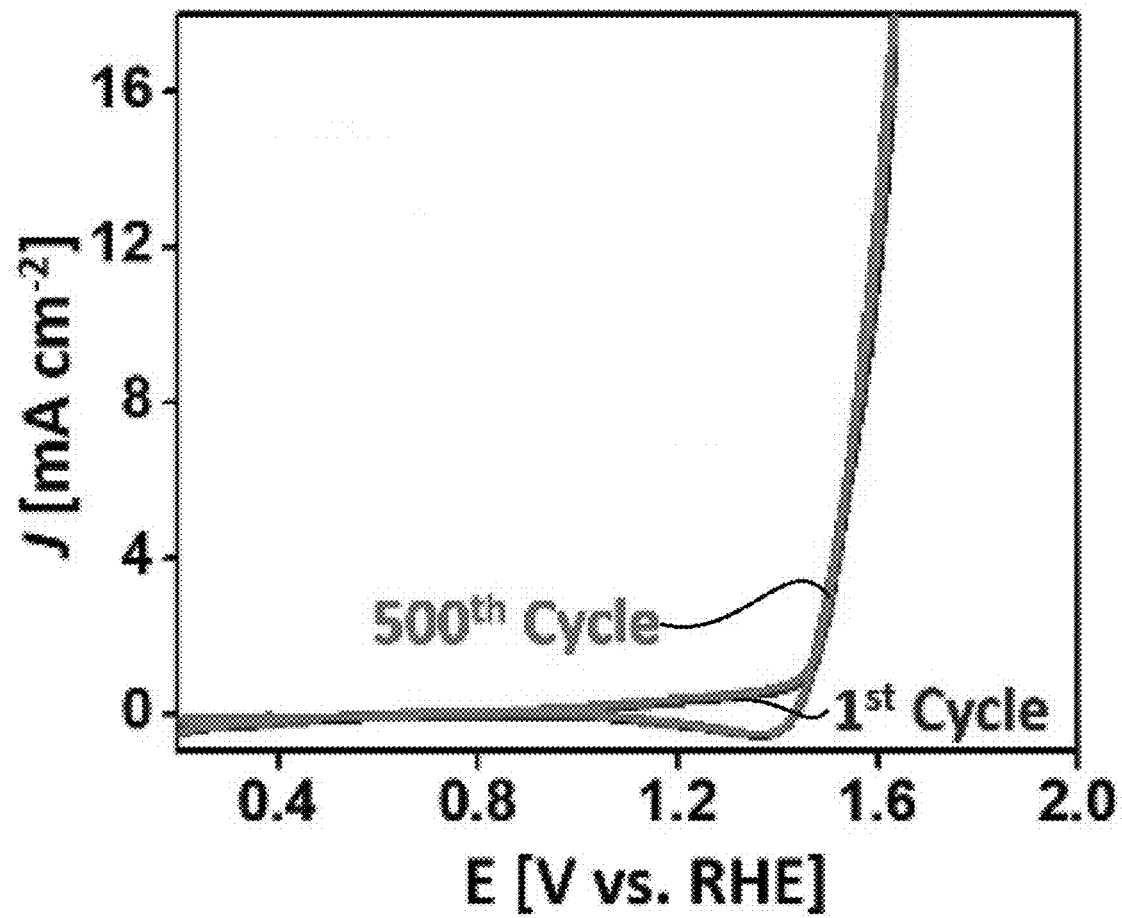
FIG. 5D shows a plot comparing 1 to 500 consecutive CV sweeps for the Cu-CNPs/FTO$_{500}$ in 0.1 M KOH electrolyte solution at a pH of approx. 13 at a scan rate of 10 mV/s.
Figure 5E:
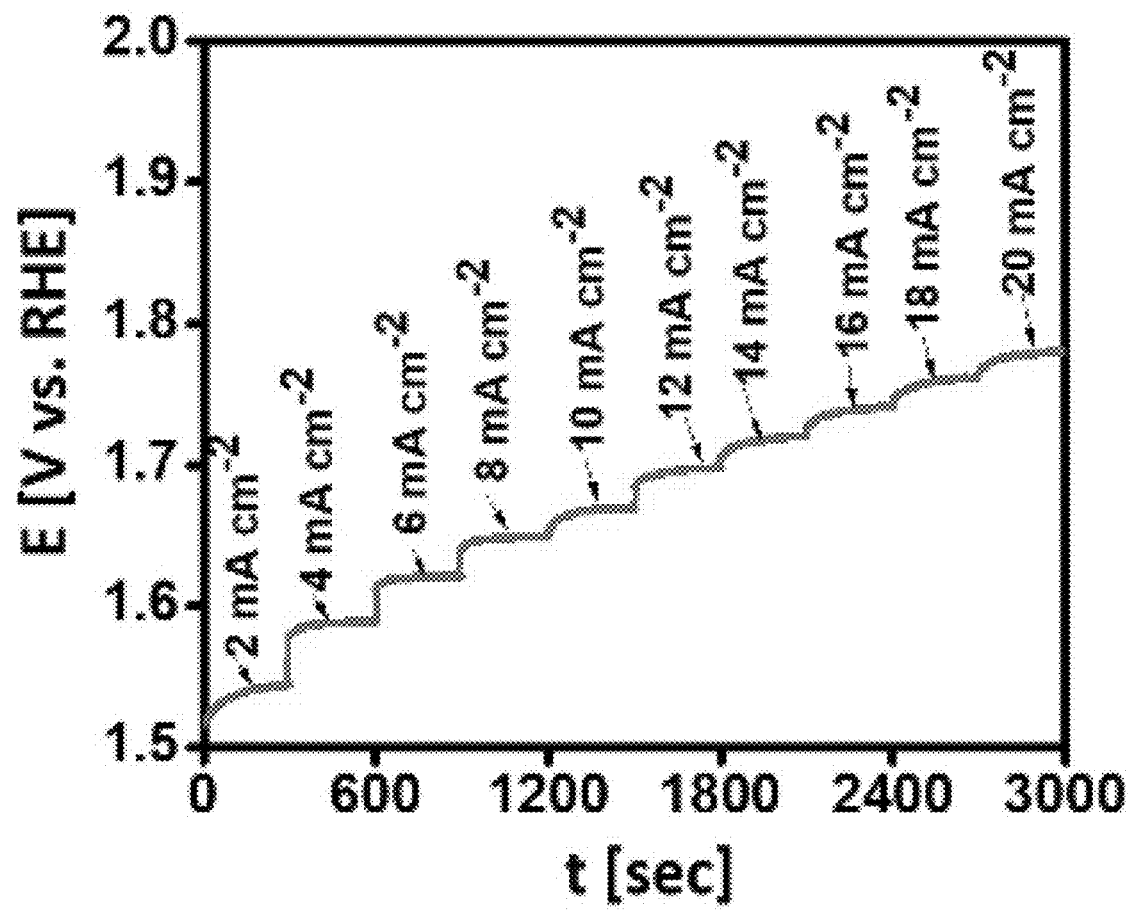
FIG. 5E shows a multistep controlled current electrolysis (CCE) plot showing potential profiles for consecutive current density increments from 2 to 20 mA/cm$^2$.

Detailed electrochemical characterization of Cu-CNPs/FTO$_{500}$ system was conducted via cyclic voltammetry (CV) in FIGS. 5A and 5B, Tafel measurements in FIG. 5C, consecutive cyclic voltammetry (CV) measurements in FIG. 5D, and incremental multistep controlled current electrolysis (CCE), as shown in FIG. 5E. FIGS. 5A and 5B show a cyclic voltammetry (CV) profile for an inventive Cu-CNPs/FTO$_{500}$ sample in 0.1 M KOH electrolyte solution at a pH of approx. 13 at a scan rate of 2 mV/s. FIG. 5C shows a Tafel plot of overpotential versus the logarithm of a current density curve for an exemplary Cu-CNPs/FTO$_{500}$ electrocatalyst calculated from the polarization curve. FIG. 5D shows a plot comparing 1 to 500 consecutive CV sweeps for the Cu-CNPs/FTO$_{500}$ in 0.1 M KOH electrolyte solution at a pH of approx. 13 at a scan rate of 10 mV/s. FIG. 5E shows a multistep controlled current electrolysis (CCE) plot showing potential profiles for consecutive current density increments from 2 to 20 mA/cm$^2$.

The oxygen evolution reaction (OER) onset potential, E/V, was determined to be 1.45$_{RHE}$, with an onset overpotential, η, was determined to be 220 mV, as seen in FIG. 5A, with an enlarged view shown in FIG. 5B. The onset potential achieved by the inventive Cu-CNPs/FTO$_{500}$ system is the lowest on the list in Table 1, and better than other Cu-based heterogeneous catalysts reported to date.

TABLE 1

A comparative analysis of different Cu-based electrocatalytic systems for water oxidation reaction and that of Cu-CNPs/FTO$_{500}$ type electrocatalyst.

| Catalyst/System[a] | Electrolyte | Onset potential [V$_{RHE}$] | Tafel slope [mV/dec] |
|---|---|---|---|
| Cu—Bi | 0.2M Borate buffer (pH ≈ 9) | 1.73 V | 89 |
| Cu-NWs[b] | 0.2M Borate buffer (pH ≈ 9.2) | 1.84 V | — |
| Cu$_c$—Ni$_s$ NWs[c] | | 1.69 V | |
| CuO | 0.1M K—Bi (pH ≈ 9.2) | 1.64 V | 54.5 |
| Cu-NLs[d] | 0.2M carbonate (pH ≈ 11) | 1.55 V | — |
| Cu-CNPs/FTO$_{500}$ | 0.1M KOH (pH ≈ 13) | 1.45 V | 52 |

[a]the Cu catalysts are prepared by different methods and are deposited on various conducting substrates;
[b]Cu-NWs = Copper nanowires;
[c]Cu—Ni NWs = electroplated nickel onto copper nanowires;
[d]Cu-NLs = Copper-oxide nanoleaves.

The oxidative prefectures at about 1.0 V$_{RHE}$ seen in FIG. 5B may be ascribed to the surface oxidation of copper to higher oxidation state upon the applied anodic potential. A current density of less than 15 mA/cm$^2$ was achieved under 1.63 V$_{RHE}$, and a current density of 10 mA/cm$^2$ could be achieved just under the potential, E$_{J=10~mA/cm^2}$, of 1.59 V$_{RHE}$, with an onset overpotential, η, of 360 mV. This data indicates a substantial electrocatalytic activity of the Cu-CNPs/FTO$_{500}$ sample for the water oxidation reaction. A large reduction current is also observed that might be originated from the Cu site reduction along with some O$_2$ reduction in this potential region. During the catalytic reaction, copper is thought to undergo from +2 to +3 oxidation state through OH$^-$ adsorption and desorption. Such behavior is consistent with other 3d metal oxides as well.

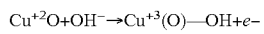

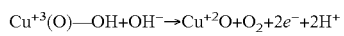

The exemplary Cu-CNPs/FTO$_{500}$ water oxidation electrocatalyst described herein can exhibit an oxygen evolution reaction (OER) onset potential, E/V, of 1.45$_{RHE}$, and an onset-overpotential, η, of 220 mV, which is unexpectedly superior relative to known materials, as seen in Table 1. Copper is not generally considered to be a good electrocatalytic material because the M-OH bond formation is either too strong or too weak, thereby hindering copper's intrinsic catalytic activity. However, the Cu-CNPs/FTO$_{500}$ materials described herein show much-improved performance for driving otherwise kinetically sluggish oxygen evolution reaction (OER).

The unexpectedly superior performance of the inventive catalysts is believed to be attributable to the nanoscale, rough, highly porous surface structure, particularly of the Cu-CNPs/FTO$_{500}$ samples, enabling a rapid charge transfer as evident by electrochemical impedance spectroscopy (EIS) in FIG. 9. The inventive catalysts also appear to possess unexpectedly enhanced stability, possibly due to the insertion of carbon content in the catalytic layer, e.g., from a carbonate electrolyte, as evidence by EDS and XPS analysis.

Carbon assimilation in the catalytic system can be facilitated, as described herein, by employing a relatively simple colloidal route and inexpensive carbonate electrolyte systems. Accordingly, it is possible that that nanostructure, porous spongy morphological attributes of Cu-CNPs/FTO$_{500}$ further reduce kinetic barriers and support O—O bond formation from individual OH entities adsorbed on catalyst surface, allowing the inventive system to operate at a much lower energy cost. Porous, nanoscale, particulate-type catalytic films, such as the inventive materials, can also provide more active sites, thereby facilitating adsorption/stabilization of reaction intermediates and their conversion for high rates of 0-0 bond formation and subsequent rapid oxygen gas evolution.

Figure 13A:
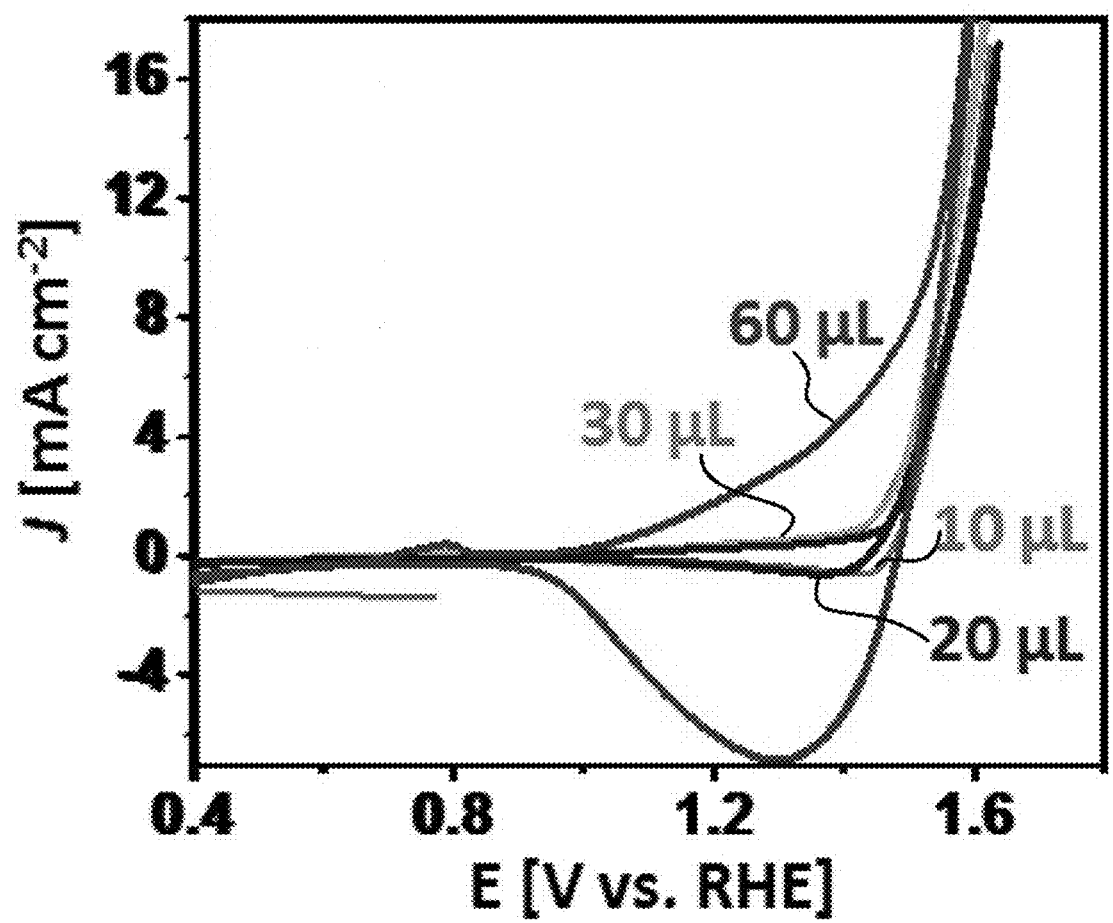
FIG. 13A shows CV profiles for an exemplary inventive Cu-CNPs/FTO$_{500}$ electrocatalyst generated with different catalyst loadings on fluorine-doped tin oxide (FTO)
Figure 13B:
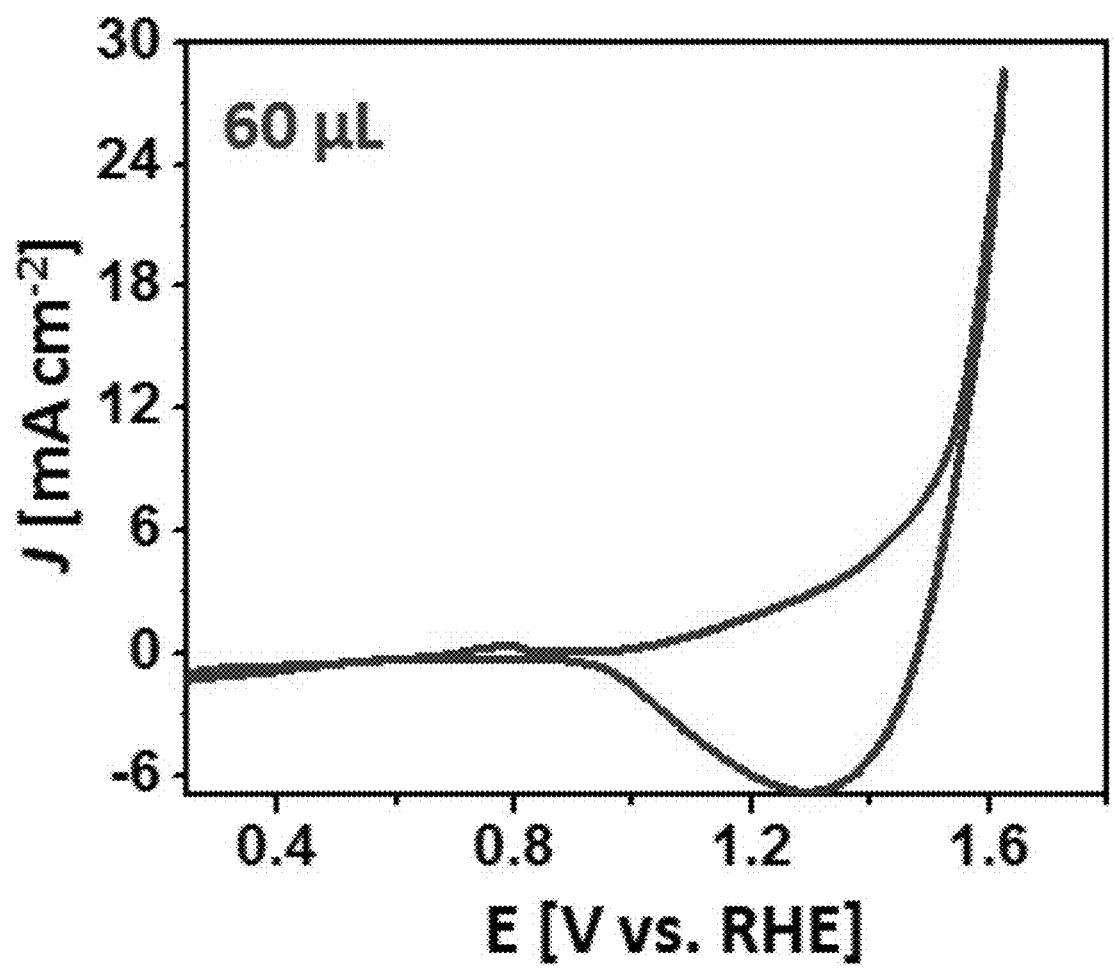
FIG. 13B shows an overview image of a CV curve for exemplary inventive Cu-CNPs/FTO$_{500}$ electrocatalyst generated with a 60 µL aliquot of copper colloidal nanoparticles (Cu-CNPs) on FTO in 0.1 M NaOH electrolyte solution at the scan rate of 2 mV/s.

FIG. 13A shows CV profiles for an exemplary inventive Cu-CNPs/FTO$_{500}$ electrocatalyst generated with different catalyst loadings on fluorine-doped tin oxide (FTO). FIG. 13B shows an overview image of a CV curve for exemplary inventive Cu-CNPs/FTO$_{500}$ electrocatalyst generated with a 60 μL aliquot of copper colloidal nanoparticles (Cu-CNPs) on FTO in 0.1 M NaOH electrolyte solution at the scan rate of 2 mV/s. The effects of different catalyst loadings on the FTO surface were studied by preparing Cu-CNPs/FTO$_{500}$ anodes obtainable by depositing 10 to 60 μL, the mass loading of Cu-CNPs catalyst in the volume range 10-60 μL is as follows: 10 μL (0.1 mg); 20 μL (0.2 mg); 30 μL (0.3 mg); 40 μL (0.4 mg); 50 μL (0.5 mg); 60 μL (0.6 mg) of copper-colloidal nanoparticles (Cu-CNPs) on FTO substrates. Varying the copper-colloidal nanoparticle (Cu-CNP) loading in the range of 10 to 30 μL was observed to produce similar catalytic signatures and oxygen evolution reaction (OER) performance during cyclic voltammetry (CV) experiments as shown in FIG. 13A. However, at a 60 μL loading, the Cu-CNPs/FTO$_{500}$ catalyst sample shows a broad metal redox peak just prior to water oxidation catalytic wave with a relatively high current density as expected for high catalyst loadings, as indicated in FIG. 13B.

Figure 14A:
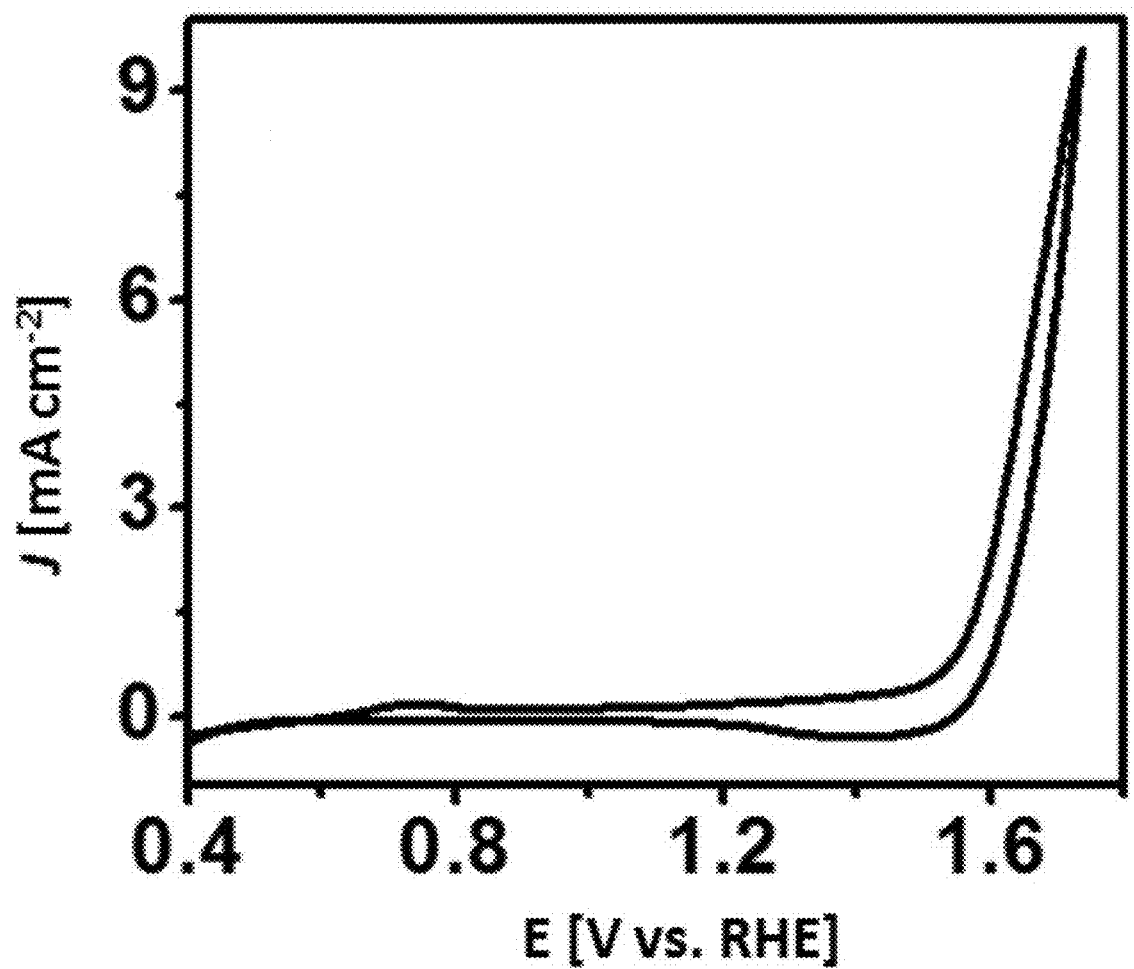
FIG. 14A shows a CV profile for an exemplary inventive Cu-CNPs/FTO$_{500}$ electrocatalyst in a 0.1 M phosphate buffer at a pH of approx. 6.3.
Figure 14B:
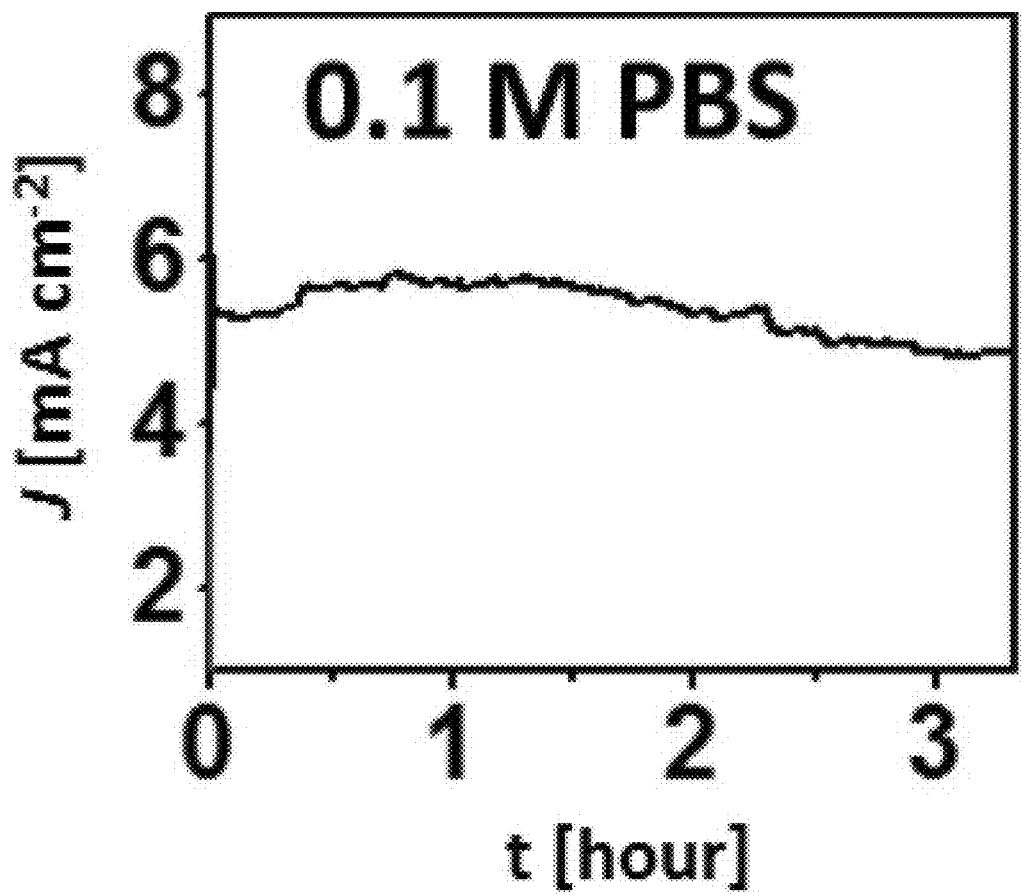
FIG. 14B shows a plot of the results of a controlled-potential electrolysis (CPE) experiment conducted for more than three hours at applied potential of 1.6$_{RHE}$ and 1.55 V$_{RHE}$ for the system in FIG. 16A.
Figure 14C:
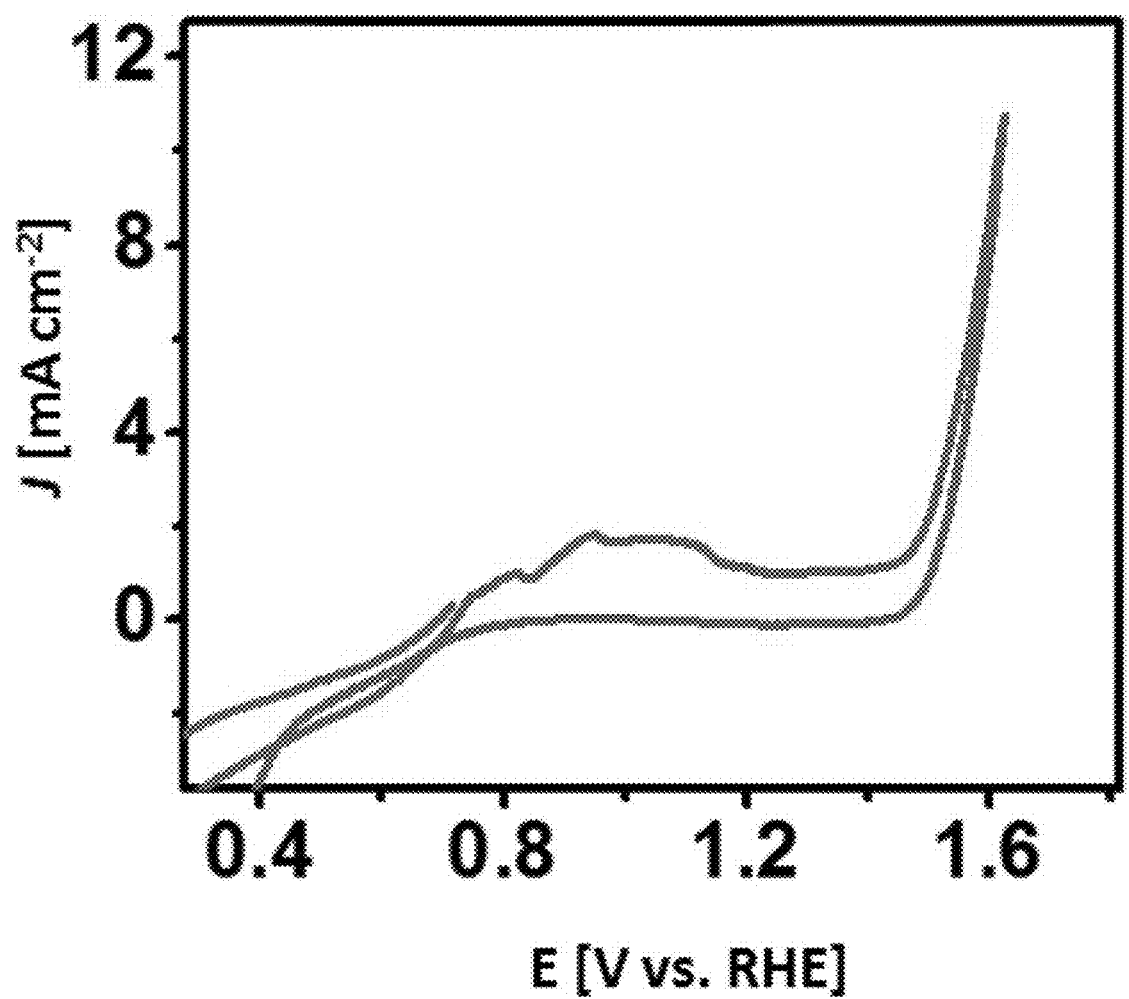
FIG. 14C shows a CV profile for an exemplary inventive Cu-CNPs/FTO$_{500}$ electrocatalyst in a 0.1 M aq. bicarbonate electrolyte solution a pH of approx. 8.3.
Figure 14D:
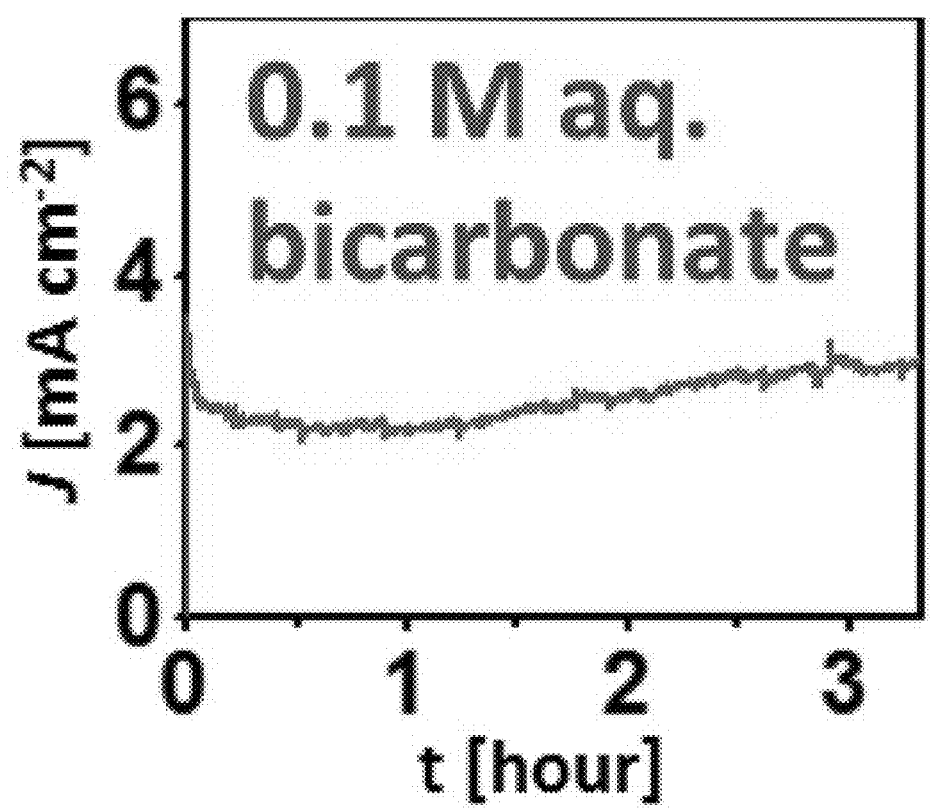
FIG. 14D shows a plot of the results of a CPE experiment conducted for more than three hours at applied potential of 1.6$_{RHE}$ and 1.55 V$_{RHE}$ for the system in FIG. 16C.
Figure 14E:
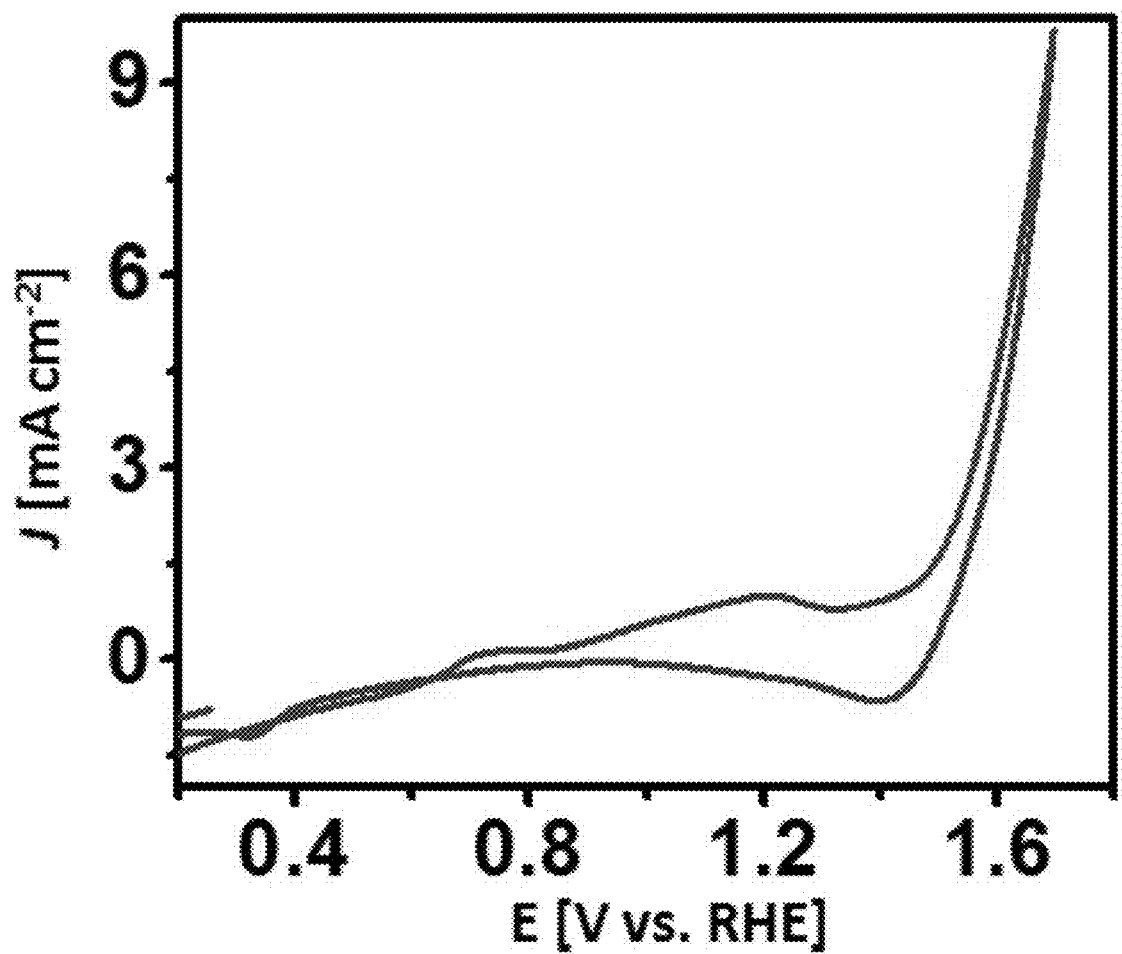
FIG. 14E shows a CV profile for an exemplary inventive Cu-CNPs/FTO$_{500}$ electrocatalyst in a 0.1 M aq. carbonate electrolyte solution a pH of approx. 11.
Figure 14F:
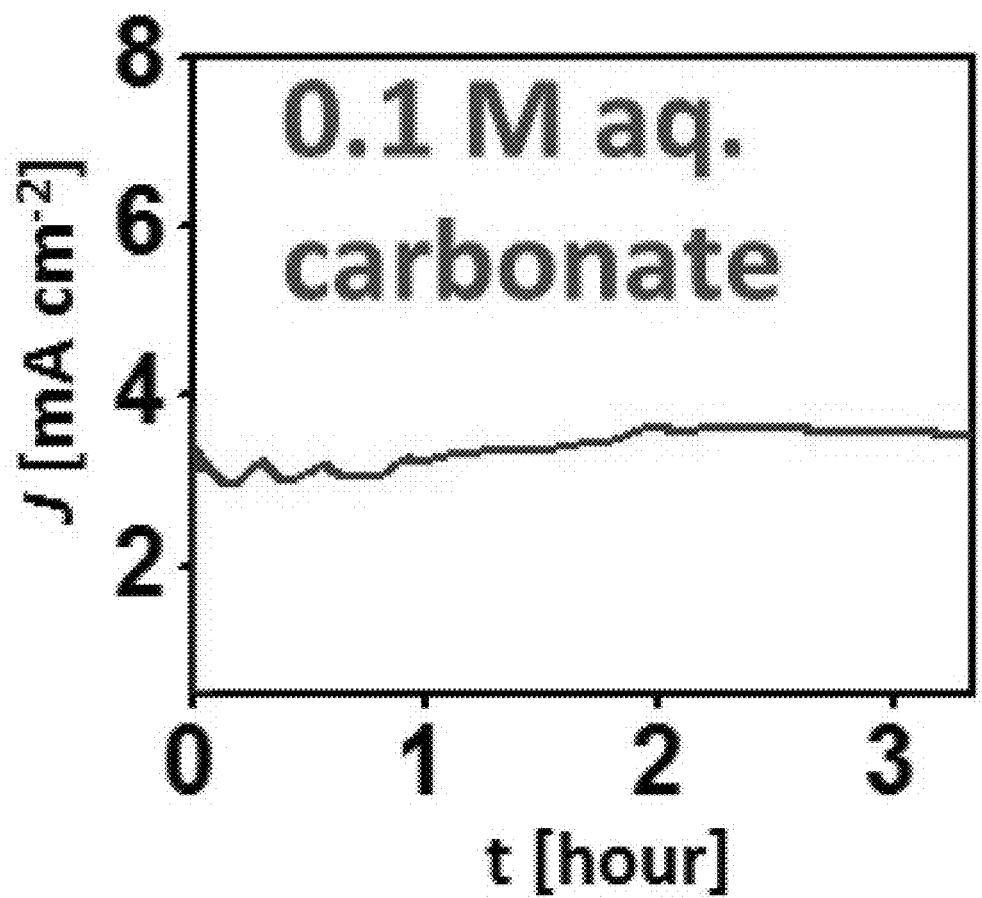
FIG. 14F shows a plot of the results of a CPE experiment conducted for more than three hours at applied potential of 1.6$_{RHE}$ and 1.55 V$_{RHE}$ for the system in FIG. 16E.

FIG. 14A shows a CV profile for an exemplary inventive Cu-CNPs/FTO$_{500}$ electrocatalyst in a 0.1 M phosphate buffer at a pH of approx. 6.3. FIG. 14B shows a plot of the results of a controlled-potential electrolysis (CPE) experiment conducted for more than three hours at applied potential of 1.6$_{RHE}$ and 1.55 V$_{RHE}$ for the system in FIG. 14A. FIG. 14C shows a CV profile for an exemplary inventive Cu-CNPs/FTO$_{500}$ electrocatalyst in a 0.1 M aq. bicarbonate electrolyte solution a pH of approx. 8.3. FIG. 14D shows a plot of the results of a CPE experiment conducted for more than three hours at applied potential of 1.6$_{RHE}$ and 1.55 V$_{RHE}$ for the system in FIG. 14C. FIG. 14E shows a CV profile for an exemplary inventive Cu-CNPs/FTO$_{500}$ electrocatalyst in a 0.1 M aq. carbonate electrolyte solution a pH of approx. 11. FIG. 14F shows a plot of the results of a CPE experiment conducted for more than three hours at applied potential of $1.6_{RHE}$ and $1.55\ V_{RHE}$ for the system in FIG. 14E.

The catalytic performance of Cu-CNPs/FTO$_{500}$ was investigated in various electrolyte solutions at varied pH values, from neutral to basic pH values. The results show that the Cu-CNPs/FTO$_{500}$ catalyst sample can perform the water oxidation reaction under a wide range of pH conditions and in a variety of electrolyte solutions, such as in 0.1 M phosphate buffer (PBS) (pH≈6.3) as illustrated in FIG. 14A, in 0.1 M aq. bicarbonate electrolyte solution (pH≈8.3) as illustrated in FIG. 14C, and 0.1 M aq. carbonate electrolyte solution (pH≈11) as illustrated in FIG. 14E. Furthermore, the Cu-CNPs/FTO$_{500}$ catalyst sample shows good activity and stability for the water oxidation reaction in all aforementioned electrolyte solutions during controlled potential electrolysis (CPE) experiments conducted at constant potential, as respectively seen in FIGS. 14B, 14D, and 14F. These results demonstrate substantial catalytic activity of the exemplary Cu-CNPs/FTO$_{500}$ catalyst for water oxidation reaction under wide pH range. However, the catalytic performance in 0.1 M NaOH electrolyte solution indicates that basic conditions can be desirable.

Figure 15:
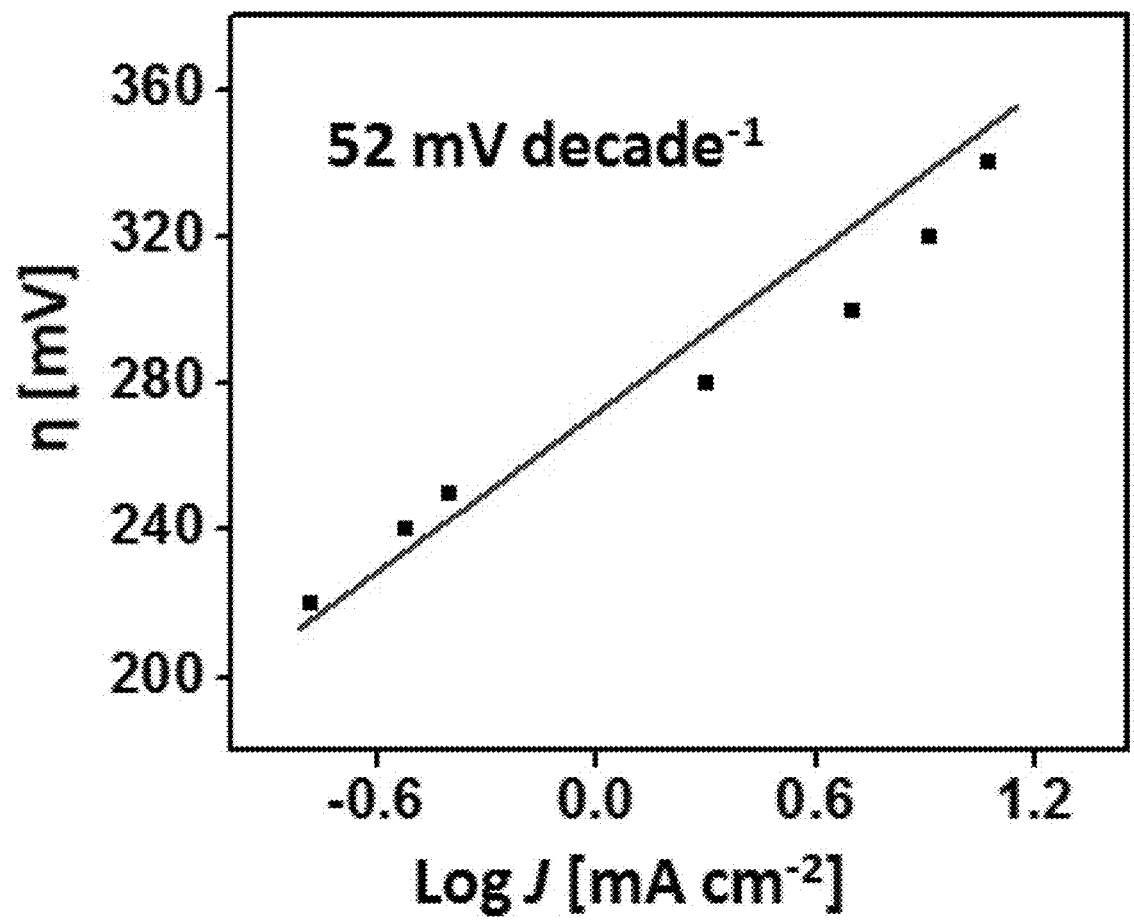
FIG. 15 shows a Tafel plot of overpotential versus the logarithm of the current density curve for an exemplary inventive Cu-CNPs/FTO$_{500}$ electrocatalyst calculated from static chronoamperometry technique.

FIG. 15 shows a Tafel plot of overpotential versus the logarithm of the current density curve for an exemplary inventive Cu-CNPs/FTO$_{500}$ electrocatalyst calculated from static chronoamperometry technique. The current versus overpotential measurements for the exemplary Cu-CNPs/FTO$_{500}$ electrocatalysts in the oxygen evolution reaction (OER) calculated from the polarization curve reveals a Tafel slope of 63 mV/dec as illustrated in FIG. 5C. Furthermore, to get a steady state polarization curve and to avoid the current contribution from the capacitance of the interphase, the Tafel curve is plotted by considering a static electroanalytical technique, such as chronoamperometry as described above. The resulting Tafel slope of 52 mV/dec corresponds to a three electron transfer during the catalytic process, and represents the actual intrinsic catalytic activity of the material as seen in FIGS. 5C and 15. The elementary step in the oxygen evolution reaction (OER) at the anode surface involves a two to three electron transfer reaction including the oxidation of water and/or hydroxide to oxyhydroxide.

Accelerated degradation experiments are performed in 0.1 M KOH to assess the durability of the inventive catalysts. The successive multi-scan cyclic voltammetry (MSCV) measurements for the exemplary Cu-CNPs/FTO$_{500}$ electrocatalyst exhibited excellent stability and high activity, generating similar catalytic signatures after 500 cyclic voltammetry (CV) cycles as after 1 cycle for water oxidation catalysis, as seen in FIG. 5C. In addition, the catalytic performance of the electrocatalyst was investigated by a series of multistep controlled current electrolysis (CCE) experiments. In the pursuit of the multistep CCE experiments, current was held constant for a minimum of 300 seconds and the resulting potential-time curves are presented in FIG. 5E. Upon increasing the current density, the potential of electrode upsurges, but can be quickly stabilized due to the mechanical sturdiness of the system. This feature proves the stability of the system under anodic environment.

Figure 16:
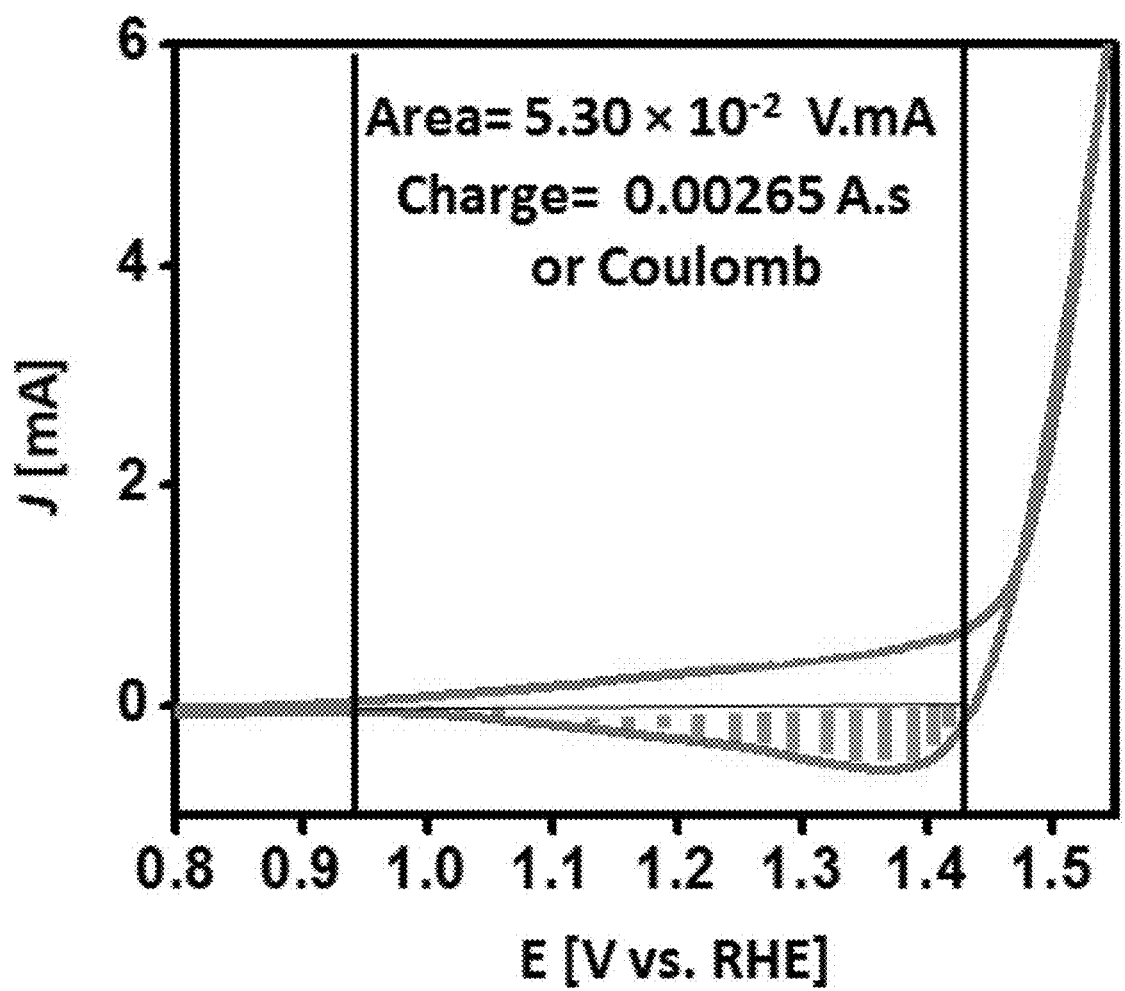
FIG. 16 shows the area under reduction peak for Cu$^{2+}$ to/from Cu$^{3+}$ redox reaction on an exemplary inventive Cu-CNPs/FTO$_{500}$ material under potential range from 1.43 to 0.94 V$_{RHE}$ based on a CV scan rate of 20 mV/s.

FIG. 16 shows the area under reduction peak for $Cu^{2+}$ to/from $Cu^{3+}$ redox reaction on an exemplary inventive Cu-CNPs/FTO$_{500}$ material under potential range from 1.43 to 0.94 $V_{RHE}$ based on a CV scan rate of 20 mV/s. The electrochemically active surface area calculated from the charge under the active reduction peak from the oxygen evolution reaction (OER) polarization curve by assuming that each surface Cu atom corresponds to one chemisorbed oxygen atom is found to be 7.5 cm$^2$, e.g., 7.5±0.05, 0.1, 0.25, 0.33, 0.4, 0.45, 0.5, 0.55, 0.6, 0.67, 0.75, 0.85, 1, 1.25, 1.5, 1.75, 2, or 2.5 cm$^2$ (or any range including any combination of such endpoints), presenting enhanced electrocatalytic physiognomies of the system as seen in FIG. 16. This method is based on the assumption that all the atoms in electrocatalyst are 100% electrochemically active, based on the following calculations and Table 2, below.

TOF@1.45V=[0.0009×(6.022×10$^{23}$)]/[1×4×96485× (0.0016583×10$^{19}$)]=0.084 s$^{-1}$

TOF@1.48V=[0.00152×(6.022×10$^{23}$)]/[1×4×96485× (0.0016583×10$^{19}$)]=0.14 s$^{-1}$

TOF@1.51V=[0.0034×(6.022×10$^{23}$)]/[1×4×96485× (0.0016583×10$^{19}$)]=0.32 s$^{-1}$

TOF@1.54V=[0.0051×(6.022×10$^{23}$)]/[1×4×96485× (0.0016583×10$^{19}$)]=0.48 s$^{-1}$

TOF@1.57V=[0.0084×(6.022×10$^{23}$)]/[1×4×96485× (0.0016583×10$^{19}$)]=0.79 s$^{-1}$

TOF@1.60V=[0.0118×(6.022×10$^{23}$)]/[1×4×96485× (0.0016583×10$^{19}$)]=1.1 s$^{-1}$

TOF@1.63V=[0.017×(6.022×10$^{23}$)]/[1×4×96485× (0.0016583×10$^{19}$)]=1.6 s$^{-1}$

Figure 17:
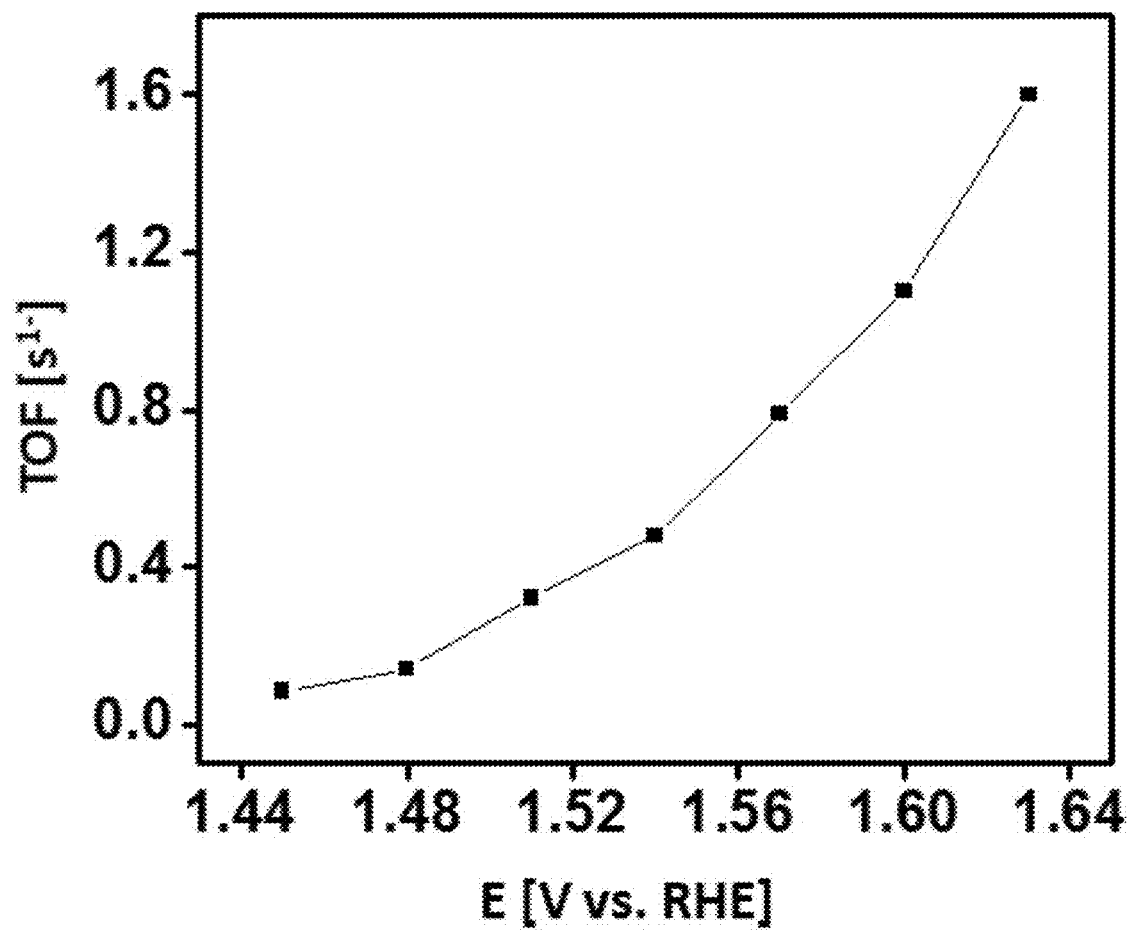
FIG. 17 shows a plot of the turn-over frequency (TOF) calculated at various applied potential for an exemplary inventive Cu-CNPs/FTO$_{500}$ oxygen evolution reaction (OER) electrocatalyst in 0.1 M KOH for which the surface concentration was determined from the redox peak current.
Figure 18:
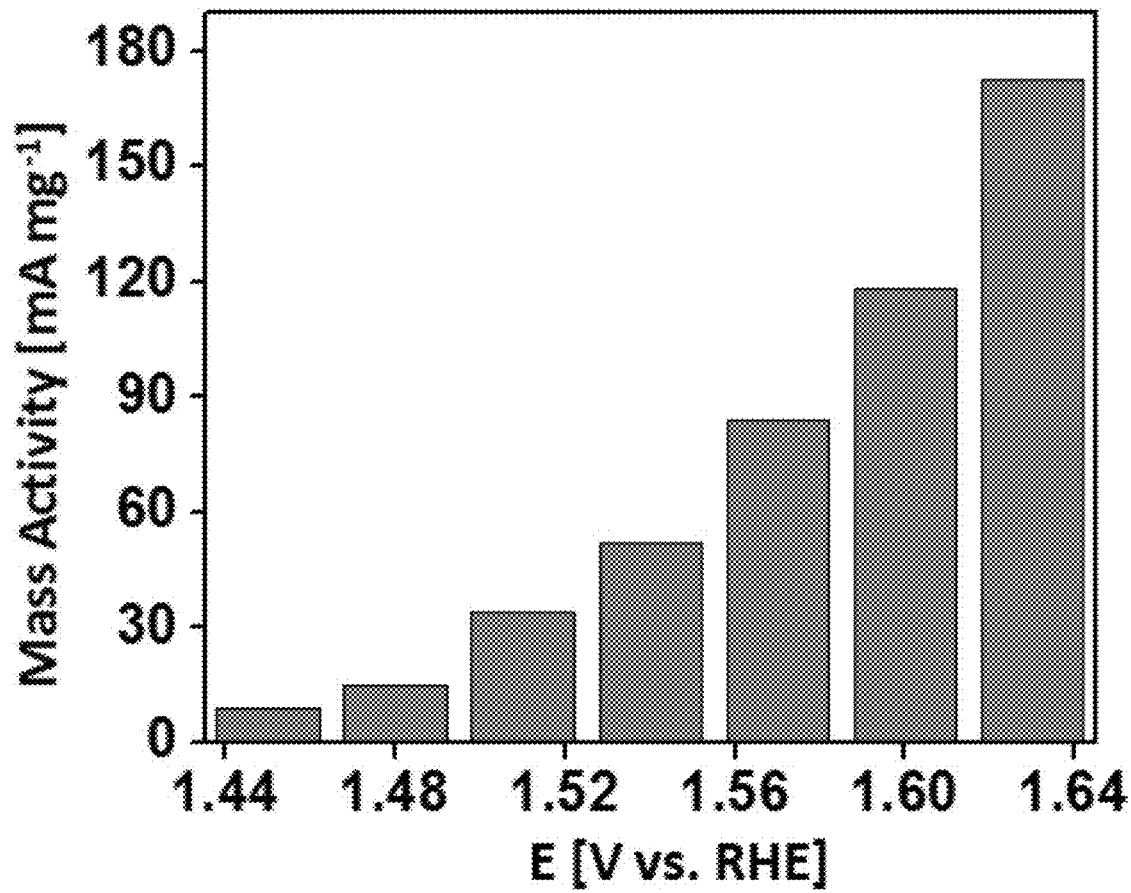
FIG. 18 shows a chart of the mass activity (MA) values for an exemplary inventive Cu-CNPs/FTO$_{500}$ material at various applied potential calculated from OER current obtained by CV curve.

FIG. 20 shows a plot of the turn-over frequency (TOF) calculated at various applied potential for an exemplary inventive Cu-CNPs/FTO$_{500}$ oxygen evolution reaction (OER) electrocatalyst in 0.1 M KOH for which the surface concentration was determined from the redox peak current. FIG. 21 shows a chart of the mass activity (MA) values for an exemplary inventive Cu-CNPs/FTO$_{500}$ material at various applied potential calculated from OER current obtained by CV curve. The turn-over frequency (TOF) and mass activity values were calculated at various applied potential values from 1.45 $V_{RHE}$ to 1.63 $V_{RHE}$ as shown in FIGS. 17 and 18, as well as Table 2, below.

TABLE 2

Shows the mass activity and TOF values of Cu-CNPs/FTO$_{500}$ type electrocatalytic calculated at various applied potential.

| Applied potential ($V_{RHE}$) | Current Value (mA) | Mass Activity (mA/mg) | TOF (s$^{-1}$) |
|---|---|---|---|
| 1.45 | 0.9 | 9 | 0.08 |
| 1.48 | 1.52 | 15.2 | 0.14 |
| 1.51 | 3.41 | 34.1 | 0.32 |
| 1.54 | 5.19 | 51.9 | 0.48 |
| 1.57 | 8.4 | 84 | 0.79 |
| 1.58 | 8.7 | 87 | 0.81 |
| 1.60 | 11.8 | 118 | 1.11 |
| 1.63 | 17.24 | 172.4 | 1.62 |

The inventive catalysts can achieve turn-over frequencies of 0.8 s$^{-1}$, e.g., at least 0.01, 0.025, 0.05, 0.1, 0.15, 0.2, 0.25, 0.3, 0.33, 0.35, 0.375, 0.4, 0.4125, 0.425, 0.4375, 0.45, 0.475, 0.5, 0.525, 0.55, 0.575, 0.6, or 0.65 s$^{-1}$ and/or up to 25, 20, 15, 10, 7.5, 5, 2.5, 2.25, 2, 1.75, 1.5, 1.25, 1.2, 1.15, 1.1, 1.05, 1, 0.95, 0.9, 0.875, 0.85, 0.8375, 0.825, 0.8125, 0.8, 0.7875, 0.775, 0.7625, or 0.75 s$^{-1}$, and mass activity of 87 mA/mg, e.g., at least 50, 55, 60, 65, 70, 75, 80, 82.5 85, 86.25, 87.5, 88.75, 89, or 90 mA/mg and/or up to 150, 140, 130, 125, 120, 115, 110, 105, 102.5, 100, 98.75, 97.5, 96.25, 95, 93.75, 92.5, 91.25, 90, or 87.5 mA/mg, at just 0.35 V. The choice of an onset overpotential, η, of 0.35 V, depends on an well-described device model, indicating that 10% efficient solar water splitting device should operate at 10 mA/cm$^2$ with a maximum overpotential of 0.35 V for oxygen evolution reaction as reported in *Chemistry Select* 2018, 3, 11357-11366. The overall electrocatalytic activity indicates that comparatively easily-made, inventive Cu-CNPs/FTO$_{500}$ electrocatalysts are promising, robust, cheap, and efficient electrocatalytic candidates for facilitating the water oxidation reaction.

The remarkably lower energy input, i.e., cost, for initiating water oxidation catalysis at just 220 mV using inventive Cu-CNPs/FTO$_{500}$ electrocatalysts compelled an evaluation of the long-term stability of the inventive catalytic material for water oxidation catalysis under electrochemical conditions. The stability of exemplary inventive Cu-CNPs/FTO$_{500}$ catalysts were tested under harsh oxidative environment via long-term controlled potential water electrolysis experiments.

Figure 6:
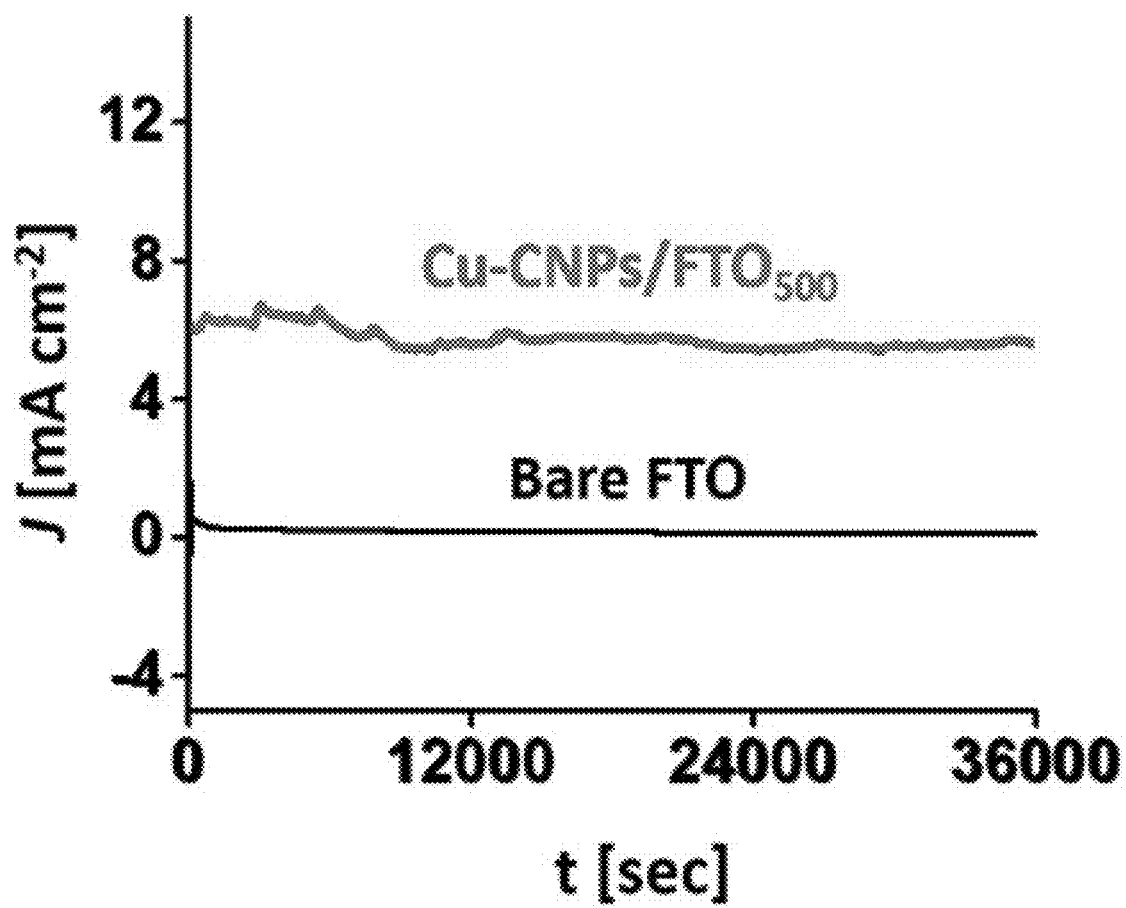
FIG. 6 shows a plot of extended time electrocatalytic oxygen evolution during controlled potential water electrolysis using a Cu-CNPs/FTO$_{500}$ sample at 1.56 V$_{RHE}$ in 0.1 M KOH electrolyte.

FIG. 6 shows a plot of extended time electrocatalytic oxygen evolution during controlled potential water electrolysis using a Cu-CNPs/FTO$_{500}$ sample at 1.56 V$_{RHE}$ in 0.1 M KOH electrolyte. Chronoamperometry experiments conducted for inventive Cu-CNPs/FTO$_{500}$ samples presented respectable results, achieving a current density of less than 6 mA/cm$^2$ at an operating potential of 1.56 V$_{RHE}$ at an onset overpotential, r, of 0.33 V. The current density in the catalyst samples remained constant during an unremitting 10 hours of electrolysis, and the catalyst samples showed no observable degradation as indicated in FIG. 6. Furthermore, a rich stream of oxygen bubbles could be seen coming out of electrode surface during the constant potential electrolysis (CPE) experiments, owing to the oxygen evolution reaction (OER). The value of much higher current density and outstanding stability can be attributed to the excellent catalytic activity of the inventive catalysts, particularly under the employed conditions. Electrochemical investigations including cyclic voltammetry, Tafel slope analysis, and controlled potential electrolysis (CPE) indicate that inventive electrocatalysts, prepared as described above, despite using simple precursors and following low-cost, time effective and straightforward synthetic methods, proved efficient, e.g., in electrochemical cells, for catalyzing the water oxidation reaction. The electrochemical activity of inventive catalysts can unexpectedly be even better than activities observed for known Cu electrocatalysts.

Numerous modifications and variations of the present invention are possible in light of the above teachings. It is therefore to be understood that within the scope of the appended claims, the invention may be practiced otherwise than as specifically described herein.

The invention claimed is:

1. An oxygen evolution reaction catalyst, comprising:
a substrate; and
a porous nanoparticle film, comprising copper oxide and carbon, disposed on the substrate,
wherein the porous nanoparticle film comprises, based upon energy dispersive x-ray spectroscopy, 10 to 20 atom % of carbon, 35 to 60 atom % of copper, and 25 to 50 atom % of oxygen.

2. The catalyst of claim 1, wherein the porous nanoparticle film comprises a Cu$_8$O phase.

3. The catalyst of claim 2, wherein the CuO phase is crystalline.

4. The catalyst of claim 1, wherein the porous nanoparticle film comprises a CuO phase.

5. The catalyst of claim 4, wherein the CuO phase is crystalline.

6. The catalyst of claim 1, wherein the porous nanoparticle film comprises a Cu$_2$O phase.

7. The catalyst of claim 6, wherein the Cu$_2$O phase is amorphous.

8. The catalyst of claim 1, wherein the porous nanoparticle film comprises a Cu$_8$O phase, a CuO phase, and a Cu$_2$O phase.

9. The catalyst of claim 1, wherein an atomic ratio of the copper to the oxygen in the porous nanoparticle film is in a range of from 1.175 to 1.6:1, measured by energy dispersive x-ray spectroscopy.

10. The catalyst of claim 1, wherein an atomic ratio of the copper to carbon in the porous nanoparticle film is in a range of from 2.25:1 to 5:1, measured by energy dispersive x-ray spectroscopy.

11. The catalyst of claim 1, wherein the substrate comprises at least 50 wt. % of a transparent conductive oxide, relative to a total substrate weight.

12. The catalyst of claim 1, wherein the substrate comprises at least 75 wt. % indium tin oxide, relative to a total substrate weight.

13. The catalyst of claim 1, which has an oxygen evolution reaction onset potential in 0.1 M KOH solution of 1.40 to 1.70 V relative to the reversible hydrogen electrode.

14. The catalyst of claim 1, which has a current density of 9.5 to 15 mA/cm$^2$ at a potential in 0.1 M KOH solution of 1.59 V relative to the reversible hydrogen electrode.

15. The catalyst of claim 1, which has a Tafel plot of over potential versus logarithm of current density that is linear with a slope of in a range of from 0.45 to 0.6.

16. An electrochemical cell, comprising:
the catalyst of claim 1; and
a basic electrolyte.

17. A method for making the catalyst of claim 1, the method comprising:
spray and/or drop coating a nanoparticle dispersion comprising copper ions and carbonaceous anions onto the substrate to obtain a coated substrate; and
annealing the coated substrate at a temperature in a range of from 450 to 550° C. to form the catalyst.

18. A method of conducting an oxygen evolution reaction, the method comprising:
contacting the catalyst of claim 1 with an aqueous electrolyte solution having a pH of 8 to 14; and
applying a potential of 1.40 to 1.70 V to the electrocatalyst and a counter electrode immersed in the aqueous electrolyte solution.

19. A method of making an oxygen evolution reaction catalyst, the method comprising:
spray or drop coating a nanoparticle dispersion comprising at least 50 wt. %, as a percentage of non-solvent weight, of copper and carbonaceous anions onto a substrate, outside of solution, to obtain a coated substrate; and
annealing the coated substrate at a temperature in a range of from 450 to 550° C. to form the catalyst.

20. The method of claim 19, wherein the nanoparticle dispersion is made by a process comprising:
combining copper ions and bicarbonate or carbonate ions in an aqueous solution to form a precursor solution;
aging the precursor solution at a temperature in a range of from 5 to 45° C. to form a copper particle suspension; and
microfiltering the copper particle suspension to obtain the nanoparticle dispersion.

* * * * *